US010583874B2

(12) United States Patent
Burrows et al.

(10) Patent No.: US 10,583,874 B2
(45) Date of Patent: Mar. 10, 2020

(54) DEPLOYABLE FAIRING FOR USE WITH VEHICLES

(71) Applicant: XSTREAM TRUCKING INC., San Mateo, CA (US)

(72) Inventors: Daniel Burrows, San Mateo, CA (US); Burkley Uwe Kladde, Chandler, AZ (US); Dagan Alec Trnka, San Francisco, CA (US); Roger Lawrence LeMesurier, San Francisco, CA (US); Adam Joseph Baumgartner, Burlingame (CA)

(73) Assignee: XSTREAM TRUCKING INC., Redwood City, CA (US)

( * ) Notice: Subject to any disclaimer, the term of this patent is extended or adjusted under 35 U.S.C. 154(b) by 0 days.

(21) Appl. No.: 16/183,507

(22) Filed: Nov. 7, 2018

(65) Prior Publication Data

US 2019/0071138 A1 Mar. 7, 2019

Related U.S. Application Data

(63) Continuation of application No. 15/832,315, filed on Dec. 5, 2017, now Pat. No. 10,137,945, which is a
(Continued)

(51) Int. Cl.
*B62D 35/00* (2006.01)
*B62D 37/02* (2006.01)
*B62D 33/06* (2006.01)

(52) U.S. Cl.
CPC .......... *B62D 35/001* (2013.01); *B62D 37/02* (2013.01); *B62D 33/0612* (2013.01)

(58) Field of Classification Search
CPC ..... B62D 35/001; B62D 35/008; B62D 37/02
(Continued)

(56) References Cited

U.S. PATENT DOCUMENTS 3,241,876 A   3/1966 Saunders
3,486,464 A   12/1969 Dean et al.
(Continued)

FOREIGN PATENT DOCUMENTS

CA   2431380 A1 * 12/2003 ........... B62D 35/001
DE   3248122 A1   7/1984
(Continued)

OTHER PUBLICATIONS

Burrows, "System, Method and Article for Use With Coupled Vehicles," Amendment, filed Oct. 12, 2011, for U.S. Appl. No. 12/563,426, 15 pages.
(Continued)

*Primary Examiner* — Jason S Morrow
(74) *Attorney, Agent, or Firm* — Cozen O'Connor

(57) ABSTRACT

Systems and methods provide a deployable fairing system to a tractor trailer. The deployable fairing system includes an actuator used to extend the deployable fairing from an unextended configuration to an extended configuration to occupy a portion of a gap area that exists between a tractor and an attached trailer. The deployable fairing includes deployable upper and/or lower horizontal assemblies that are pivotally coupled to a frame attached to the tractor/cab, and two side panels that are pivotally coupled to one or both of the upper and lower horizontal assemblies. The deployable upper and lower horizontal assemblies and the two side panels fold in on one another along multiple hinged axes in the unextended configuration, and extend rearward from the top and sides of the tractor in the extended configuration to cover a portion of the gap. The fairing may advantageously flair from front to the rear.

20 Claims, 47 Drawing Sheets

Related U.S. Application Data continuation of application No. PCT/US2017/063728, filed on Nov. 29, 2017.

(60) Provisional application No. 62/428,356, filed on Nov. 30, 2016.

(58) Field of Classification Search
USPC .................................................... 296/180.4
See application file for complete search history.

(56) References Cited

U.S. PATENT DOCUMENTS

| | | |
|---|---|---|
| 3,697,120 A | 10/1972 | Saunders |
| 3,711,146 A | 1/1973 | Madzsar et al. |
| 3,934,923 A | 1/1976 | Lissaman et al. |
| 3,977,715 A | 8/1976 | Casci |
| 3,977,716 A | 8/1976 | Whited |
| 4,036,519 A | 7/1977 | Servais et al. |
| 4,193,629 A | 3/1980 | Merkle |
| 4,290,639 A | 9/1981 | Herpel |
| 4,311,334 A | 1/1982 | Jenkins |
| 4,343,505 A | 8/1982 | Levassor |
| 4,397,496 A | 8/1983 | Drygas, III |
| 4,462,628 A | 7/1984 | Gregg |
| 4,518,188 A | 5/1985 | Witten |
| 4,611,847 A | 9/1986 | Sullivan |
| 4,685,715 A | 8/1987 | Hardin |
| 4,693,506 A | 9/1987 | Massengill |
| 4,746,160 A | 5/1988 | Wiesemeyer |
| 4,750,772 A | 6/1988 | Haegert |
| 4,883,307 A | 11/1989 | Hacker et al. |
| 4,904,015 A | 2/1990 | Haines |
| 4,932,716 A | 6/1990 | Marlowe et al. |
| 5,078,448 A | 1/1992 | Selzer et al. |
| 5,222,438 A | 6/1993 | Ende |
| 5,498,059 A | 3/1996 | Switlik |
| 5,522,637 A | 6/1996 | Spears |
| 5,658,038 A | 8/1997 | Griffin |
| 6,213,531 B1 | 4/2001 | Corey et al. |
| 6,246,948 B1 | 6/2001 | Thakker |
| 6,257,654 B1 | 7/2001 | Boivin et al. |
| 6,428,084 B1 | 8/2002 | Liss |
| 6,485,087 B1 | 11/2002 | Roberge et al. |
| 6,527,334 B2 | 3/2003 | Oliver |
| 6,585,312 B2 | 7/2003 | Jain |
| 6,799,793 B1 | 10/2004 | Sladen |
| 6,846,035 B2 | 1/2005 | Wong et al. |
| 6,886,882 B2 | 5/2005 | Farlow et al. |
| 6,932,419 B1 | 8/2005 | McCullough |
| 7,374,229 B1 | 5/2008 | Noll et al. |
| 7,374,230 B2 | 5/2008 | Breidenbach |
| 7,618,086 B2 | 11/2009 | Breidenbach |
| 7,850,224 B2 | 12/2010 | Breidenbach |
| 8,100,461 B2 | 1/2012 | Smith et al. |
| 8,272,680 B2 | 9/2012 | Breidenbach |
| 8,360,509 B2 | 1/2013 | Smith et al. |
| 8,480,162 B2 | 7/2013 | Breidenbach |
| 8,608,228 B2 | 12/2013 | Visentin |
| 8,630,510 B2 | 1/2014 | Giuffrida et al. |
| 8,708,399 B2 | 4/2014 | Smith et al. |
| 8,876,191 B2 | 11/2014 | Breidenbach |
| 9,039,069 B2 | 5/2015 | Smith et al. |
| 9,145,177 B2 | 9/2015 | Smith et al. |
| 9,168,959 B2 | 10/2015 | Smith et al. |
| 9,333,993 B2 | 5/2016 | Telnack |
| 9,346,496 B2 | 5/2016 | Breidenbach |
| 9,440,688 B2 | 9/2016 | Smith et al. |
| 9,440,689 B1 | 9/2016 | Smith et al. |
| 9,457,847 B2 | 10/2016 | Smith et al. |
| 9,505,449 B2 | 11/2016 | Telnack |
| 2004/0119319 A1 | 6/2004 | Reiman et al. |
| 2004/0239146 A1 | 12/2004 | Ortega et al. |
| 2007/0200390 A1 | 8/2007 | Lotarev et al. |
| 2008/0231434 A1 | 9/2008 | Hermann |
| 2008/0266135 A1 | 10/2008 | Curtis |
| 2009/0076700 A1 | 3/2009 | Radpour |
| 2009/0184539 A1 | 7/2009 | Pursley |
| 2009/0200834 A1 | 8/2009 | Vogel et al. |
| 2010/0072779 A1 | 3/2010 | Pfaff |
| 2010/0194143 A1* | 8/2010 | Perkins ............... B62D 35/001 296/180.2 |
| 2011/0015809 A1 | 1/2011 | Hermann |
| 2011/0068602 A1 | 3/2011 | Burrows |
| 2011/0084516 A1 | 4/2011 | Smith et al. |
| 2011/0153116 A1 | 6/2011 | Bedingfield, Sr. et al. |
| 2012/0139290 A1 | 6/2012 | Kenevan |
| 2014/0367993 A1 | 12/2014 | Breidenbach |
| 2015/0035312 A1 | 2/2015 | Grandominico et al. |
| 2015/0197292 A1 | 7/2015 | Smith et al. |
| 2015/0239512 A1 | 8/2015 | Smith et al. |
| 2015/0266520 A1 | 9/2015 | Breidenbach |
| 2015/0274220 A1 | 10/2015 | Telnack |
| 2015/0291231 A1 | 10/2015 | Smith et al. |
| 2015/0321706 A1 | 11/2015 | Smith |
| 2016/0194037 A1* | 7/2016 | Logounov ........... B62D 35/001 296/180.2 |

FOREIGN PATENT DOCUMENTS

| | | |
|---|---|---|
| EP | 1870320 A2 | 12/2007 |
| WO | 2008/024386 A2 | 2/2008 |
| WO | 2018102422 A1 | 6/2018 |

OTHER PUBLICATIONS

Office Action, dated Jul. 12, 2011, for U.S. Appl. No. 12/563,426, Burrows, "System, Method and Article for Use With Coupled Vehicles," 12 pages.

Telnack, "Self-Deploying Apparatuses, Assemblies, and Methods for Drag Reduction of Land Vehicles," Amendment, filed Feb. 28, 2017, for U.S. Appl. No. 15/151,214, 8 pages.

International Search Report and Written Opinion of the International Searching Authority, dated Mar. 14, 2018, for International Application No. PCT/US2017/063728, 76 pages.

Burrows et al., "Deployable Fairing for Use With Vehicles," Office Action dated Apr. 12, 2018, for U.S. Appl. No. 15/832,315, 12 pages.

Burrows et al., "Deployable Fairing for Use With Vehicles," Amendment filed Jun. 4, 2018, for U.S. Appl. No. 15/832,315, 12 pages.

U.S. Appl. No. 16/183,509, filed Nov. 7, 2018, Deployable Fairing for Use With Vehicles.

U.S. Appl. No. 16/294,719, filed Mar. 6, 2019, Deployable Fairing System for Use With Vehicles.

Burrows et al., "Deployable Fairing for Use With Vehicles," Office Action dated Sep. 12, 2019, for U.S. Appl. No. 16/183,507, 7 pages.

Ang-Olson et al., "Energy Efficiency Strategies for Freight Trucking: Potential Impact on Fuel Use and Greenhouse Gas Emissions," Transportation Research Record 1815, Paper No. 02-3877, pp. 11-18, Jan. 1, 2002.

* cited by examiner

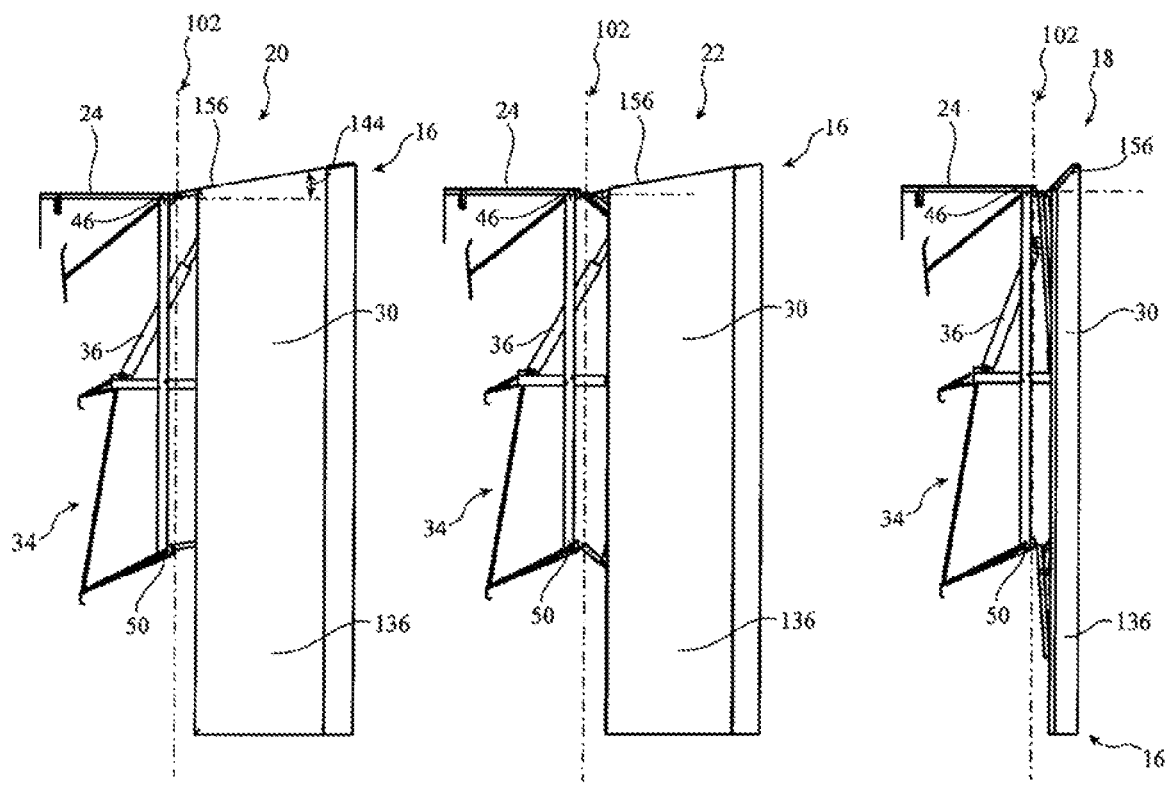
*FIG. 7A*  *FIG. 7B*  *FIG. 7C*

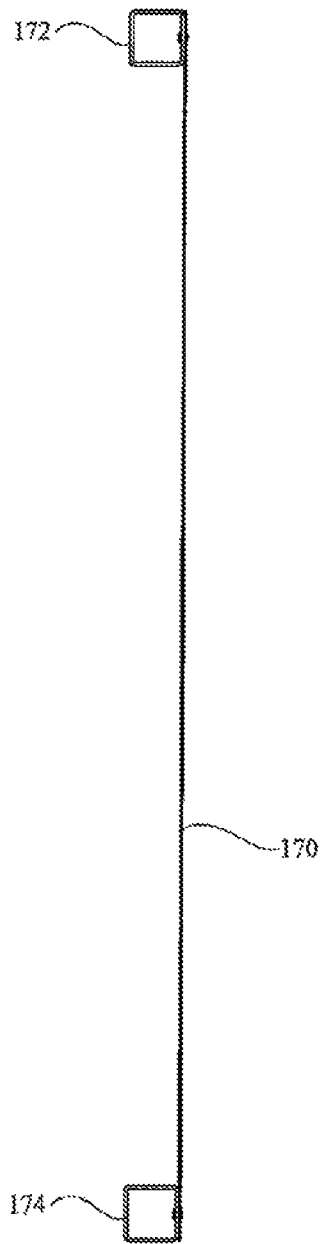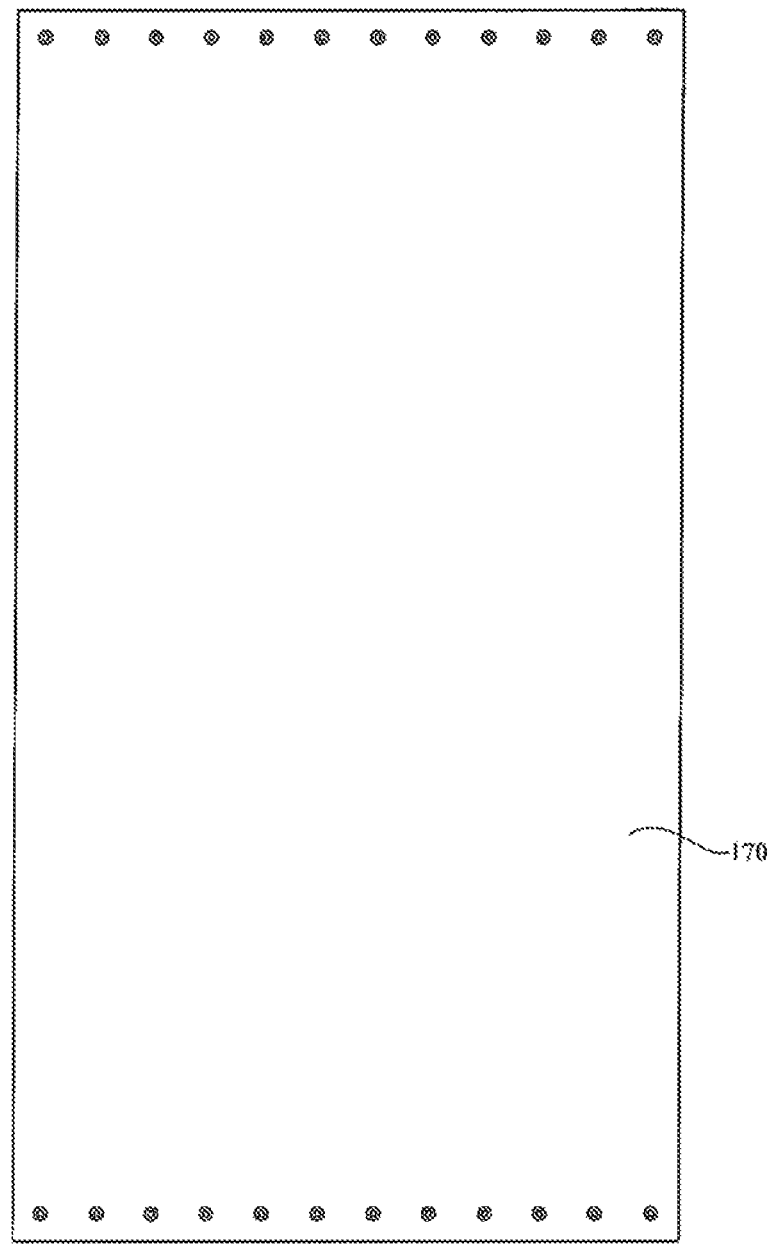
*FIG. 14B*  *FIG. 14C*

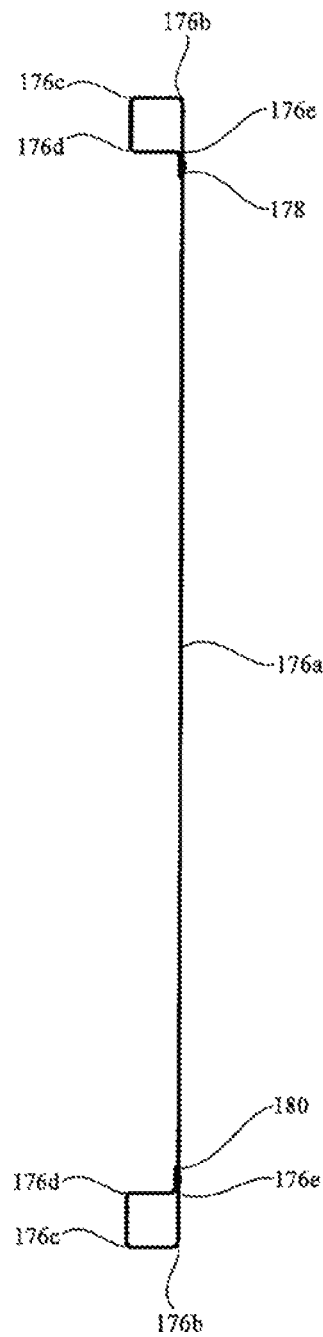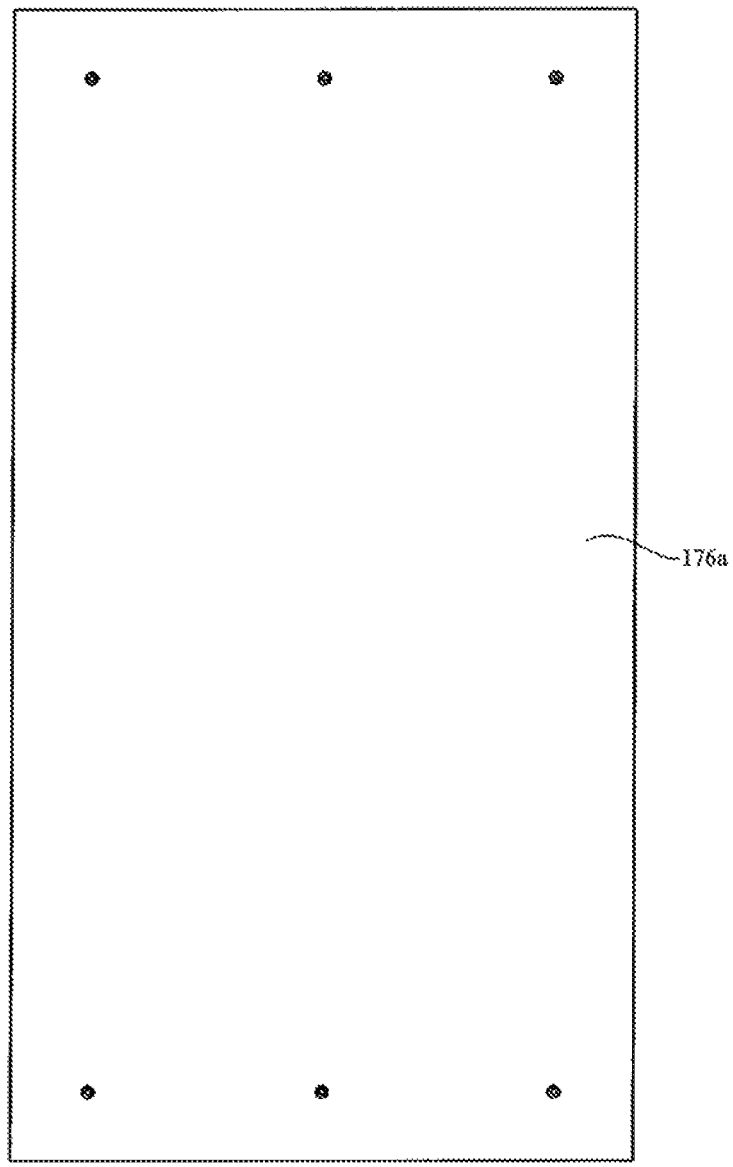
*FIG. 15B*  *FIG. 15C*

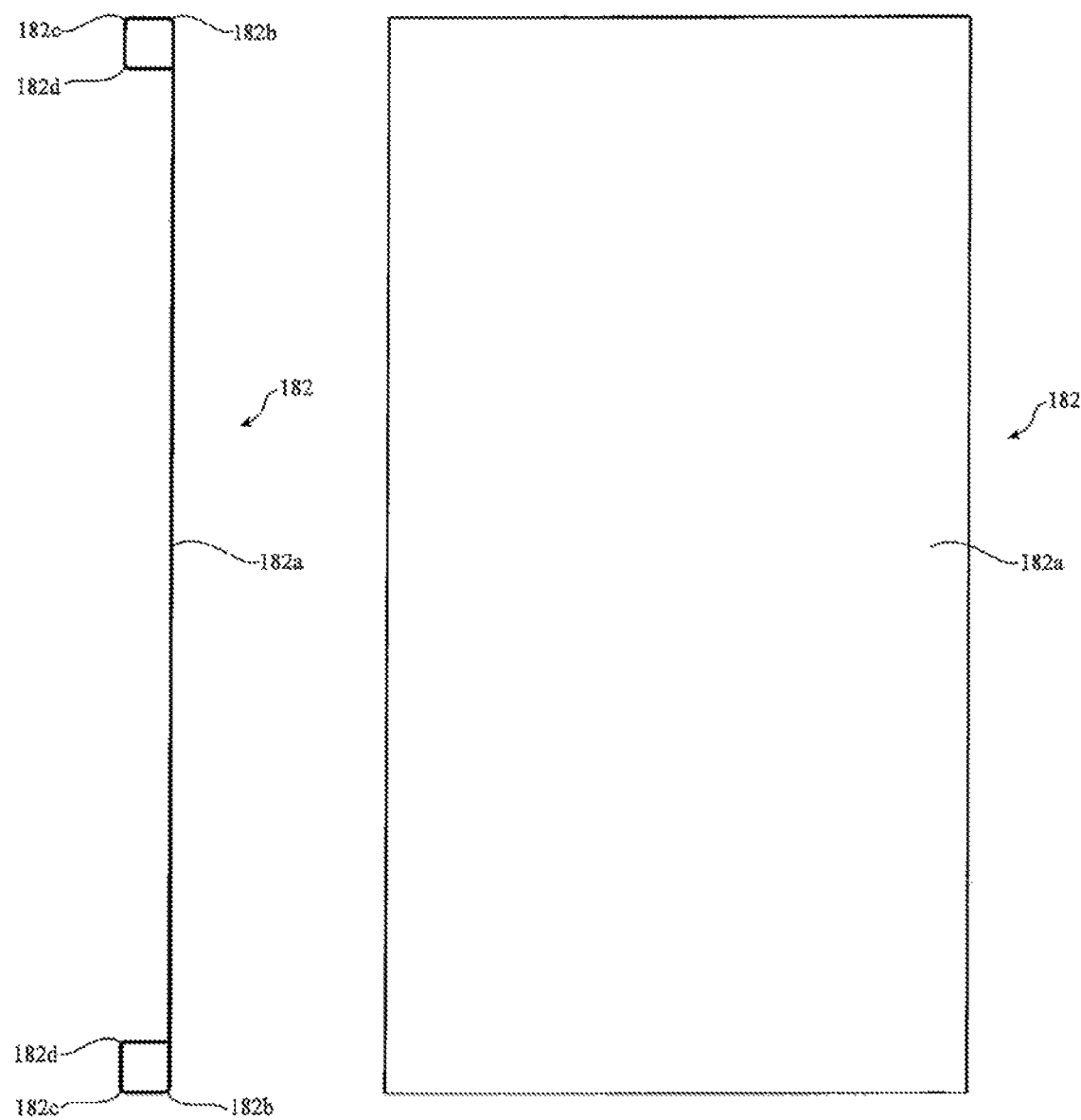
*FIG. 16B*     *FIG. 16C*

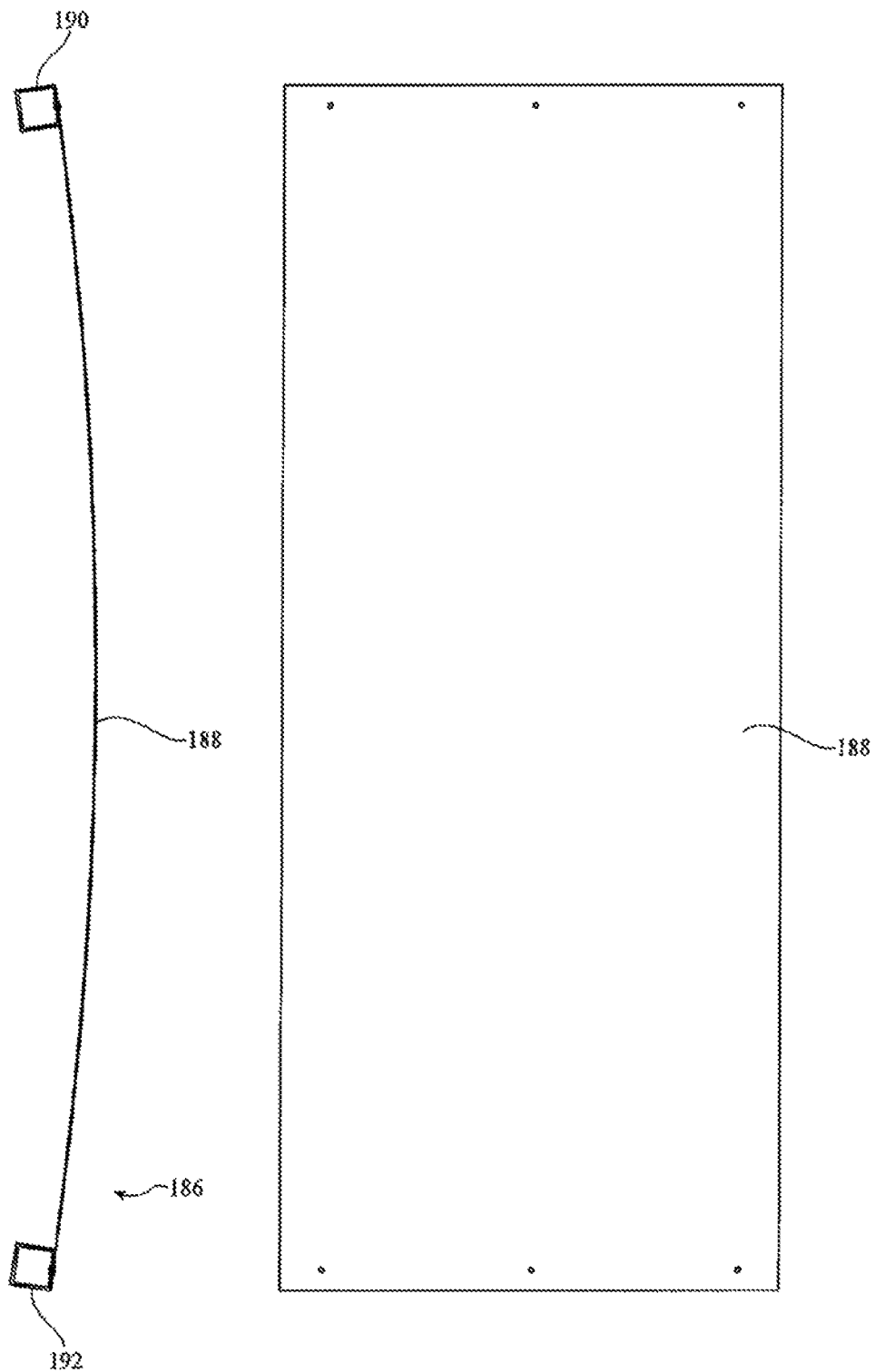
*FIG. 17B*     *FIG. 17C*

DEPLOYABLE FAIRING FOR USE WITH VEHICLES

TECHNICAL FIELD

The present disclosure generally relates to vehicles, for example tractor trailer combinations, and more particularly with fairings to enhancing fuel economy of vehicles, for example coupled vehicles.

BACKGROUND

Description of the Related Art

Vehicles move a large number of people and cargo. Often two or more vehicles are physically coupled together to move freight or other cargo, people, and/or animals.

A ubiquitous example of coupled vehicles is that of the tractor-trailer or semi-trailer combination, which employs a tractor, sometimes referred to as a primary mover, coupled to pull one or more trailers. Such tractor-trailers or semis come in a large variety of forms and are typically used to move freight over relatively long distances. The tractor is the drive mechanism that pulls or pushes the trailer. The tractor includes the engine, typically an internal combustion diesel engine, a transmission and drive wheels. The tractor typically includes a cab where the driver or operator sits to operate the tractor. The tractor may also include a sleep cab which provides accommodations for the driver or operator when not in motion. The trailers are typically removably coupled to the tractor via a coupler such as a fifth wheel carried by the tractor, or less commonly via an automatic coupling. A semi-trailer typically does not have a front axle, relying on the tractor for support of a portion of the trailer's weight, and may have one or typically more rear axles. In some instances, a tractor may pull multiple trailers. In such a case, the following trailer(s) may not have front axels and may rely on the proceeding trailers for supporting a portion of the trailer's weight. Trailers come in a large variety, for example box, bus, curtain side, flatbed, "low boy", refrigerated or "reefer", tanker, dry bulk, car carrier, drop deck, "double decker" or sidelifter.

Another example of coupled vehicles is railroad trains. Rail road trains typically include one or more locomotives that pull a number of cars along a set of tracks. The cars may include passenger cars and/or freight cars. The freight cars can take a large variety of forms, similar in some respects to the various types of trailers.

Tractor-trailers or semis are increasingly being used to move containerized cargo. Such use of tractor trailers may conveniently cooperate in conjunction with ships (e.g., ocean going container ships, barges) and/or railroad trains. For instance, containers may arrive by ship from overseas. Tractor-trailers may move some of the containers over roads to warehouses or to retail locations. Tractor-trailers may move some of the containers to rail yards. Some containers may be moved via railroad trains, and subsequently moved to a desired location via tractor-trailers.

Coupled vehicles typically must be capable of operating in a variety of environments. For example, coupled vehicles must be capable of carrying loads at relatively high speed over long distance. For instance, tractor-trailer combinations typically must be able to haul freight over highways such as toll roads or freeways within some posted speed limit. Such highways are typically relatively straight over long distances, and do not require much turning or maneuvering. Such tractor-trailers typically must also be able to haul freight over surface streets at much lower posted speed limits. Travel over surface streets typically requires higher maneuverability than travel over highways, often requiring essentially right angle turns in relatively confined spaces or navigating steep elevational changes.

Fuel efficiency is typically an important concern when operating coupled vehicles. A large portion of the cost of moving freight or people is attributable to fuel costs and the majority of fuel at highway speeds is spent overcoming aerodynamic drag. Fuel efficiency tends to decrease as speed increases. Fuel efficiency while traveling on highways is particularly a concern since the average speed is higher than on surface roads and, for most operations, more time is spent on highways than on surface streets.

Numerous approaches have been suggested for increasing fuel efficiency of vehicles. These approaches typically employ ferrules, fairings, cowlings, air dams, deflectors, and/or spoilers located at various locations, for instance on a front of the tractor or over a roof of the tractor. Some approaches for increasing fuel efficiency specifically address the problem created by the fact that there is a gap between the tractor and trailer. Some of the approaches for increasing fuel efficiency are illustrated in U.S. Pat. Nos. 3,697,120; 3,711,146; 3,934,923; 4,036,519; 4,750,772; 5,078,448; and 6,585,312.

BRIEF SUMMARY

Deployable fairings are disclosed that enhance fuel efficiency of vehicles (e.g., coupled vehicles), yet which still provide for a high degree of maneuverability in situations where such maneuverability is necessary or desired to operate the coupled vehicles.

A fairing structure for use with vehicles may be summarized as including: a deployable upper panel assembly comprising a deployable upper panel, a first upper wing panel and at least a second upper wing panel, the first upper wing panel and the second upper wing panel each pivotally coupled to the deployable upper panel, the deployable upper panel pivotal about a horizontal axis to move the deployable upper panel assembly between a retracted configuration of the fairing structure and a deployed configuration of the fairing structure; at least a first deployable side panel having a proximal edge, the first deployable side panel coupled to translate and pivot in moving between the retracted configuration of the fairing structure and the deployed configuration of the fairing structure; and at least a second deployable side panel having a proximal edge, the second deployable side panel coupled to translate and pivot in moving between the retracted configuration of the fairing structure and the deployed configuration of the fairing structure.

The first deployable side panel may be pivotally coupled to the deployable upper panel assembly and the second deployable side panel may be pivotally coupled to the deployable upper panel assembly. The first deployable side panel may be pivotable about an axis that extends parallel to the proximal edge of the first deployable side panel and the second deployable side panel may be pivotable about an axis that extends parallel to the proximal edge of the second deployable side panel. The axis that the first deployable side panel may be pivotable about may be spaced from the proximal edge of the first deployable side panel at least in the deployed configuration of the fairing structure and the axis that the second deployable side panel may be pivotable about may be spaced from the proximal edge of the second deployable side panel at least in the deployed configuration of the fairing structure. The first deployable side panel may be pivotable about an axis that is perpendicular to the horizontal axis and the second deployable side panel may be pivotable about an axis that is perpendicular to the horizontal axis. The first deployable side panel may be coupled to translate and pivot without any hinge extending along the proximal edge of the first deployable side panel and the second deployable side panel may be coupled to translate and pivot without any hinge extending along the proximal edge of the second deployable side panel. The deployable upper panel may be a single trapezoidal panel with a trapezoidal profile.

The fairing structure may further include a static upper panel that has a D-shaped profile.

The static upper panel may extend horizontally from a back of a cab of a tractor with a major curved edge of the D-shaped profile proximate the back of the cab of the tractor. The deployable upper panel assembly may be attached to a back of a cab of a tractor. The first deployable side panel and the second deployable side panel may each extend vertically with respect to the cab of the tractor. There may be no vertically extending hinges between the fairing structure and the cab of the tractor. In the retracted configuration, the deployable upper panel may extend downwardly with the first and the second deployable side panels retracted against the deployable upper panel. In the retracted configuration, the deployable upper panel may extend vertically with the first and the second deployable side panels folded over the deployable upper panel. In the deployed configuration, the deployable upper panel may extend rearwardly of the back of the cab of the tractor and the first and the second deployable side panels may extend perpendicularly from the deployable upper panel. In the deployed configuration, the deployable upper panel may extend rearwardly at a positive slope from the back of the cab of the tractor and the first and the second deployable side panels may extend rearwardly at a positive slope from the back of the cab of the tractor. In the deployed configuration, the deployable upper panel may extend rearwardly from the back of the cab of the tractor and the first and the second deployable side panels may extend rearwardly from the back of the cab of the tractor, an area enclosed by a first perimeter defined by the deployable upper panel and the first and the second deployable side panels distal to the back of the cab of the tractor greater than an area enclosed by a second perimeter may be defined by the deployable upper panel and the first and the second deployable side panels proximate the back of the cab of the tractor.

The fairing structure may further include a deployable lower panel assembly comprising at least one deployable lower panel and a pair of lower wing panels, the lower wing panels each pivotally coupled to the deployable lower panel, the deployable lower panel pivotally coupled to the back of the cab of the tractor, the first and the second deployable side panels each pivotally coupled to the deployable lower panel assembly.

The first upper wing panel may be pivotally coupled to the deployable upper panel along a first diagonal axis that forms a first acute angle with the horizontal axis, and the second upper wing panel may be pivotally coupled to the deployable upper panel along a second diagonal axis that forms a second acute angle with the horizontal axis. The first upper wing panel may be pivotally coupled to the first deployable side panel along a first rotatable, horizontal axis, and the second upper wing panel may be pivotally coupled to the second deployable side panel along a second rotatable, horizontal axis, and wherein the first rotatable, horizontal axis may intersect the first diagonal axis at a first point along the horizontal axis, and the second rotatable, horizontal axis may intersect the second diagonal axis at a second point along the horizontal axis about which the deployable upper panel is pivotal. At least one of the deployable upper panel, the first deployable side panel or the second first deployable side panel may be a single unitary piece construction. At least one of the deployable upper panel, the first deployable side panel or the second deployable side panel may include a frame and a skin. At least one of the deployable upper panel, the first deployable side panel or the second first deployable side panel may be flexible. The deployable upper panel may have a major edge and may be pivotally coupled along the major edge to the static upper panel via at least one hinge.

The fairing structure may further include an actuator physically coupled to the deployable upper panel to pivot the deployable upper panel about a horizontal axis between the retracted and the deployed configurations.

The actuator may be a pneumatic linear actuator, and the fairing structure may further include a valve physically coupled to the actuator and biased to release air from under pressure from the actuator and to cause the deployable fairing to be in the retracted configuration when any event of the following events occurs: a power loss to the deployable fairing, a manual switch is positioned in an off position, the deployable fairing cannot receive data from a vehicle computer, a reading from a temperature sensor that indicates that an outside temperature is above an upper temperature threshold or below a lower temperature threshold, a reading from a wind sensor that indicates that a speed of a cross wind exceeds a cross wind threshold, a reading from a speed sensor that is below a speed threshold, or a stall condition in which the actuator is unable to move the deployable fairing to the deployed position.

The fairing structure may further include a positional sensor to detect a position information related to at least one of the deployable upper panel assembly, a first deployable side panel, and a second deployable side panel, wherein the positional information may be transmitted to a processor which uses the positional information to determine if an error condition exists.

The deployable upper panel assembly may transition to the retracted configuration in the event of an error condition. The error condition may include the position information from the positional sensor which indicates that the deployable fairing did not transition from the retracted configuration to the deployed configuration within an allotted period of time. At least one of the deployable upper panel, the first deployable side panel or the second deployable side panel may have a major surface, and the major surface may be convex. At least one of the deployable upper panel, the first deployable side panel or the second first deployable side panel may have an edge, the edge having at least a stiffening four bend edge. The stiffening four bend edge may include four 90° bends that extend parallel to each other; wherein three of the 90° bends occur in a first direction and a fourth 90° bend occurs in a second direction, opposite from the first direction; and wherein at least one bend in the stiffening four bend edge has one or more perforations that reduce a force needed to make the at least one bend.

The fairing structure may further include: a first pneumatic line tether to be physically coupled to a pneumatic line at a first point, the pneumatic line to extend between a leading component of a vehicle and a trailing component of the vehicle; and a second pneumatic line tether to be physically coupled to the pneumatic line at a second point; wherein the first pneumatic line tether and the second pneumatic line tether may control a transition of the pneumatic line between an extended state and a contracted state when the vehicle turns.

The first pneumatic line tether may have a first length and the second pneumatic line tether may have a second length different from the first length. The first pneumatic line tether may have a first elasticity and the second pneumatic line tether may have a second elasticity different from the first elasticity.

A fairing structure installed on a portion of a vehicle and moveable between a retracted configuration and a deployed configuration may be summarized as including: a deployable upper panel, the deployable upper panel pivotal about a first lateral horizontal axis that extends in a lateral direction across at least a portion of a width of the vehicle, the deployable upper panel pivotal about the first lateral horizontal axis between the retracted configuration and the deployed configuration; a first upper wing panel, the first upper wing panel pivotally coupled to the deployable upper panel to pivot about a first axis that extends at a first non-zero angle to the first lateral horizontal axis; a second upper wing panel, the second upper wing panel pivotally coupled to the deployable upper panel to pivot about a second axis that extends at a second non-zero angle to the first lateral horizontal axis, the second upper wing panel opposed from the first upper wing panel across a centerline of the deployable upper panel; a first deployable side panel, the first deployable side panel hinged solely about a first set of rotatable horizontal axes that rotate within respective planes; and a second deployable side panel, the second deployable side panel hinged solely about a second set of rotatable horizontal axes that rotate within respective planes.

The first deployable side panel may translate and pivot in moving between the retracted configuration of the fairing structure and the deployed configuration of the fairing structure and the second deployable side panel may translate and pivot in moving between the retracted configuration of the fairing structure and the deployed configuration of the fairing structure. The deployable upper panel may be a single trapezoidal panel with a trapezoidal profile. The first and the second deployable side panels may extend at least predominately vertically in both the retracted and the deployed configurations, extend laterally in the retracted configuration and extend rearwardly in the deployed configuration.

The fairing structure may further include the first deployable side panel hinged solely to the first upper wing panel and the second deployable side panel hinged solely to the second upper wing panel.

The fairing structure may further include: a deployable lower panel, the deployable lower panel pivotal about a second lateral horizontal axis that extends in the lateral direction across at least the portion of the width of the vehicle, the deployable lower panel pivotal about the second lateral horizontal axis between the retracted configuration and the deployed configuration; a first lower wing panel, the first lower wing panel pivotally coupled to the deployable lower panel to pivot about a third axis that extends at a third non-zero angle to the second lateral horizontal axis; a second lower wing panel, the second lower wing panel pivotally coupled to the deployable lower panel to pivot about a fourth axis that extends at a fourth non-zero angle to the second lateral horizontal axis, the second lower wing panel opposed from the first lower wing panel across a centerline of the deployable lower panel, and the first deployable side panel hinged solely to the first upper wing panel and the first lower wing panel and the second deployable side panel hinged solely to the second upper wing panel and the second lower wing panel.

The first deployable side panel may include a first elastic trailing edge and the second deployable side panel may include a second elastic trailing edge; and wherein the first elastic trailing edge and the second elastic trailing edge may physically engage with and conform to complementary edges of a trailer coupled to the vehicle when the fairing structure is in the deployed configuration. The first deployable side panel may include a flexible interior portion that extends vertically from a top edge to a bottom edge of the first deployable side panel, and wherein the first deployable side panel may include two rigid portions on opposite sides of the first flexible interior portion; and wherein the flexible interior portion may enable the two rigid portions of the first deployable side panel to flex relative to each other when the first deployable side panel encounters an obstacle.

A fairing structure for use with vehicles may be summarized as including: a deployable upper panel assembly comprising at a deployable upper panel, a first upper wing panel and at least a second upper wing panel, the first upper wing panel and the second upper wing panel each pivotally coupled to the deployable upper panel, the deployable upper panel having a leading edge, a trailing edge, and pivotal about a horizontal axis to move between a retracted configuration of the fairing structure in which the deployable upper panel is tilted relatively downwards from the horizontal axis with the trailing edge of the deployable upper panel positioned relatively below the leading edge of the deployable upper panel and a deployed configuration of the fairing structure in which the deployable upper panel extends rearwardly of the horizontal axis and is tilted relatively upwards from the horizontal axis with the trailing edge of the deployable upper panel positioned relatively above the leading edge of the deployable upper panel; at least a first deployable side panel, the first deployable side panel coupled to translate and pivot in moving between the retracted configuration of the fairing structure and the deployed configuration of the fairing structure; and at least a second deployable side panel, the second deployable side panel coupled to translate and pivot in moving between the retracted configuration of the fairing structure and the deployed configuration of the fairing structure.

In the deployed configuration, the first deployable side panel and the second deployable side panel may each taper outwardly in a direction going from a front of the fairing structure toward a rear of the fairing structure. The first deployable side panel may be pivotally coupled to the deployable upper panel assembly and the second deployable side panel may be pivotally coupled to the deployable upper panel assembly. The first deployable side panel may be pivotable about an axis that extends parallel to the proximal edge of the first deployable side panel and the second deployable side panel may be pivotable about an axis that extends parallel to the proximal edge of the second deployable side panel. The axis that the first deployable side panel is pivotable about may be spaced from the proximal edge of the first deployable side panel at least in the deployed configuration of the fairing structure and the axis that the second deployable side panel is pivotable about may be spaced from the proximal edge of the second deployable side panel at least in the deployed configuration of the fairing structure. The first deployable side panel may be pivotable about an axis that is perpendicular to the horizontal axis and the second deployable side panel may be pivotable about an axis that is perpendicular to the horizontal axis. The first deployable side panel may be coupled to translate and pivot without any hinge extending along the proximal edge of the first deployable side panel and the second deployable side panel may be coupled to translate and pivot without any hinge extending along the proximal edge of the second deployable side panel. The deployable upper panel may be a single trapezoidal panel with a trapezoidal profile.

The fairing structure may further include a single actuator, the single actuator coupled to the deployable upper panel and operable to selectively move the deployable upper panel between the retracted and the deployed configurations.

The fairing structure may further include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations.

The fairing may further include a third actuator, the third actuator coupled to the deployable upper panel and operable to selectively move the deployable upper panel between the retracted and the deployed configurations.

The fairing structure may further include: a first hinge comprising a base and an arm that is rotatably coupled to the base to pivot about a vertical axis with respect to the base between a retracted position and a deployed position, the first deployable side panel attached to the arm of the first hinge for movement therewith; and a second hinge comprising a base and an arm that is rotatably coupled to the base to pivot about a vertical axis with respect to the base between a retracted position and a deployed position, the second deployable side panel attached to the arm of the second hinge for movement therewith.

The fairing structure may further include at least a third hinge having a horizontal axis of rotation that is perpendicular to vertical axes of rotation of the first and the second hinges, the third hinge coupled to the deployable upper panel.

The fairing structure may further include a static upper panel, wherein the deployable upper panel assembly is pivotally coupled at the static upper panel and is pivotal thereabout the horizontal axis.

A fairing structure for use with vehicles having cabs with backs may be summarized as including: a deployable upper panel assembly comprising at a deployable upper panel, a first upper wing panel and at least a second upper wing panel, the first upper wing panel and the second upper wing panel each pivotally coupled to the deployable upper panel, the deployable upper panel having a leading edge, a trailing edge, and pivotal about a horizontal axis to move between a retracted configuration of the fairing structure in which the deployable upper panel extends rearwardly at a negative slope from a back of the cab of the vehicle and a deployed configuration of the fairing structure in which the deployable upper panel extends rearwardly at a positive slope from the back of the cab of the vehicle; at least a first deployable side panel, the first deployable side panel coupled to translate and pivot in moving between the retracted configuration of the fairing structure and the deployed configuration of the fairing structure; and at least a second deployable side panel, the second deployable side panel coupled to translate and pivot in moving between the retracted configuration of the fairing structure and the deployed configuration of the fairing structure.

In the deployed configuration, the deployable upper panel may extend rearwardly of the horizontal axis and may be tilted relatively upwards from the horizontal axis. In the deployed configuration, the first deployable side panel and the second deployable side panel may each taper outwardly in a direction going from a front of the fairing structure toward a rear of the fairing structure. The first deployable side panel may be pivotally coupled to the deployable upper panel assembly and the second deployable side panel may be pivotally coupled to the deployable upper panel assembly. The first deployable side panel may be pivotable about an axis that extends parallel to the proximal edge of the first deployable side panel and the second deployable side panel may be pivotable about an axis that extends parallel to the proximal edge of the second deployable side panel. The axis that the first deployable side panel is pivotable about may be spaced from the proximal edge of the first deployable side panel at least in the deployed configuration of the fairing structure and the axis that the second deployable side panel is pivotable about may be spaced from the proximal edge of the second deployable side panel at least in the deployed configuration of the fairing structure. The first deployable side panel may be pivotable about an axis that is perpendicular to the horizontal axis and the second deployable side panel may be pivotable about an axis that is perpendicular to the horizontal axis. The first deployable side panel may be coupled to translate and pivot without any hinge extending parallel along the proximal edge of the first deployable side panel and the second deployable side panel may be coupled to translate and pivot without any hinge extending along the proximal edge of the second deployable side panel. The deployable upper panel may be a single trapezoidal panel with a trapezoidal profile.

The fairing structure may further include a single actuator, the single actuator coupled to the deployable upper panel and operable to selectively move the deployable upper panel between the retracted and the deployed configurations.

The fairing structure may further include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations.

The fairing structure may further include a third actuator, the third actuator coupled to the deployable upper panel and operable to selectively move the deployable upper panel between the retracted and the deployed configurations.

The fairing structure may further include: a first hinge comprising a base and an arm that is rotatably coupled to the base to pivot about a vertical axis with respect to the base between a retracted position and a deployed position, the first deployable side panel attached to the arm of the first hinge for movement therewith; and a second hinge comprising a base and an arm that is rotatably coupled to the base to pivot about a vertical axis with respect to the base between a retracted position and a deployed position, the second deployable side panel attached to the arm of the second hinge for movement therewith.

The fairing structure may further include at least a third hinge having a horizontal axis of rotation that is perpendicular to vertical axes of rotation of the first and the second hinges, the third hinge coupled to the deployable upper panel.

A fairing structure for use with vehicles may be summarized as including: a deployable upper panel assembly comprising at a deployable upper panel, a first upper wing panel and at least a second upper wing panel, the first upper wing panel and the second upper wing panel each pivotally coupled to the deployable upper panel, the deployable upper panel pivotal about a horizontal axis to move between a retracted configuration of the fairing structure and a deployed configuration of the fairing structure in which the deployable upper panel extends rearwardly from a front of the fairing structure towards a rear of the fairing structure; at least a first deployable side panel, the first deployable side panel coupled to translate and pivot in moving between the retracted configuration of the fairing structure and the deployed configuration of the fairing structure in which the first deployable side panel extends rearwardly from the front of the fairing structure; and at least a second deployable side panel, the second deployable side panel coupled to translate and pivot in moving between the retracted configuration of the fairing structure and the deployed configuration of the fairing structure in which the second deployable side panel extends rearwardly from the front of the fairing structure, wherein, an area enclosed by a first perimeter defined by the deployable upper panel and the first and the second deployable side panels distal to the front of the fairing structure is greater than an area enclosed by a second perimeter defined by the deployable upper panel and the first and the second deployable side panels proximate the front of the fairing structure.

In the deployed configuration, the deployable upper panel may extend rearwardly of the horizontal axis and may be tilted relatively upwards from the horizontal axis. In the deployed configuration, the first deployable side panel and the second deployable side panel may each taper outwardly in a direction going from the front of the fairing structure toward the rear of the fairing structure. The first deployable side panel may be pivotally coupled to the deployable upper panel assembly and the second deployable side panel may be pivotally coupled to the deployable upper panel assembly. The first deployable side panel may be pivotable about an axis that extends parallel to the proximal edge of the first deployable side panel and the second deployable side panel may be pivotable about an axis that extends parallel to the proximal edge of the second deployable side panel. The axis that the first deployable side panel is pivotable about may be spaced from the proximal edge of the first deployable side panel at least in the deployed configuration of the fairing structure and the axis that the second deployable side panel is pivotable about may be spaced from the proximal edge of the second deployable side panel at least in the deployed configuration of the fairing structure. The first deployable side panel may be pivotable about an axis that is perpendicular to the horizontal axis and the second deployable side panel may be pivotable about an axis that is perpendicular to the horizontal axis. The first deployable side panel may be coupled to translate and pivot without any hinge extending along the proximal edge of the first deployable side panel and the second deployable side panel may be coupled to translate and pivot without any hinge extending parallel along the proximal edge of the second deployable side panel. The deployable upper panel may be a single trapezoidal panel with a trapezoidal profile.

The fairing structure may further include a single actuator, the single actuator coupled to the deployable upper panel and operable to selectively move the deployable upper panel between the retracted and the deployed configurations.

The fairing structure may further include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations.

The fairing structure may further include a third actuator, the third actuator coupled to the deployable upper panel and operable to selectively move the deployable upper panel between the retracted and the deployed configurations.

The fairing structure may further include: a first hinge comprising a base and an arm that is rotatably coupled to the base to pivot about a vertical axis with respect to the base between a retracted position and a deployed position, the first deployable side panel attached to the arm of the first hinge for movement therewith; and a second hinge comprising a base and an arm that is rotatably coupled to the base to pivot about a vertical axis with respect to the base between a retracted position and a deployed position, the second deployable side panel attached to the arm of the second hinge for movement therewith.

The fairing structure may further include at least a third hinge having a horizontal axis of rotation that is perpendicular to vertical axes of rotation of the first and the second hinges, the third hinge coupled to the deployable upper panel.

A fairing structure for use with a vehicle may be summarized as including: a deployable upper panel assembly comprising a deployable upper panel, a first upper wing panel and at least a second upper wing panel, the first upper wing panel and the second upper wing panel each pivotally coupled to the deployable upper panel, the deployable upper panel pivotal about a first axis to move the deployable upper panel assembly between a retracted position in a retracted configuration of the fairing structure and a deployed position in a deployed configuration of the fairing structure; at least a first deployable side panel; at least a second deployable side panel; a first hinge comprising a base and an arm that is rotatably coupled to the base to pivot about a respective first hinge axis with respect to the base between a retracted position and a deployed position, the first deployable side panel attached to the arm of the first hinge for movement therewith to translate and pivot in transitioning between the retracted configuration of the fairing structure and the deployed configuration of the fairing structure; a second hinge comprising a base and an arm that is rotatably coupled to the base to pivot about a respective second hinge axis with respect to the base between a retracted position and a deployed position, the second deployable side panel attached to the arm of the second hinge for movement therewith to translate and pivot in transitioning between the retracted configuration of the fairing structure and the deployed configuration of the fairing structure; and at least one actuator coupled to at least one of the deployable upper panel, the first deployable side panel or the second deployable side panel, and operable to transition the fairing structure between the retracted configuration of the fairing structure and the deployed configuration of the fairing structure.

The deployable upper panel may be a single trapezoidal panel with a trapezoidal profile. The at least one actuator may include a single actuator, the single actuator coupled to the deployable upper panel and operable to selectively move the deployable upper panel between the retracted and the deployed configurations. The at least one actuator may include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations. There may be exactly two actuators. The at least one actuator may further include a third actuator having a first end and a second end, the second end opposed to the first end, the second end of the third actuator pivotally coupled to the deployable upper panel. There may be exactly three actuators. The first end of the third actuator may be attached to a back portion of a cab of a tractor of the vehicle.

The fairing structure may further include at least a third hinge having a horizontal axis of rotation that is perpendicular to the first and the second hinge axes of the first and the second hinges, the third hinge coupled to the deployable upper panel.

The at least one actuator may include: a first actuator having a first end and a second end, the second end opposed to the first end, the first end of the first actuator pivotally coupled to the base of the first hinge and the second end of the first actuator pivotally coupled to the arm of the first hinge at a position on the arm of the first hinge that is spaced from the base of the first hinge; and a second actuator having a first end and a second end, the second end opposed to the first end, the first end of the second actuator pivotally coupled to the base of the second hinge and the second end of the second actuator pivotally coupled to the arm of the second hinge at a position on the arm of the second hinge that is spaced from the base of the first hinge. The at least one actuator may include: a first actuator having a first end and a second end, the second end opposed to the first end, the first end of the first actuator pivotally coupled to either the base of the first hinge or a back of a cab of the vehicle and the second end of the first actuator pivotally coupled to either the arm of the first hinge at a position on the arm of the first hinge that is spaced from the base of the first hinge or to the first deployable side panel; and a second actuator having a first end and a second end, the second end opposed to the first end, the first end of the second actuator pivotally coupled to either the base of the second hinge or the back of the cab of the vehicle and the second end of the second actuator pivotally coupled to either the arm of the second hinge at a position on the arm of the second hinge that is spaced from the base of the second hinge or to the second deployable side panel. The first actuator may be a first piston and cylinder pair, and the second actuator may be a second piston and cylinder pair. The first actuator may be a first solenoid or electric motor, and the second actuator may be a second solenoid or electric motor. The first deployable side panel may be pivotal about a respective single axis of rotation and the second deployable side panel may be pivotal about a respective single axis of rotation. The first deployable side panel may have a proximal edge that is an edge of the first deployable side panel that is closest to a back of a cab of a tractor of the vehicle in the deployed configuration, and the second deployable side panel may have a proximal edge that is an edge of the second deployable side panel that is closest to the back of the cab of the tractor of the vehicle in the deployed configuration. The proximal edge of the first deployable side panel may be spaced along the arm of the first hinge from the base of the first hinge and the proximal edge of the second deployable side panel may be spaced along the arm of the second hinge from the base of the second hinge. The proximal edge of the first deployable side panel may be spaced along the arm of the first hinge from the base of the first hinge by at least 2 inches and the proximal edge of the second deployable side panel may be spaced along the arm of the second hinge from the base of the second hinge by at least 2 inches. The proximal edge of the first deployable side panel may be spaced along the arm of the first hinge from the base of the first hinge by a distance that is at least ½ inch longer than a length of a cab fairing that extends rearwardly from the cab of the tractor of the vehicle and the proximal edge of the second deployable side panel may be spaced along the arm of the second hinge from the base of the second hinge by a distance that is at least ½ inch longer than the length of the cab fairing that extends rearwardly form the cab of the tractor of the vehicle. The base of the first hinge may be attachable to a back of a cab of a tractor of the vehicle and the base of the second hinge may be attachable to the back of the cab of the tractor of the vehicle. In the deployed configuration, the deployable upper panel may extend rearwardly at a positive slope from a back of the cab of a tractor of the vehicle. In the deployed configuration, the first and the second deployable side panels may extend rearwardly at a positive slope from the back of the cab of the tractor of the vehicle. In the deployed configuration, the deployable upper panel may extend rearwardly from a back of a cab of a tractor of the vehicle and the first and the second deployable side panels may extend rearwardly from the back of the cab of the tractor of the vehicle, an area enclosed by a first perimeter defined by the deployable upper panel and the first and the second deployable side panels distal to the back of the cab of the tractor greater than an area enclosed by a second perimeter defined by the deployable upper panel and the first and the second deployable side panels proximate the back of the cab of the tractor.

A fairing structure for use with a vehicle may be summarized as including: a deployable upper panel assembly comprising a deployable upper panel, a first upper wing panel and at least a second upper wing panel, the first upper wing panel and the second upper wing panel each pivotally coupled to the deployable upper panel; at least a first deployable flexible side panel; at least a second deployable flexible side panel; a plurality of hinges that couple the deployable upper panel to pivot about a first axis of rotation to move the deployable upper panel assembly between a retracted position in a retracted configuration of the fairing structure and a deployed position in a deployed configuration of the fairing structure, couple the first deployable flexible side panel to translate and to pivot about a second axis of rotation to move the first deployable flexible side panel between a retracted position in a retracted configuration of the fairing structure and a deployed position in a deployed configuration of the fairing structure, and couple the second deployable flexible side panel to translate and to pivot about a third axis of rotation to move the second deployable flexible side panel between a retracted position in a retracted configuration of the fairing structure and a deployed position in a deployed configuration of the fairing structure; and at least one actuator coupled to drive at least one of the deployable upper panel, the first deployable flexible side panel, or the second deployable flexible side panel, the fairing structure kinematically over-constrained but for a combined flexibility of the first deployable flexible side panel, and the second deployable flexible side panel.

The deployable upper panel may be a single trapezoidal panel with a trapezoidal profile. The at least one actuator may include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations.

There may be exactly two actuators. The at least one actuator may further include a third actuator having a first end and a second end, the second end opposed to the first end, the second end of the third actuator pivotally coupled to the deployable upper panel. There may be exactly three actuators. There may be only one hinge that directly attaches the first deployable side panel to the vehicle and only one hinge that directly attaches the second deployable side panel to the vehicle. The only one hinge that directly attaches the first deployable side panel to the vehicle may be a first hinge having a base and an arm that is pivotally moveable with respect to the base of the first hinge, the only one hinge that directly attaches the second deployable side panel to the vehicle may be a second hinge having a base and an arm that is pivotally moveable with respect to the base of the second hinge, and the at least one actuator may include a first actuator and a second actuator, the first actuator having a first end and a second end, the first end of the first actuator pivotally coupled to the base of the first hinge and the second end of the first actuator pivotally coupled to the arm of the first hinge at a position on the arm of the first hinge that is spaced from the base of the first hinge, the second actuator having a first end and a second end, the first end of the second actuator pivotally coupled to the base of the second hinge and the second end of the second actuator pivotally coupled to the arm of the second hinge at a position on the arm of the second hinge that is spaced from the base of the second hinge. There may be one or more hinges that directly attach the deployable upper panel to the vehicle, and the plurality of actuators may include a third actuator, the third actuator having a first end and a second end, the first end of the third actuator pivotally coupled to the deployable upper panel and the second end of the third actuator pivotally coupled to a back of a cab of the vehicle. The arm of the first hinge may be rotatably coupled to the base of the first hinge to pivot with respect to the base about the first axis of rotation between the retracted position and the deployed position, the first deployable flexible side panel attached to the arm of the first hinge for movement therewith, and the arm of the second hinge may be rotatably coupled to the base of the second hinge to pivot with respect to the base of the second hinge about the second axis of rotation between the retracted position and the deployed position, the second deployable flexible side panel attached to the arm of the second hinge for movement therewith. The plurality of hinges may include at least a third hinge, the first axis of rotation that is perpendicular to second and the third axes of rotation of the first and the second hinges, the third hinge coupled to the deployable upper panel. In the deployed configuration, the deployable upper panel extends rearwardly and upwardly at a positive slope from a back of the cab of a tractor of the vehicle and the first and the second deployable flexible side panels extend rearwardly and outwardly at a positive slope from the back of the cab of the tractor of the vehicle. In the deployed configuration, the deployable upper panel extends rearwardly from a back of a cab of a tractor of the vehicle and the first and the second flexible deployable side panels extend rearwardly from the back of the cab of the tractor of the vehicle, an area enclosed by a first perimeter defined by the deployable upper panel and the first and the second deployable flexible side panels distal to the back of the cab of the tractor greater than an area enclosed by a second perimeter defined by the deployable upper panel and the first and the second deployable flexible side panels proximate the back of the cab of the tractor. The first and the second deployable flexible side panels may each comprise a respective skin. The respective skins of the first and the second deployable flexible side panels may each comprise glass reinforced plastic (e.g., polypropylene and glass fiber). The first and the second deployable flexible side panels may each comprise a respective frame to which the respective skin is attached. The respective frames of the first and the second deployable flexible side panels may each comprise at least one tube.

The fairing structure may further include a set of resilient shock absorbers interposed between the first and the second deployable flexible side panels and respective ones of the plurality of hinges to which the first and the second deployable flexible side panels are attached.

The deployable upper panel may be a flexible deployable upper panel.

The fairing structure may further include a controller coupled to control a supply of fluid to the at least one actuator, and to cause the at least one actuator to i) retract the first deployable flexible side panel sufficiently to elastically deform the first deployable flexible side panel without plastic deformation to either the first deployable flexible side panel, the deployable upper panel, or the first upper wing panel and ii) retract the second deployable flexible side panel sufficiently to elastically deform the second deployable flexible side panel without plastic deformation to either the second deployable flexible side panel, the deployable upper panel, or the second upper wing panel.

A fairing structure for use with a vehicle may be summarized as including: a deployable upper panel assembly comprising a deployable upper panel; a first deployable flexible side panel; a second deployable flexible side panel; a plurality of hinges that couple the deployable upper panel to pivot about a first axis of rotation to move the deployable upper panel assembly between a retracted position in a retracted configuration of the fairing structure and a deployed position in a deployed configuration of the fairing structure, couple the first deployable flexible side panel to translate and to pivot about a second axis of rotation to move the first deployable flexible side panel between a retracted position in a retracted configuration of the fairing structure and a deployed position in a deployed configuration of the fairing structure, and couple the second deployable flexible side panel to translate and to pivot about a third axis of rotation to move the second deployable flexible side panel between a retracted position in a retracted configuration of the fairing structure and a deployed position in a deployed configuration of the fairing structure; and at least one actuator coupled to drive at least one of the deployable upper panel, the first deployable flexible side panel, or the second deployable flexible side panel, in the retracted configuration the first deployable flexible side panel elastically deforms to load the first deployable flexible side panel without plastic deformation to either the first deployable flexible side panel, the deployable upper panel, or the first upper wing panel and the second deployable flexible side panel elastically deforms to load the second deployable flexible side panel without plastic deformation to either the second deployable flexible side panel, the deployable upper panel, or the second upper wing panel.

The deployable upper panel may be a single trapezoidal panel with a trapezoidal profile. The deployable upper panel assembly may further include a first upper wing panel and at least a second upper wing panel, the first upper wing panel and the second upper wing panel each pivotally coupled to the deployable upper panel. The at least one actuator may include: a first actuator, the first actuator coupled to the first deployable side panel and operable to selectively move the first deployable side panel between the retracted and the deployed configurations; and a second actuator, the second actuator coupled to the second deployable side panel and operable to selectively move the second deployable side panel between the retracted and the deployed configurations. There may be exactly two actuators. The at least one actuator may further include a third actuator having a first end and a second end, the second end opposed to the first end, the second end of the third actuator pivotally coupled to the deployable upper panel. There may be exactly three actuators. There may be only one hinge that directly attaches the first deployable side panel to the vehicle and only one hinge that directly attaches the second deployable side panel to the vehicle. The only one hinge that directly attaches the first deployable side panel to the vehicle may be a first hinge having a base and an arm that is pivotally moveable with respect to the base of the first hinge, the only one hinge that directly attaches the second deployable side panel to the vehicle may be a second hinge having a base and an arm that is pivotally moveable with respect to the base of the second hinge, and the at least one actuator may include a first actuator and a second actuator, the first actuator having a first end and a second end, the first end of the first actuator pivotally coupled to the base of the first hinge and the second end of the first actuator pivotally coupled to the arm of the first hinge at a position on the arm of the first hinge that is spaced from the base of the first hinge, the second actuator having a first end and a second end, the first end of the second actuator pivotally coupled to the base of the second hinge and the second end of the second actuator pivotally coupled to the arm of the second hinge at a position on the arm of the second hinge that is spaced from the base of the second hinge. There may be one or more hinges that directly attaches the deployable upper panel to the vehicle, and the plurality of actuators may include a third actuator, the third actuator having a first end and a second end, the first end of the third actuator pivotally coupled to the deployable upper panel and the second end of the third actuator pivotally coupled to a back of a cab of the vehicle. The arm of the first hinge may be rotatably coupled to the base of the first hinge to pivot with respect to the base about the first axis of rotation between the retracted position and the deployed position, the first deployable flexible side panel attached to the arm of the first hinge for movement therewith, and the arm of the second hinge may be rotatably coupled to the base of the second hinge to pivot with respect to the base of the second hinge about the second axis of rotation between the retracted position and the deployed position, the second deployable flexible side panel attached to the arm of the second hinge for movement therewith. The plurality of hinges may include at least a third hinge rotatable about the first axis of rotation that is perpendicular to the second and the third axes of rotation of the first and the second hinges, the third hinge coupled to the deployable upper panel. In the deployed configuration, the deployable upper panel may extend rearwardly and upwardly at a positive slope from a back of the cab of a tractor of the vehicle and the first and the second deployable flexible side panels may extend rearwardly and outwardly at a positive slope from the back of the cab of the tractor of the vehicle. In the deployed configuration, the deployable upper panel may extend rearwardly from a back of a cab of a tractor of the vehicle and the first and the second flexible deployable side panels may extend rearwardly from the back of the cab of the tractor of the vehicle, an area enclosed by a first perimeter defined by the deployable upper panel and the first and the second deployable flexible side panels distal to the back of the cab of the tractor greater than an area enclosed by a second perimeter defined by the deployable upper panel and the first and the second deployable flexible side panels proximate the back of the cab of the tractor. The first and the second deployable flexible side panels may each comprise a respective skin. The respective skins of the first and the second deployable flexible side panels may each comprise glass reinforced plastic (e.g., polypropylene and glass fiber). The first and the second deployable flexible side panels may each comprise a respective frame to which the respective skin is attached. The respective frames of the first and the second deployable flexible side panels may each comprise at least one tube.

The fairing structure may further include a set of resilient shock absorbers interposed between the first and the second deployable flexible side panels and respective ones of the plurality of hinges to which the first and the second deployable flexible side panels are attached.

The deployable upper panel may be a flexible deployable upper panel.

The fairing structure may further include: a controller coupled to control a supply of fluid to the at least one actuator, and to cause the at least one actuator to i) retract the first deployable flexible side panel sufficiently to elastically deform the first deployable flexible side panel without plastic deformation to either the first deployable flexible side panel or the deployable upper panel and ii) retract the second deployable flexible side panel sufficiently to elastically deform the second deployable flexible side panel without plastic deformation to either the second deployable flexible side panel or the deployable upper panel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

FIG. 7A is a right side elevational view of the deployable fairing of FIG. 5A in the deployed configuration.

FIG. 7B is a right side elevational view of the deployable fairing of FIG. 5A in an intermediary or partially deployed configuration.

FIG. 7C is a right side elevational view of the deployable fairing of FIG. 5A in a retracted or un-deployed configuration.

FIG. 14B is an elevational view of the side panel of FIG. 14A.

FIG. 14C is a plan view of the side panel of FIG. 14A.

FIG. 15B is an elevational view of the side panel of FIG. 15A.

FIG. 15C is a plan view of the side panel of FIG. 15A.

FIG. 16B is an elevational view of the side panel of FIG. 16A.

FIG. 16C is a plan view of the side panel of FIG. 16A.

FIG. 17B is an elevational view of the side panel of FIG. 17A.

FIG. 17C is a plan view of the side panel of FIG. 17A.

DETAILED DESCRIPTION

Figure 1A:
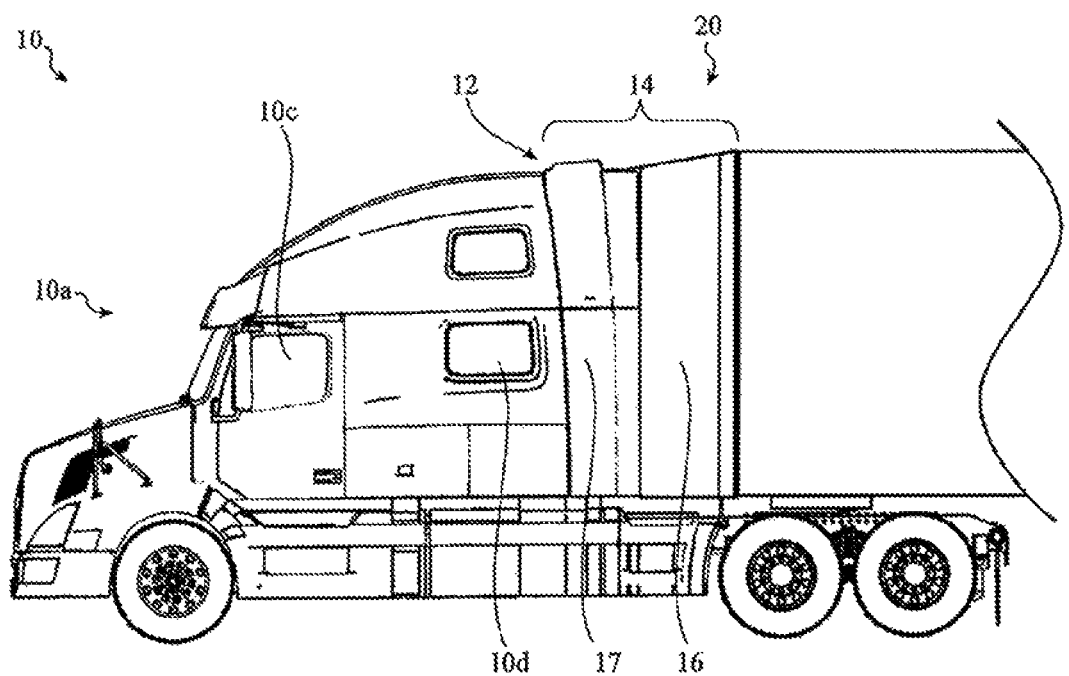
FIG. 1A is a left side elevational view of a coupled vehicle comprising a tractor and a trailer, and which employs deployable faring to close a gap between the tractor and the trailer, according to one illustrated embodiment, the deployable faring illustrated in a deployed configuration expanded proximate one of the vehicles.
Figure 2A:
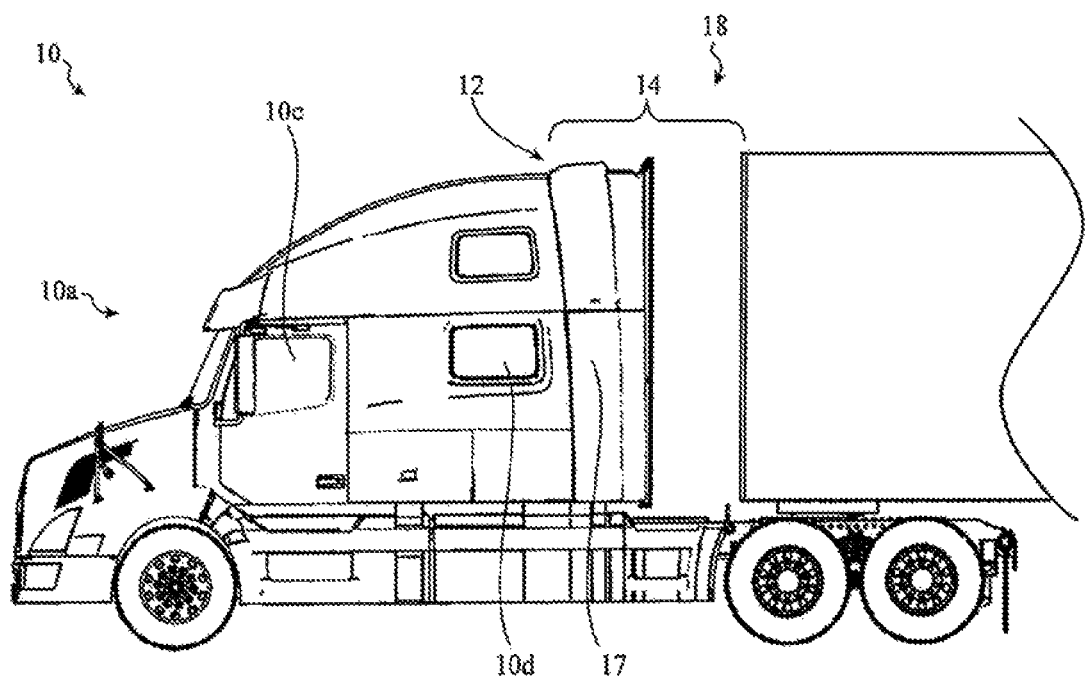
FIG. 2A is a left side elevational view of a coupled vehicle comprising a tractor and a trailer, and which employs deployable faring to close a gap between the tractor and the trailer, according to one illustrated embodiment, the deployable faring illustrated in a retracted or un-deployed configuration retracted against one of the vehicles.
Figure 1B:
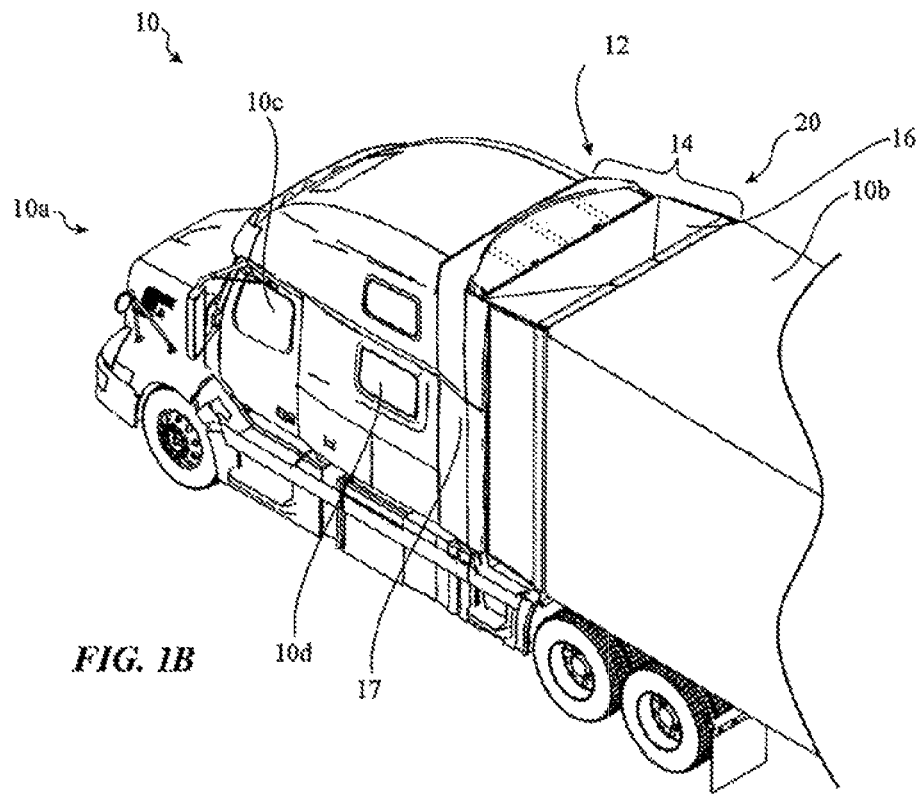
FIG. 1B is a rear, left side, isometric view of the coupled vehicle and deployable faring of FIG. 1A, the deployable faring illustrated in the deployed configuration.
Figure 2B:
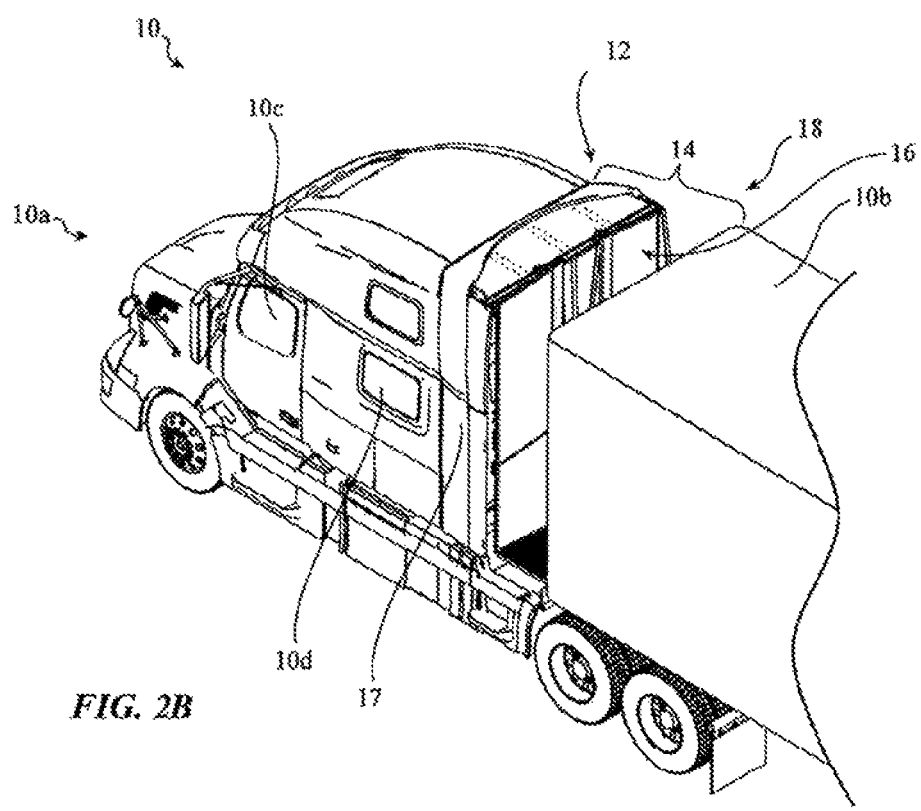
FIG. 2B is a rear, left side, isometric view of the coupled vehicle and deployable faring of FIG. 2A, the deployable faring illustrated in the retracted configuration.
Figure 1C:
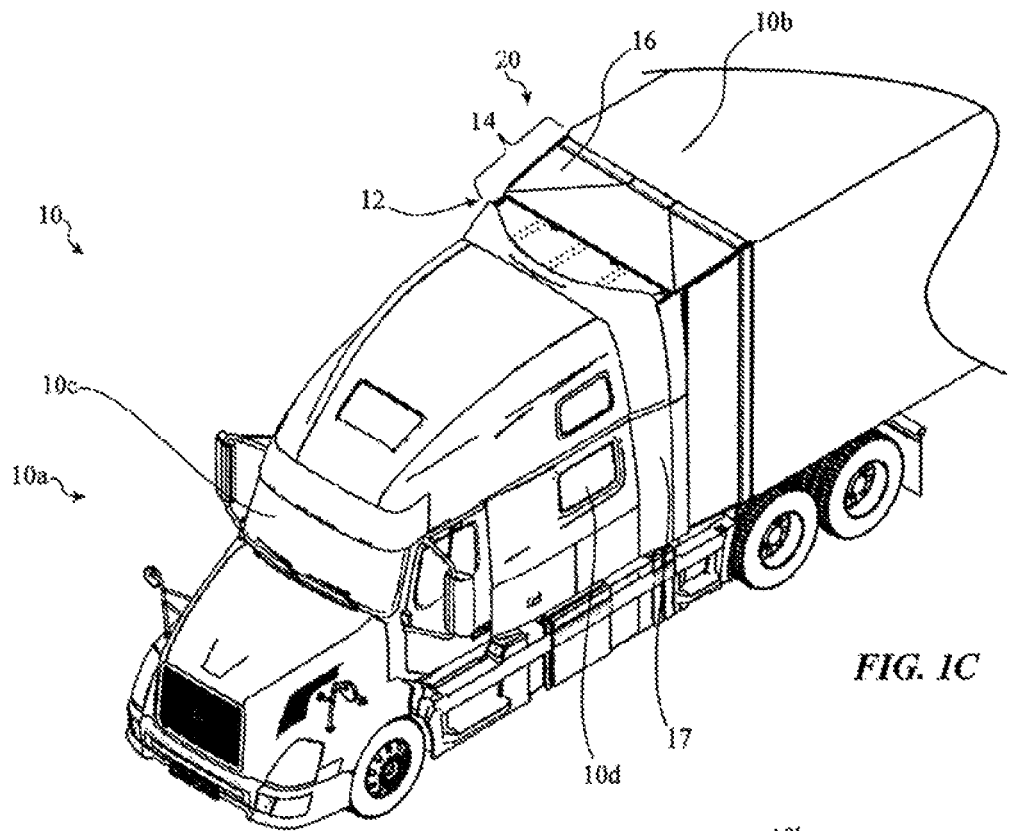
FIG. 1C is a front, left side, isometric view of the coupled vehicle and deployable faring of FIG. 1A, the deployable faring illustrated in the deployed configuration.
Figure 2C:
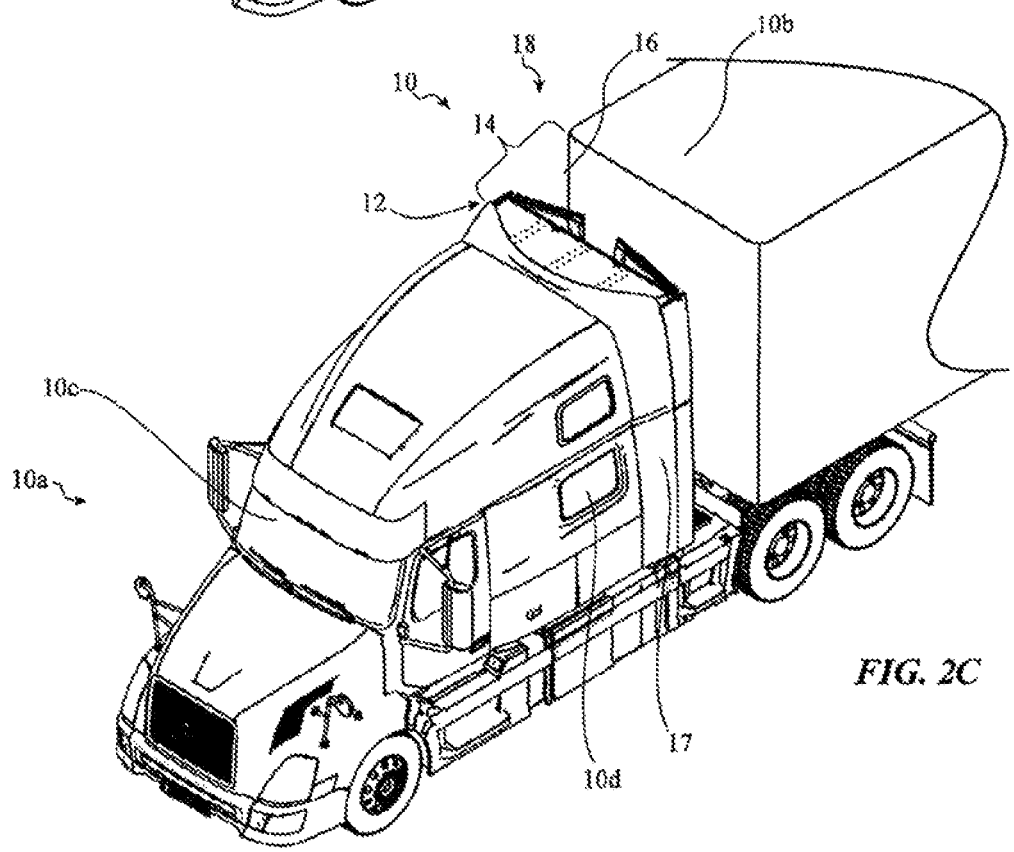
FIG. 2C is a front, left side, isometric view of the coupled vehicle and deployable faring of FIG. 2A, the deployable faring illustrated in the retracted configuration.
Figure 1D:
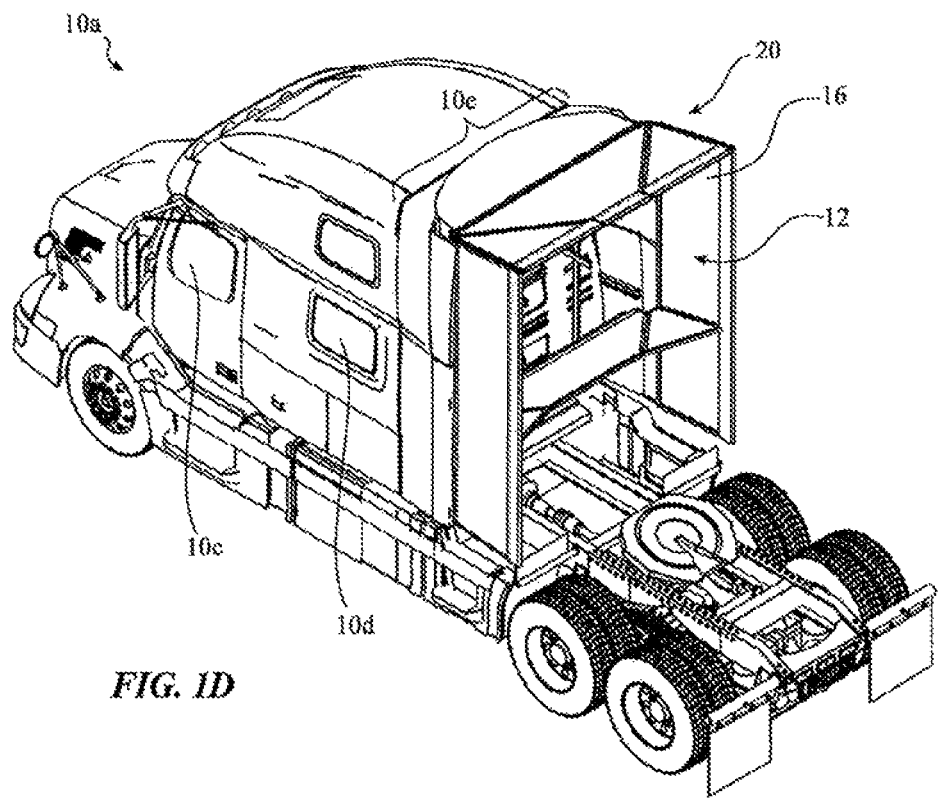
FIG. 1D is a rear, left side, isometric view of the tractor and deployable faring of FIG. 1A, the deployable faring illustrated in the deployed configuration.
Figure 2D:
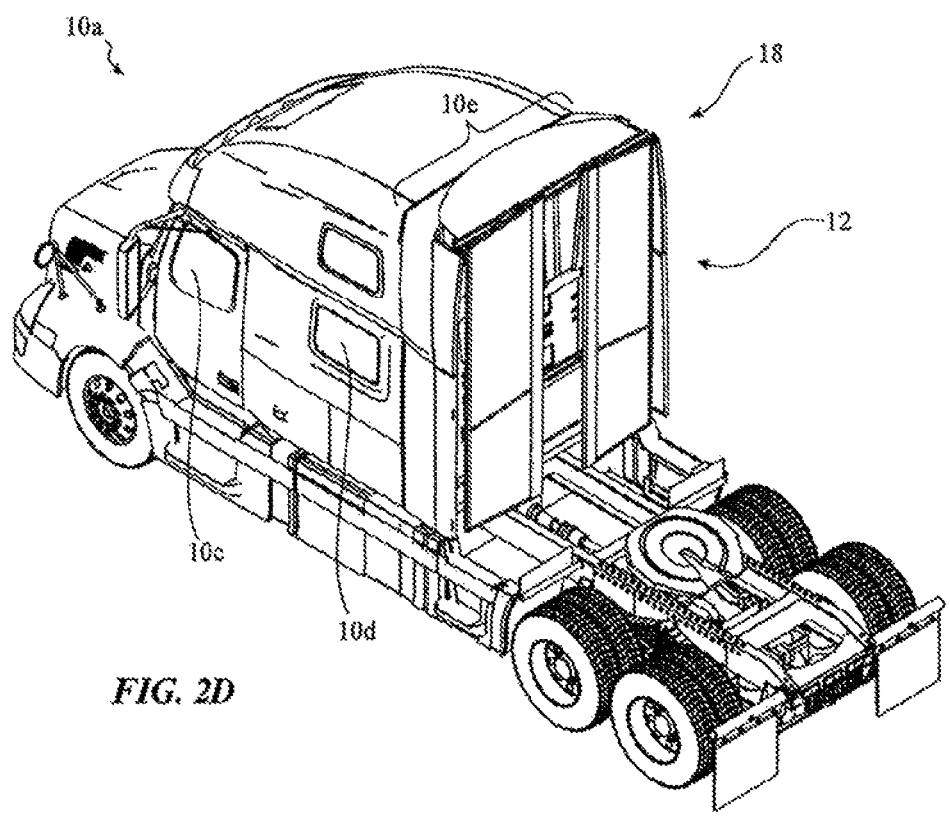
FIG. 2D is a rear, left side, isometric view of the tractor and deployable faring of FIG. 2A, the deployable faring illustrated in the retracted configuration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with coupled vehicles, for example tractor-trailer combinations, and with wireless communications have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "one implementation," "an embodiment," or "an implementation" means that a particular feature, structure or characteristic described in connection with the embodiment or implementation is included in at least one embodiment or one implementation. Thus, the appearances of the phrases "in one embodiment," "in one implementation," "in an embodiment," "or "in one implementation" in various places throughout this specification are not necessarily all referring to the same embodiment or to the same implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

This disclosure describes various apparatus, methods and articles related to increasing fuel efficiency for coupled vehicles. While described in terms of a tractor-trailer combination, such may be used in conjunction with other coupled vehicles.

FIGS. 1A, 1B, 1C, and 1D show a vehicle 10 in the form of a coupled vehicle comprising a tractor 10a and a trailer 10b, and a deployable fairing system 12 with a deployable fairing 16 shown in an extended or deployed configuration 20, according to one illustrated implementation. FIGS. 2A, 2B, 2C, and 2D show the coupled vehicle 10 with the deployable fairing 16 in a retracted or un-deployed configuration 18, according to one illustrated implementation.

The vehicle 10 includes, for example, a lead vehicle, which in typical operation is at the front or ahead of a trailing vehicle with respect to a direction of travel during normal operation. It is recognized that in some instances, the lead vehicle may at times be behind the trailing vehicle, for example when backing up. In the illustrated embodiment, the lead vehicle is the tractor 10a, which includes an engine (e.g., internal combustion diesel engine, not shown), a transmission (not shown), drive wheels, steering wheel, throttle (not shown), and brakes (not shown). The tractor 10a may be typical of those commonly used in long haul trucking within the United States, such as those manufactured and sold under the Kenworth and Peterbilt trademarks. The tractor 10a may include a cab 10c in which the driver or operator sits while driving or operating the tractor 10a. The tractor 10a may also include a sleeper cab 10d, located behind the cab 10c, which a driver or operator may use as a residence or sleep area when the tractor 10a is parked. The back of the tractor may have a width 10e. The tractor may have one or more ferrules, fairings, cowlings, air dams, deflectors, and/or spoilers located at various locations to reduce aerodynamic drag and thereby increase fuel efficiency.

The trailer 10b may take any of a variety of forms. For example, the trailer 10b may take the form of a semi-trailer, which includes a set of rear wheels, relying on the tractor 10a to support a portion of the weight of the trailer 10b at a front end of the trailer 10b, instead of having a front axle. The trailer 10b may take the form of a box trailer, or any variety of other types of trailers, for instance bus, curtain side, flatbed, "low boy", refrigerated or "reefer", tanker, dry bulk, car carrier, drop deck, "double decker" or sidelifter trailers.

The trailer 10b is physically coupled to the tractor 10a. For example, the tractor 10a may carry a fifth wheel, to which the trailer 10b is removably or detachably physically coupled. Fifth wheels include metal plates skid plates and jaws on one vehicle, usually the tractor, and which receive a kingpin carried by the other vehicle, usually the trailer. Fifth wheels are commonly employed in tractor trailer combinations 10, so will not be described in detail. There may be additional couplings between the tractor 10a or components thereof and the trailer 10b or components thereof. For example, there may be one or more electrical couplings, pneumatic couplings and/or hydraulic couplings. Such may, for example, provide electrical power or signals to the trailer 10b or component thereof, for instance a refrigeration system, turn signal indicators and/or brake lights. Such may, for example, supply pressurized fluid or air to the trailer 10b or a component thereof, for instance brakes.

Notably, a gap 14 exists between the tractor 10a and the trailer 10b. The gap 14 is sufficiently large as to allow the tractor-trailer combination 10 to maneuver as need, for example through surface streets of a city of town. For instance, the gap 14 may be approximately 1.5 meters or 4.5 feet in length. This gap 14 negatively affects aerodynamic and hence hinders fuel efficiency, particularly at higher speeds such as highway speeds (e.g., 55-75 mph). Without being bound to such, Applicant believes that closing the gap 14 may result in an approximately 8% reduction in fuel costs.

As illustrated, the deployable fairing system 12 includes a deployable fairing 16 and optionally a static cab fairing 17. As previously noted, FIGS. 2A-2D illustrate the deployable fairing 16 in an extended or deployed configuration 20. In particular, the deployable fairing 16 does not extend the full length of the gap 14 between the tractor 10a and trailer 10b in the un-deployed or unextended configuration or position 18, and in fact is preferably retracted to be close to the back of the cab 10c, 10d, for example against or proximate the static cab fairing 17. As previously noted, FIGS. 1A-1D illustrate the deployable fairing 16 in a deployed or extended configuration or position 20. In particular, the combination of the static cab fairing 17 and the deployable fairing 16 extends the full length or almost the full length of the gap 14 between the tractor 10a and trailer 10b when the deployable fairing 16 is in the deployed or extended configuration or position 20. Thus, the combination of the static cab fairing 17 and the deployable fairing 16 extends over halfway, and preferably over three quarters of the way or over seven eighths of the way across the gap 14.

As discussed in detail below, the deployable fairing system 12 can automatically selectively move the deployable fairing 16 between the un-deployed or unextended configuration or position 18 and the deployed or extended configuration or position 20 in response to, or based on, a speed or expected speed of at least one of the coupled vehicles 10a, 10b. Thus, the deployable fairing 16 may be in the deployed or extended configuration or position 20 when the tractor-trailer combination 10 is operating at relatively fast speeds or on roads or portions of roads where a posted speed limit is relatively fast or high. This can advantageously reduce aerodynamic drag, thereby increasing fuel efficiency. Likewise, the deployable fairing 16 may be in the un-deployed or unextended configuration or position 18 when the tractor-trailer combination 10 is operating at relatively slow speeds or on roads or portions of roads where a posted speed limit is relatively slow or low. This may advantageously improve maneuverability on such roads or during such times that maneuverability is most desired and when or where the gap 14 least adversely affects fuel efficiency.

Figure 3A:
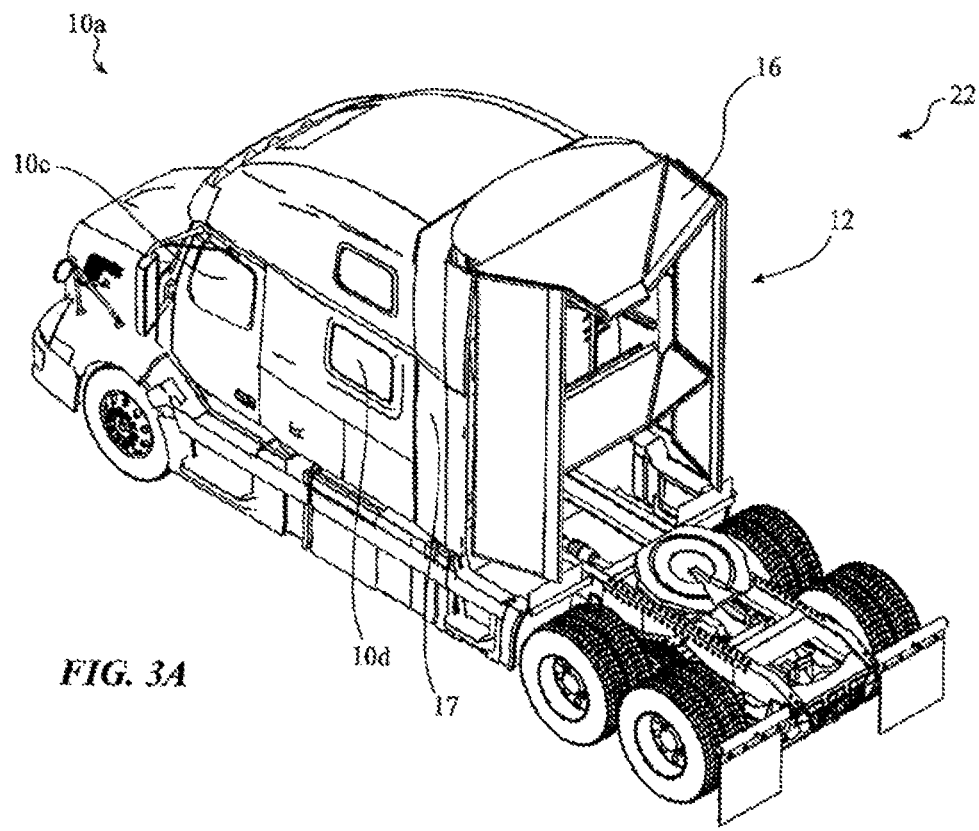
FIG. 3A is a rear, left side, isometric view of the tractor and deployable fairing of FIGS. 1D and 2D, with the deployable faring illustrated in an intermediate configuration, between the deployed and the retracted configurations.
Figure 3B:
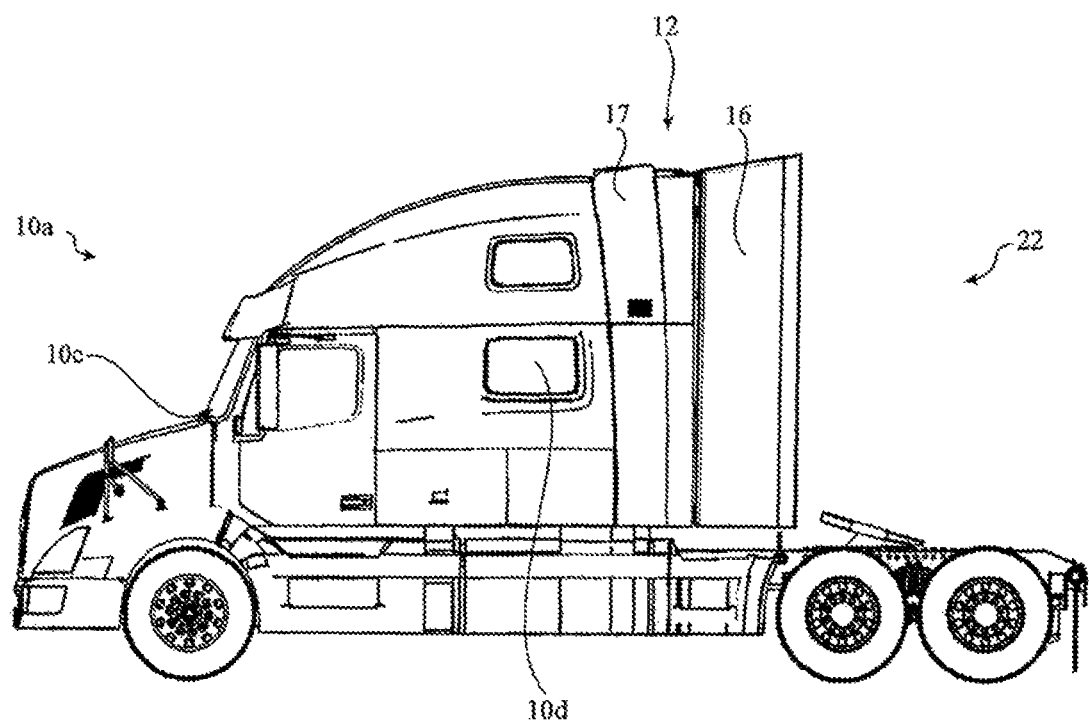
FIG. 3B is a left side elevational view of the tractor and deployable fairing of FIGS. 1D and 2D, with the deployable faring illustrated in an intermediate configuration, between the deployed and the retracted configurations.

FIGS. 3A and 3B show the tractor 10a, the static cab faring 17 and the deployable fairing 16 in a partially deployed or intermediate configuration 22. The deployable fairing 16 can, for example, take on the partially deployed or intermediate configuration 22 while moving or transiting between the deployed or extended configuration and the retracted or un-deployed configuration. Alternatively or additionally, the deployable fairing 16 can, for example, take on the partially deployed or intermediate configuration 22 when there is no trailer 10b coupled to the tractor 10a. Thus, in at least some instances the deployable fairing 16 can be moved from, for example, the retracted or un-deployed configuration 18 to the partially deployed or intermediate configuration 22 and held in the partially deployed or intermediate configuration 22, without moving to the deployed or extended configuration 20. Such may advantageously increase fuel efficiency even when the vehicle 10 is not a coupled vehicle or train of vehicles.

Figure 4A:
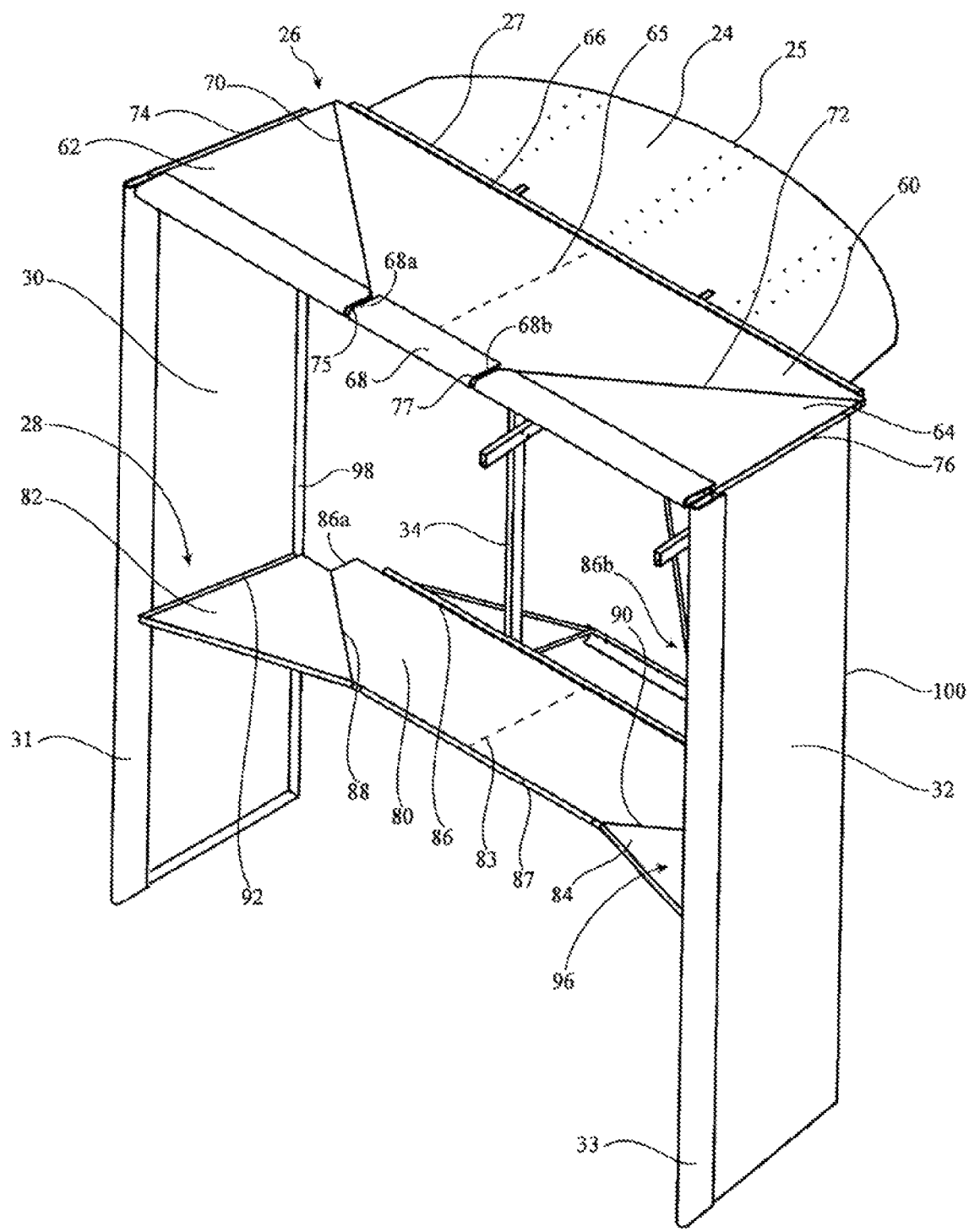
FIG. 4A is a top, rear, right side elevational view of a deployable fairing according to one illustrated implementation, which includes a static D-gap panel, upper and lower horizontal panel assemblies, left and right side panels, and a frame, the deployable fairing illustrated in the deployed configuration.
Figure 4B:
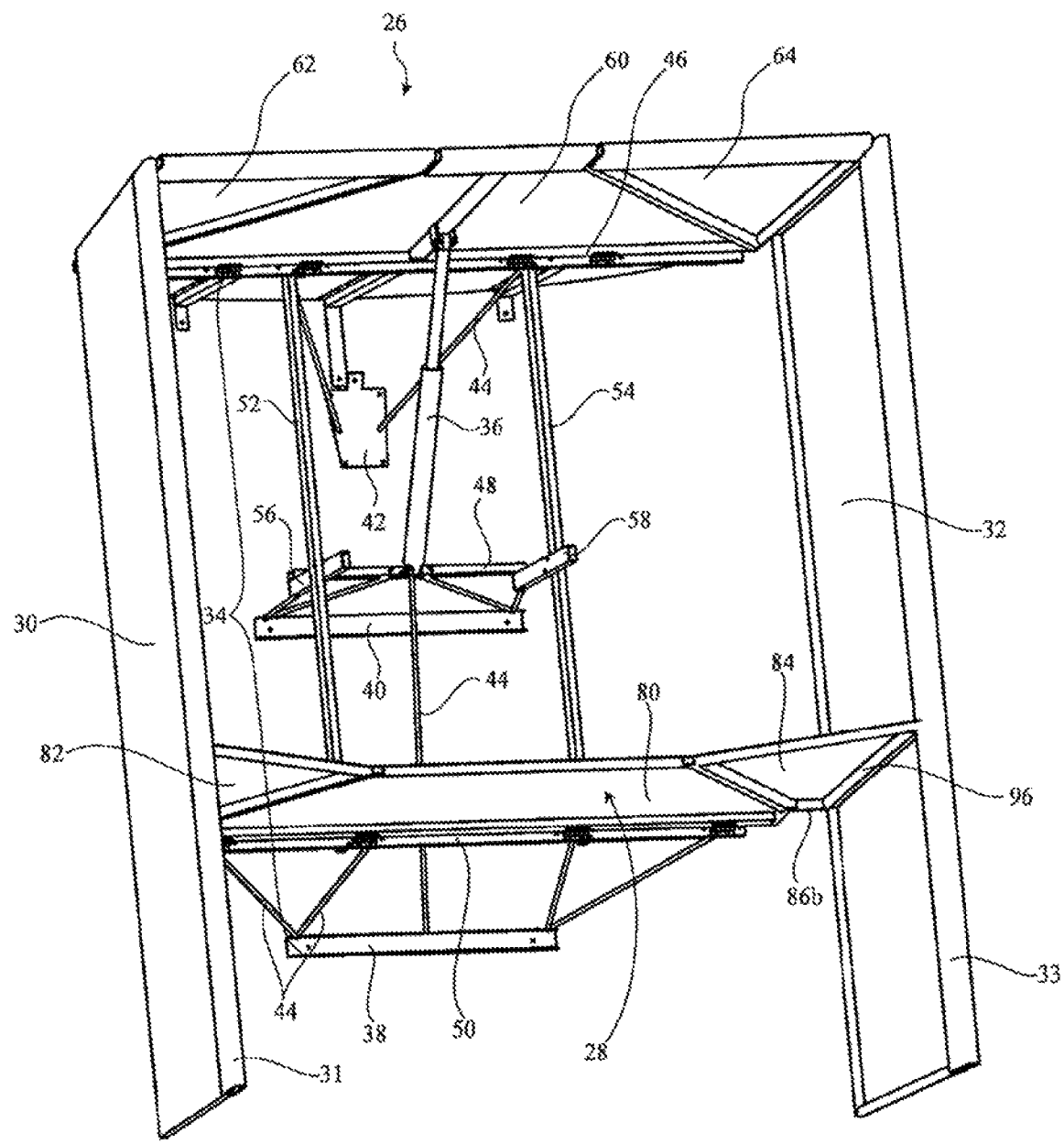
FIG. 4B is a bottom, rear, left side elevational view of a deployable fairing of FIG. 4A, which better illustrates a frame and an actuator selective operable to move the deployable fairing between the retracted and deployed configurations.
Figure 4C:
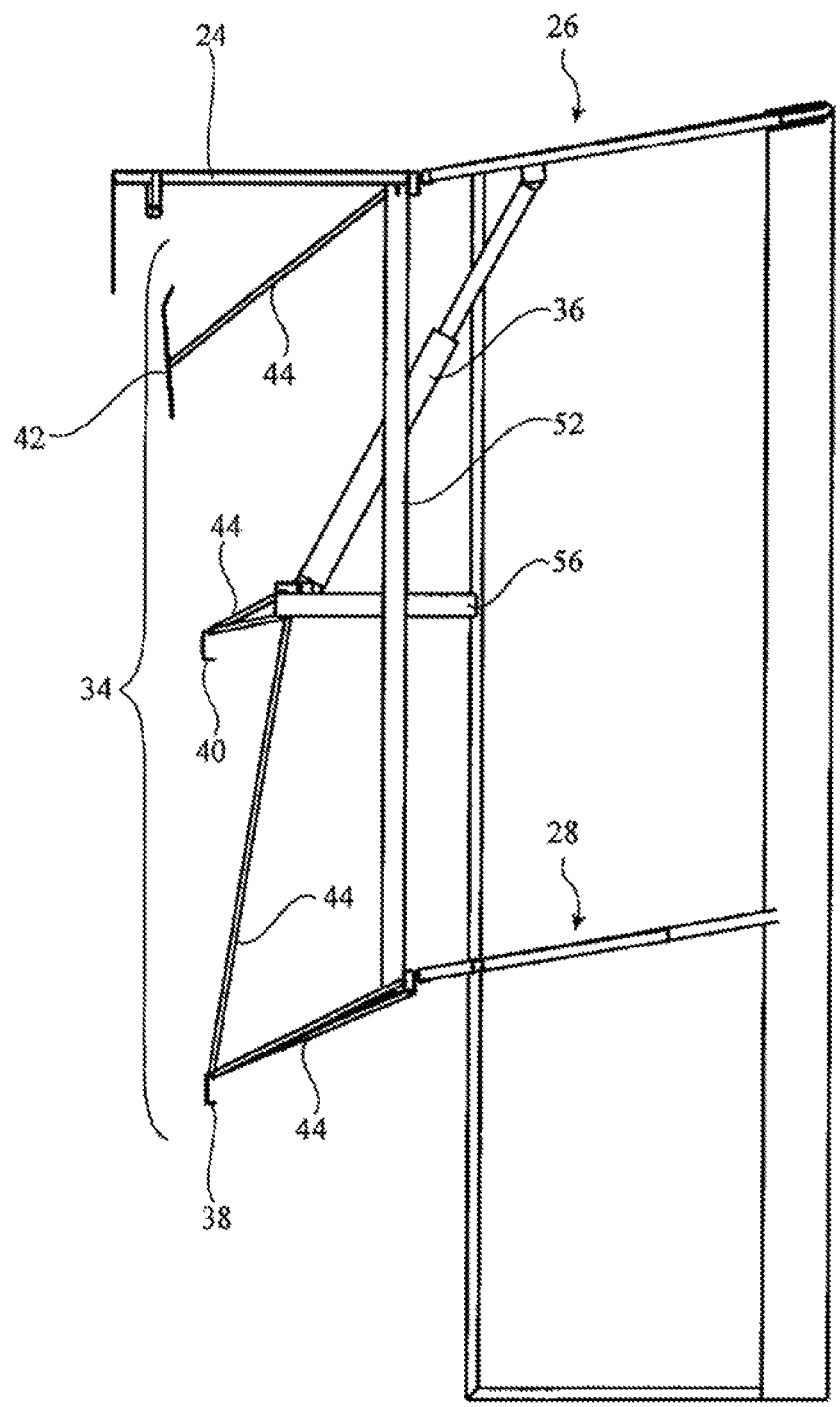
FIG. 4C is a right side elevational view of the deployable fairing of FIG. 4A, with the right side panel removed to better illustrate the frame and actuator.
Figure 4D:
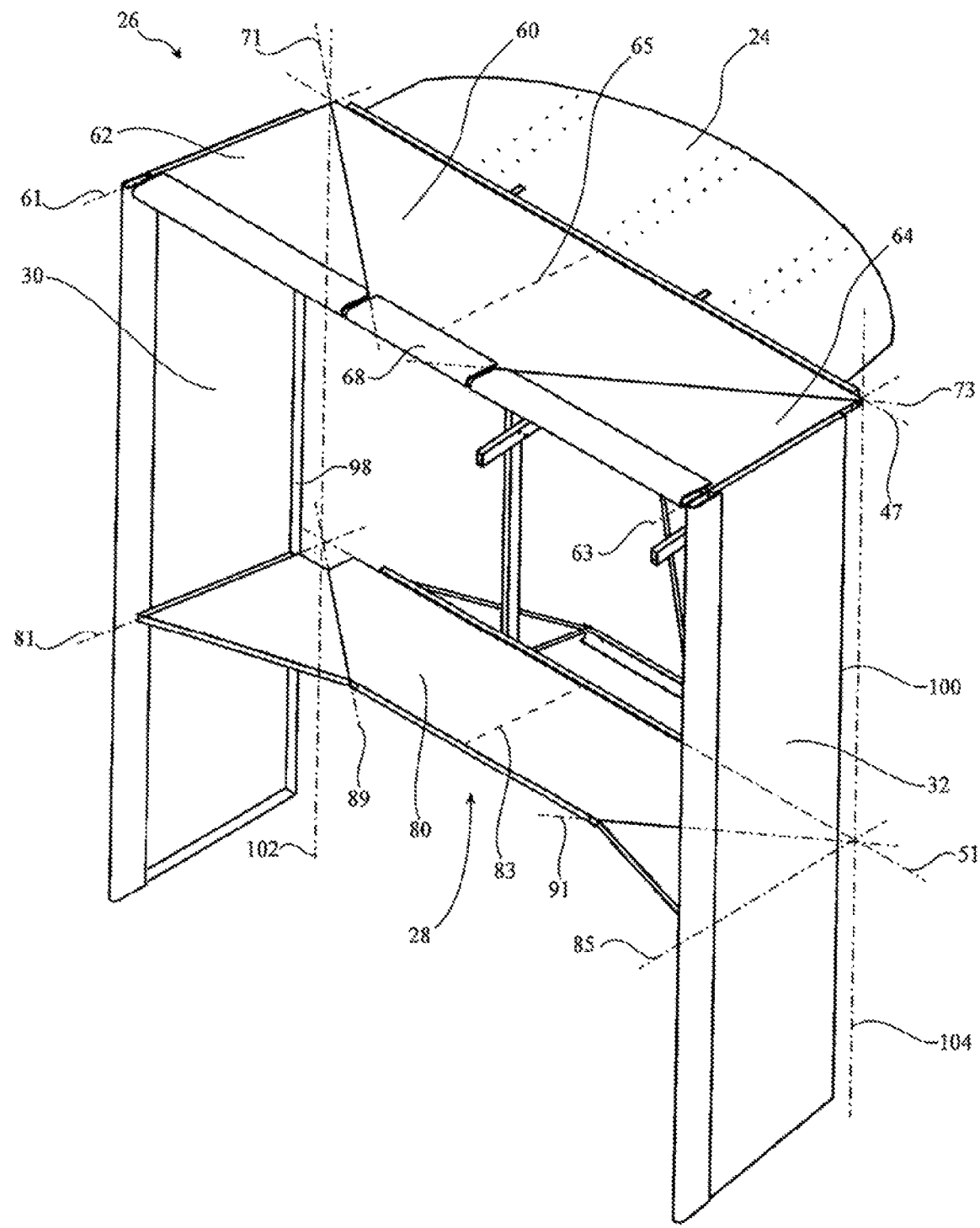
FIG. 4D is a top, rear, right side elevational view of a deployable fairing of FIG. 4A illustrated in the deployed configuration, with each of the hinge axes identified in bold lines.

FIGS. 4A, 4B, and 4C show a deployable fairing system 12 with a deployable fairing 16 shown in an extended or deployed configuration 20, according to one illustrated implementation. FIG. 4D is a top, rear, right side elevational view of the deployable fairing system 12 of FIG. 4A illustrated in the deployed configuration, with each of the hinge axes discussed below identified in bold lines. In some implementations, the deployable fairing system 12 includes a static D-gap panel 24, upper and lower horizontal panel assemblies 26 and 28, respectively, left and right side panels 30 and 32, respectively, a frame 34, and an actuator 36. The static D-gap panel 24 is attached to the back of the cab 10c, 10d and extends horizontally rearward towards the trailer 10b. The static D-gap panel 24 has a D-shaped profile, with a major curved edge 25 proximate the back of the cab 10c, 10d. The static D-gap panel 24 has a substantially straight edge 27 opposing the major curved edge 25 that is distal to the cab 10c, 10d. The static D-gap panel 24 may be used to accommodate various shapes and configurations for the back of the cab 10c, 10d, thus enabling the deployable fairing system 12 to be installed, for example, as a retrofit on existing tractors 10a without creating a gap between the deployable fairing system 12 and the back of the cab 10c, 10d. In some implementations, the deployable fairing system 12 may not include the static D-gap panel 24.

In some implementations, the frame 34 attaches to the cab 10c, 10d at a lower attachment 38, a middle attachment 40, and an upper attachment 42. The lower, middle, and upper attachments 38, 40, and 42 are each physically coupled to the cab 10c, 10d using one or more bolts or other fasteners (e.g., rivets, screws, clamps). In many instances, there may be a limited number of locations on a cab 10c, 10d which are strong enough to provide a secure attachment location. Each of the lower, middle, and upper attachments 38, 40, and 42, respectively, includes one or more rods 44 that project outwardly from the respective attachments 38, 40, and 42 to provide support for the remaining portion of the deployable fairing system 12. In some implementations, a proximal end of each rod 44 may be affixed or otherwise physically coupled to one of the lower, middle, or upper attachment 38, 40, or 42, respectively, and project upwardly and rearwardly from the respective lower, middle, or upper attachment 38, 40, or 42, to which it is affixed. The distal end of each rod 44 may be attached to one of an upper bar 46, a middle bar 48, or a lower bar 50.

Each of the upper bar 46, the middle bar 48, and the lower bar 50 extends in a lateral direction across the width 10e of the cab 10a, horizontal with respect to the ground and perpendicular with respect to the direction of forward travel during normal operation of the vehicle 10. The upper bar 46 is attached to the distal, substantially straight edge 27 of the static D-gap panel 24. One or more hinges positioned along the upper bar 46 form an upper lateral axis 47 and pivotally couple the upper horizontal panel assembly 26 to the upper bar 46, enabling the upper horizontal panel assembly 26 to rotate about the upper lateral axis 47, as described below. The lower bar 50 may be directly below the upper bar 46 such that the lower bar 50 and the upper bar 46 form a vertical plane that is perpendicular with respect to the direction of forward travel during normal operation of the vehicle 10. In some implementations, a left and a right vertical support 52 and 54, respectively, are affixed or otherwise physically coupled to the upper bar 46 and the lower bar 50 to provide additional bracing and support for the frame 34. The lower bar 50 may be located about one-third of the way up from the bottom of one or both of the left and the right side panels 30 and 32, respectively. One or more hinges positioned along the lower bar 50 form a lower lateral axis 51 and physically couple the lower horizontal panel assembly 28 to the lower bar 50, enabling the lower horizontal panel assembly 28 to rotate about the lower lateral axis 51, as described below.

The middle bar 48 may be located in a vertical position about half way between the upper bar 46 and the lower bar 50. In some implementations, the middle bar 48 is located in a horizontal position between the back of the cab 10c, 10d and the vertical plane formed by the upper bar 46 and the lower bar 50. One or more horizontal supports (e.g., left horizontal support 56 and right horizontal support 58) may project rearwardly from the middle bar 48 and attach to the left vertical support 52 and the right vertical support 54 to provide additional bracing and support for the frame 34. The proximal end of the actuator 36 is pivotally coupled to the middle bar 48 with one or more hinges that enable the actuator 36 to pivot about a horizontal, lateral axis that extends through the hinges that couple the actuator 36 to the middle bar 48. The actuator 36 rotates about this horizontal, lateral axis as the deployable fairing 16 moves between the unextended position 18 and the extended position 20. The distal end of the actuator 36 is located upward and rearward from the proximal end of the actuator 36, and is attached to the upper horizontal panel assembly 26 with one or more hinges. These hinges enable the actuator 36 and the upper horizontal panel assembly 26 to rotate relative to each other as the actuator 36 moves the deployable fairing 16 between the unextended position 18 and the extended position 20.

The upper horizontal panel assembly 26 includes a deployable upper panel 60, a left upper wing panel 62, and a right upper wing panel 64. The deployable upper panel 60 is shaped like a trapezoid, with two bases, or parallel sides, (longer base 66 and shorter base 68) that extend in a lateral direction across the width 10e of the cab 10c. In some implementations, the deployable upper panel 60 may be shaped like a trapezoid but with one or more corners along the longer base cut off to form two additional short sides. Further in some implementations, the deployable upper panel 60 may be elongated at the shorter base 68, such as shown in FIG. 4A, thus forming two short sides (e.g., left short side 68a and right short side 68b) perpendicular to short base 68. In some implementations, the longer base 66 of the deployable upper panel 60 is located proximate the static D-gap panel 24 and forms a major edge that is pivotally coupled to the upper bar 46 or the substantially straight edge 27 of the static D-gap panel 24 using one or more hinges. The hinges enable the deployable upper panel 60 to rotate about the upper lateral axis 47 that extends in a lateral direction across the width 10e of the cab 10c, parallel to the longer base 66 and perpendicular to the direction of travel during normal operation, as discussed below. The two legs (left leg 70 and right leg 72) of the deployable upper panel 60 form axes (left axis 71 and right axis 73) that have non-zero acute angles with respect to the longer base 66 and the upper lateral axis 47 of the deployable upper panel 60. The left upper wing panel 62 is pivotally coupled to the deployable upper panel 60 using one or more hinges that form the left axis 71 along the left leg 70, and the right upper wing panel 64 is pivotally coupled to the deployable upper panel 60 using one or more hinges that form the right axis 73 along the right leg 72.

The left upper wing panel 62 has a trapezoidal profile with two parallel base edges (longer base edge 74 and shorter base 75). The longer base edge 74 forms the outside left edge of the upper horizontal panel assembly 26 when the deployable fairing 16 is in the extended position 20. The longer base edge 74 is pivotally coupled to the left side panel 30 using one or more hinges that enable the left upper wing panel 62 to pivot relative to a left horizontal axis 61 formed by the top edge of the left side panel 30. The hinges that pivotally couple the left upper wing panel 62 to the deployable upper panel 60 along the left axis 71 enable the left upper wing panel 62 and the deployable upper panel 60 to pivot relative to one another as the deployable fairing 16 moves between the unextended position 18 and the extended position 20. In some implementations, the left upper wing panel 62 is triangular in shape with a first edge adjacent, and pivotally coupled, to the deployable upper panel 60, and a second edge adjacent, and pivotally coupled, to the left side panel 30.

The right upper wing panel 64 is located opposite the left upper wing panel 62 from a centerline 65 formed in the middle of the deployable upper panel 60. The right upper wing panel 64 has a trapezoidal profile with a longer base edge 76 and a shorter base 77. The longer base edge 76 forms the outside right edge of the upper horizontal panel assembly 26 when the deployable fairing 16 is in the extended position 20. The longer base edge 76 is pivotally coupled to the right side panel 32 using one or more hinges that enable the right upper wing panel 64 to pivot relative to a right horizontal axis 63 formed by the top edge of the right side panel 32. The hinges that pivotally couple the right upper wing panel 64 to the deployable upper panel 60 along right axis 73 enable the right upper wing panel 64 and the deployable upper panel 60 to pivot relative to one another as the deployable fairing 16 moves between the unextended position 18 and the extended position 20. In some implementations, the right upper wing panel 64 is triangular in shape with a first edge that is adjacent, and pivotally coupled, to the deployable upper panel 60 along the right leg 72, and a second edge that is adjacent, and pivotally coupled, to the right side panel 32.

The lower horizontal panel assembly 28 includes a deployable lower panel 80, a left lower wing panel 82, and a right lower wing panel 84. The deployable lower panel 80 may have two parallel, lateral sides (longer base 86 and shorter base 87) that extend in a lateral direction across the width 10e of the cab 10c, 10d. In some implementations, the longer base 86 of the deployable lower panel 80 is located proximate the cab 10c, 10d and forms a major edge that is pivotally coupled to the lower bar 50 or a part of the cab 10c, 10d. The hinges enable the deployable lower panel 80 to rotate about the lower lateral axis 51 that extends in a lateral direction across the width 10e of the back of the cab 10c, 10d, parallel to the longer base 86 and perpendicular to the direction of travel during normal operation, as discussed below. In some implementations, the deployable lower panel 80 may be shaped like a trapezoid but with one or more corners along the longer base cut off to form two additional short sides (e.g., 86a and 86b) perpendicular to the longer base 86, as shown in FIGS. 4A and 4B. Further in some implementations, the deployable lower panel 80 may be elongated at the shorter base 87 thus forming two short sides perpendicular to shorter base 87.

The deployable lower panel 80 may have two diagonal legs (left leg 88 and right leg 90) that form diagonal axes (left axis 89 and right axis 91) having non-zero acute angles with respect to the lower lateral axis 51 and the longer base 86 of the deployable lower panel 80. The deployable lower panel 80 is pivotally coupled to the left lower wing panel 82 along the left axis 89 using one or more hinges along the left leg 88, and the deployable lower panel 80 is pivotally coupled to the right lower wing panel 84 along the right axis 91 using one or more hinges along the right leg 90. The lower horizontal panel assembly 28 may further optionally be physically coupled to the upper horizontal panel assembly 26 using one or more cables, rods, or other links (not shown).

The left lower wing panel 82 has four sides, including a left side edge 92 and a shorter base 93. The longer base edge 92 forms the outside left edge of the lower horizontal panel assembly 28 when the deployable fairing 16 is in the extended position 20. The left side edge 92 is pivotally coupled to the left side panel 30 using one or more hinges that enable the left lower wing panel 82 to pivot relative to a lower left horizontal axis 81 that extends through the left side panel 30. The hinges that pivotally couple the left lower wing panel 82 to the deployable lower panel 80 enable the left lower wing panel 82 to pivot relative to the deployable lower panel 80 as the deployable fairing 16 moves between the unextended position 18 and the extended position 20. In some implementations, the left lower wing panel 82 is triangular in shape with a first edge that is adjacent, and pivotally coupled, to the deployable lower panel 80 along the left leg 88, and a second edge that is adjacent, and pivotally coupled, to the left side panel 30.

The right lower wing panel 84 is located opposite the left lower wing panel 82 from a centerline 83 formed in the middle of the deployable lower panel 80. The right lower wing panel 84 has four sides, including a right side edge 96. The right side edge 96 forms the outside right edge of the lower horizontal panel assembly 28 when the deployable fairing 16 is in the extended position 20. The longer base edge 96 is pivotally coupled to the right side panel 32 using one or more hinges that enable the right lower wing panel 84 to pivot relative to a lower right horizontal axis 85 that extends across the right side panel 32. The hinges that pivotally couple the right lower wing panel 84 to the deployable lower panel 80 enable the right lower wing panel 84 and the deployable lower panel 80 to pivot relative to one another as the deployable fairing 16 moves between the unextended position 18 and the extended position 20. In some implementations, the right lower wing panel 84 is triangular in shape with a first edge that is adjacent, and pivotally coupled, to the deployable lower panel 80 along the right leg 90, and a second edge that is adjacent, and pivotally coupled, to the left side panel 30.

The left and the right side panels 30 and 32, respectively, are each pivotally coupled to one or both of the upper and lower horizontal panel assemblies 26 and 28. The left side panel 30 and the right side panel 32 pivot about vertical axes (left vertical axis 102 and right vertical axis 104) that extend along or beside a proximal edge 98 of the left side panel 30 and a proximal edge 100 of the right side panel 32, both relative to the cab 10c. In some implementations, neither the proximal edge 98 of the left side panel 30 nor the proximal edge 100 of the right side panel 32 includes any hinges. In some such implementations, the left and the right side panels 30 and 32, respectively, are physically coupled to the other components of the fairing system 12 only through the pivotal couplings with the upper wing panels 62 and 64 of the upper horizontal panel assembly 26, and the lower wing panels 82 and 84 of the lower horizontal panel assembly 28. In some implementations, the left and the right side panels 30 and 32, respectively, are physically coupled to the fairing system 12 only through the pivotal couplings with upper left wing panel 62 and the right upper wing panel 64 of the upper horizontal panel assembly 26. Further, in such implementations, the fairing system 12 may not have any vertical hinges between the deployable fairing 16 and the tractor 10a or the cab 10c, 10d.

The left and the right side panels 30 and 32, respectively, each extend vertically with respect to the cab 10c, 10d when the deployable fairing 16 is both in the unextended or retracted or un-deployed position 18 and in the extended or deployed position 20. When the deployable fairing 16 is in the extended position 20, the left and the right side panels 30 and 32 may be substantially parallel to the direction of travel during normal operation and substantially perpendicular to the upper horizontal panel assembly 26, extending rearwardly from the cab 10c. In some implementations, the left and the right side panels 30 and 32 may alternatively be at a positive slope, slightly flaring out from vertical planes that extend rearwardly from the side of the cab 10c, when the fairing system 12 is in the extended position 20. When the deployable fairing 16 is in the unextended position 18, the left and the right side panels 30 and 32 pivot inward toward the back of the cab 10c to form a negative slope with respect to a vertical plane that extends parallel to a direction of travel during normal operation. In some implementations in which the deployable fairing 16 is in the unextended position 18, the left and the right side panels 30 and 32 may pivot into positions in which the left and the right side panels 30 and 32 each extend laterally along the width 10e of the cab 10c, to be substantially perpendicular to the direction of travel during normal operation. When the deployable fairing 16 is in the intermediary position 22, the left and the right side panels 30 and 32 may be substantially vertical with respect to the ground; in addition the left and the right side panels 30 and 32 may be rotated inward towards the back of the cab 10c by a certain angle (e.g., rotated inward by about 45° from their respective locations in the extended position 20).

In some implementations, the left and right side panels 30 and 32 may include one or more elastic or conformable portions that enable portions of the left and the right side panels 30 and 32 to bend or to alter their shape. For example, a left trailing edge 31 of the left side panel and a right trailing edge 33 of the right side panel 32 may be comprised of an elastic or resilient, deformable or conformable material that enables the trailing edges 31 and 33 to alter their shapes. Such elastic, deformable material may extend the entire length of the left and the right trailing edges 31 and 33. As a result, in such implementations, the left and the right side panels 30 and 32 of the deployable fairing 16 may extend across the entire gap 14 such that left and the right side panels 30 and 32 apply rearward forces to the trailing edges 31 and 33, thereby engaging the trailing edges 31 and 33 with corresponding, opposing edges of the trailer 10b. Because the left and the right trailing edges 31 and 33 are deformable or conformable, the shapes of each of the trailing edges 31 and 33 may be altered to become complementary to the shapes of the opposing edges of the trailer 10b when the trailing edges 31 and 33 are engaged with and pressed into the respective opposing edges of the trailer 10b. The elasticity of the trailing edges 31 and 33 further enables the vehicle 10 to make minor turns, such as those that might be encountered in changing lanes on a highway, by providing some flexibility and give between the left and the right side panels 31 and 33 and the trailer 10b. Some or all of a trailing edge 29 of the deployable upper horizontal panel assembly may also be comprised of a deformable, elastic substance to engage with the leading top edge of the trailer 10b.

Figure 4E:
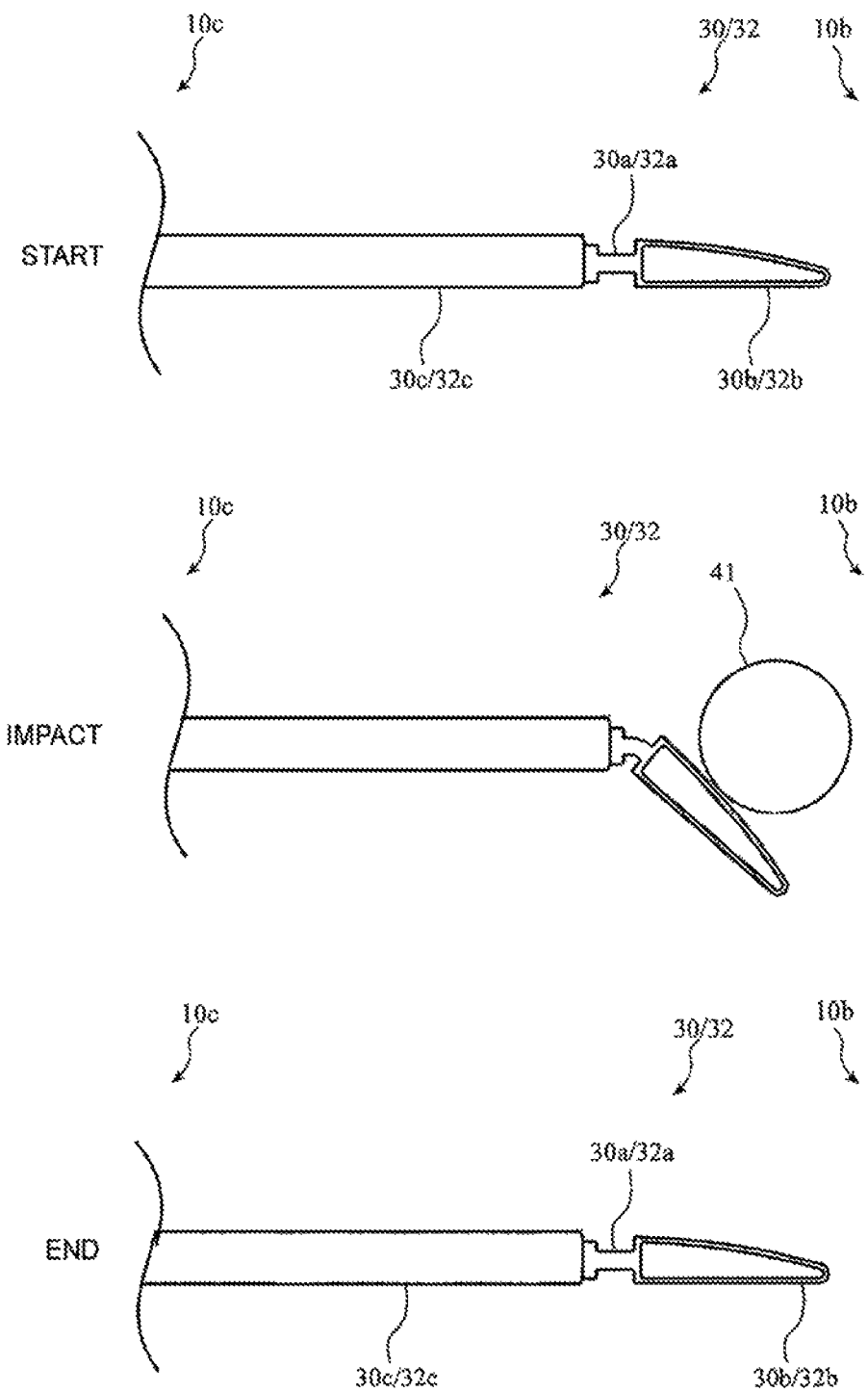
FIG. 4E shows a top-level view of a side panel that has a flexible interior portion that extends vertically from a top edge of the side panel to the bottom edge of the side panel, according to one illustrated embodiment.

FIG. 4E shows a top-level view of a side panel 30,32 that has a flexible interior portion 30a, 32a that extends vertically from a top edge of the side panel 30, 32 to the bottom edge of the side panel 30, 32, according to one illustrated embodiment. In such implementations, the flexible, vertical portion (30a, 32a) is located between the cab 10c and the trailer 10b. Each of the left and the right side panels 30 and 32 may further include two rigid sections (30b/32b and 30c/32c) that extend in a vertical direction on either side of an elastic portion 30a/32a, with one rigid section 30b/32b proximate the trailer 10b and the other rigid section proximate the cab 10c. The interior elastic portion 30a/32a may have a resiliency that biases the rigid sections 30b/32b and 30c/32c of the left and the right side panels 30 and 32 into deployed or planar positions. In such an implementation, the left and the right side panels 30 and 32 may swipe past an obstacle 41 (e.g., the refrigeration component for a reefer truck) in transitioning between the unextended position 18 and the extended position 20 by flexing the elastic portion 30a/32a, thus enabling the two rigid sections 30b/32b and 30c/32c to pivot relative to one another when encountering the obstacle 41. After the left and the right side panels 30 and 32 clear the obstacle 41, the biasing of the interior elastic portion 30a/32a will cause the two rigid sections 30b/32b and 30c/32c of each side panel 30 and 32 to revert to a deployed position in which the two rigid sections 30b and 30c of the left side panel 30 are planar, and the two rigid sections 32b and 32c of the right side panel 32 are planar.

An interior elastic portion 30a/32a may be comprised, for example, of a soft rubber material that is resilient or has an elastic pull that returns to the two connected rigid sections 30b/32b and 30c/32c to be substantially planar when the side panel 30 or 32 is not under stress. In some implementations, the rigid section 30b/32b closest to the trailer 10b may be substantially or completely comprised of elastic, deformable materials, such as that described above with respect to left and right trailing edges 31 and 33. In such implementations, the rigid section 30b/32b may be deformed to complement the shape of the corresponding leading edge of the trailer 10b, thus enabling the rigid section 30b/32b to be physically engaged with the trailer, thus closing the gap 14, while allowing the trailer to make minor turns.

Figure 5A:
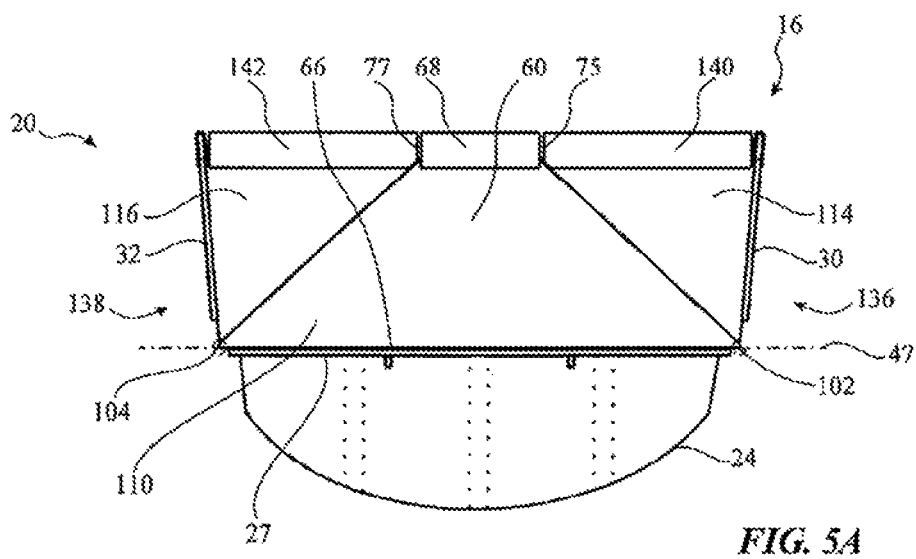
FIG. 5A is a top plan view of a deployable fairing in the deployed configuration.
Figure 5B:
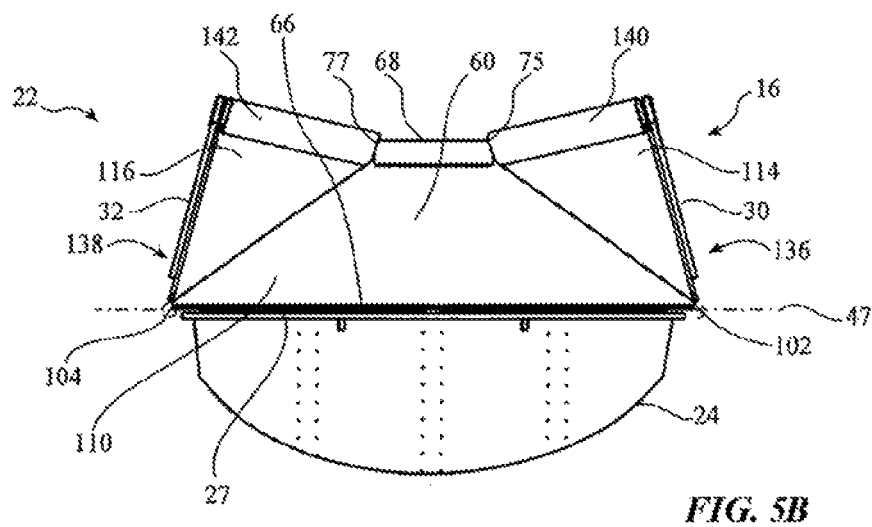
FIG. 5B is a top plan view of the deployable fairing of FIG. 5A in an intermediary or partially deployed configuration.
Figure 5C:
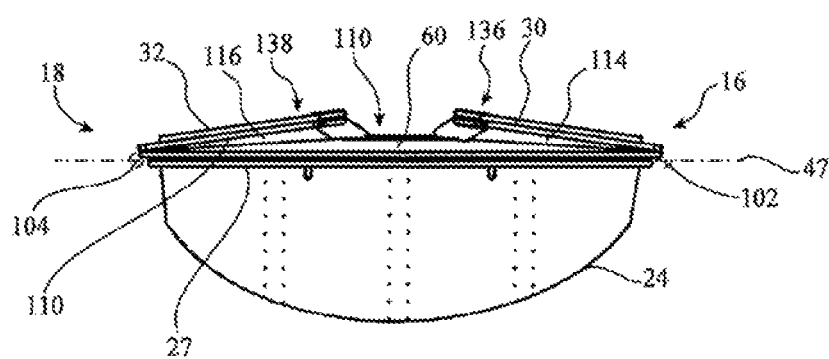
FIG. 5C is a top plan view of the deployable fairing of FIG. 5A in a retracted or un-deployed configuration.
Figure 6A:
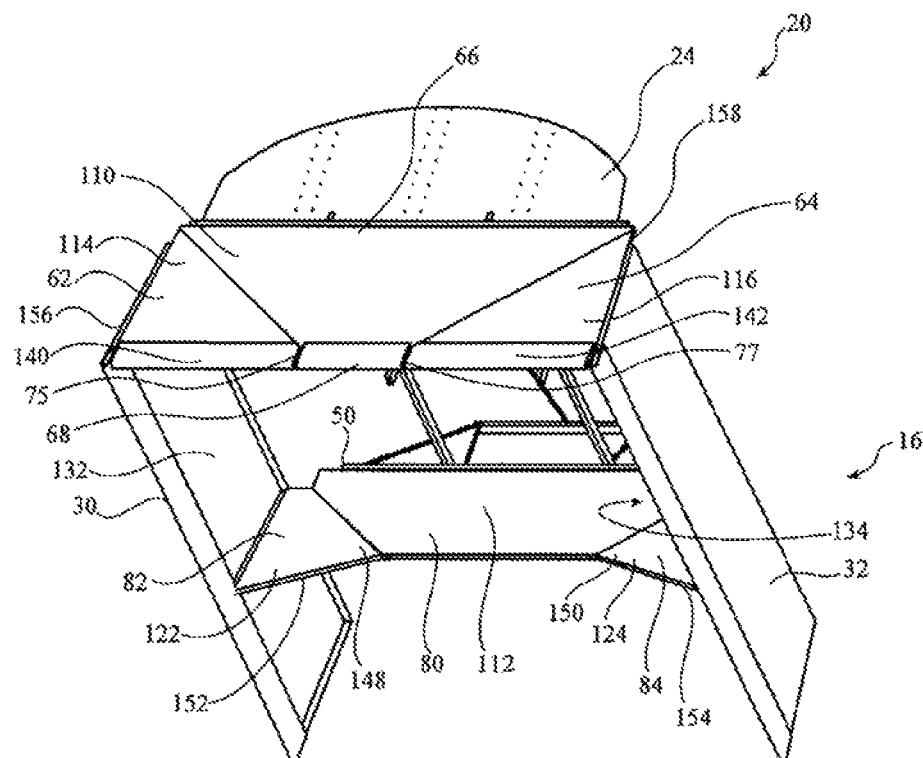
FIG. 6A is a top, rear, right side isometric view of the deployable fairing of FIG. 5A in the deployed configuration.
Figure 6B:
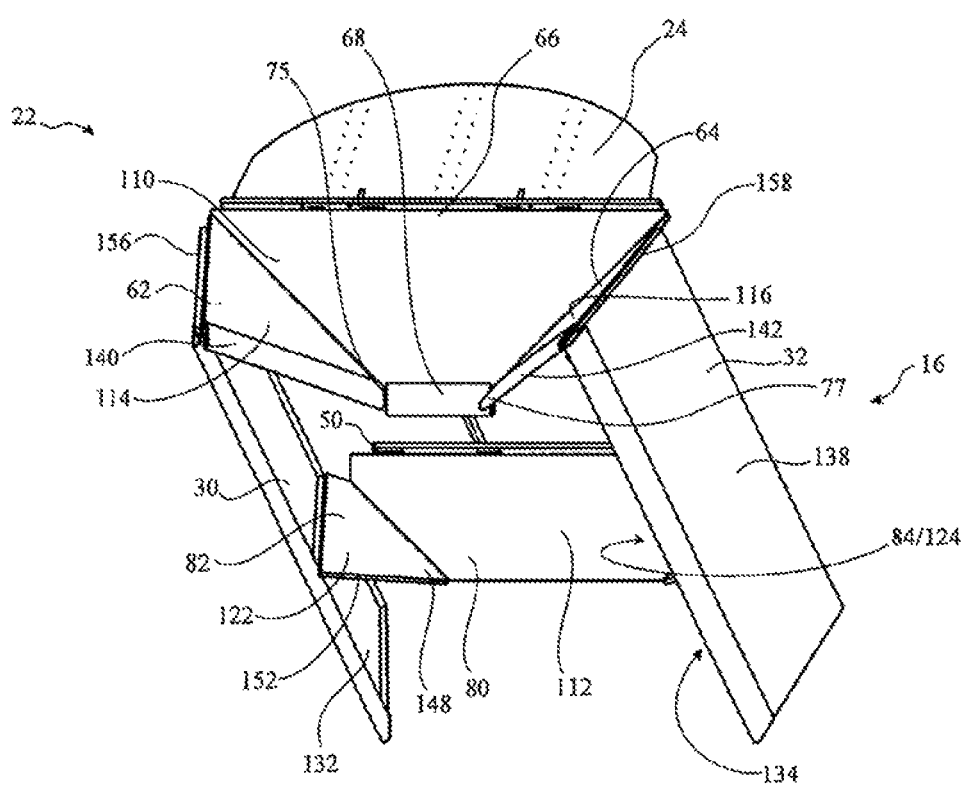
FIG. 6B is a top, rear, right side isometric view of the deployable fairing of FIG. 5A in an intermediary or partially deployed configuration.
Figure 6C:
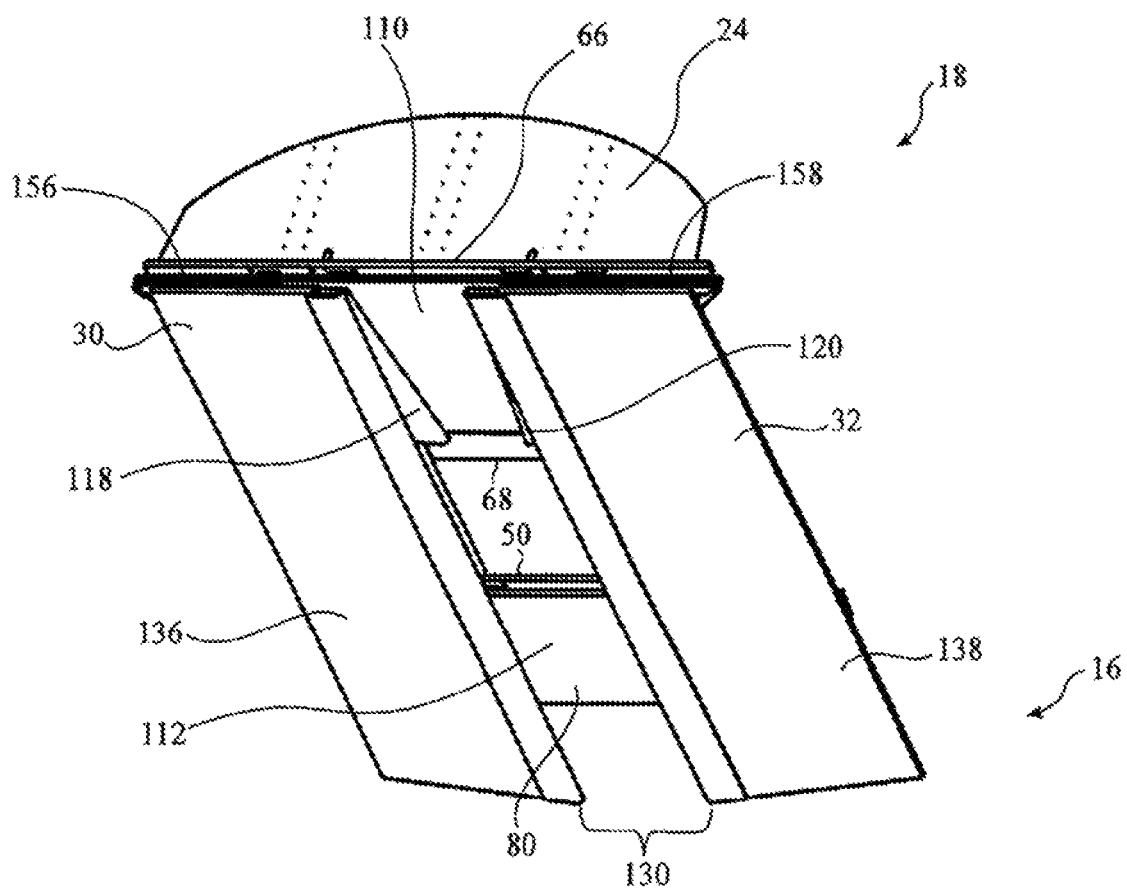
FIG. 6C is a top, rear, right side isometric view of the deployable fairing of FIG. 5A in a retracted or un-deployed configuration.
Figure 8A:
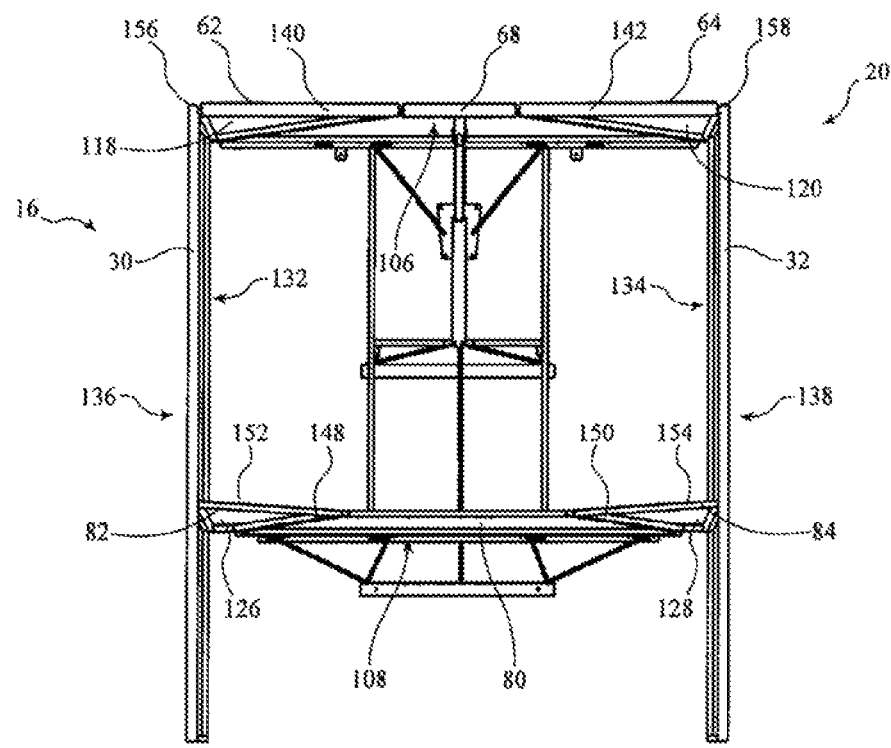
FIG. 8A is a rear elevational view of the deployable fairing of FIG. 5A in the deployed configuration.
Figure 8B:
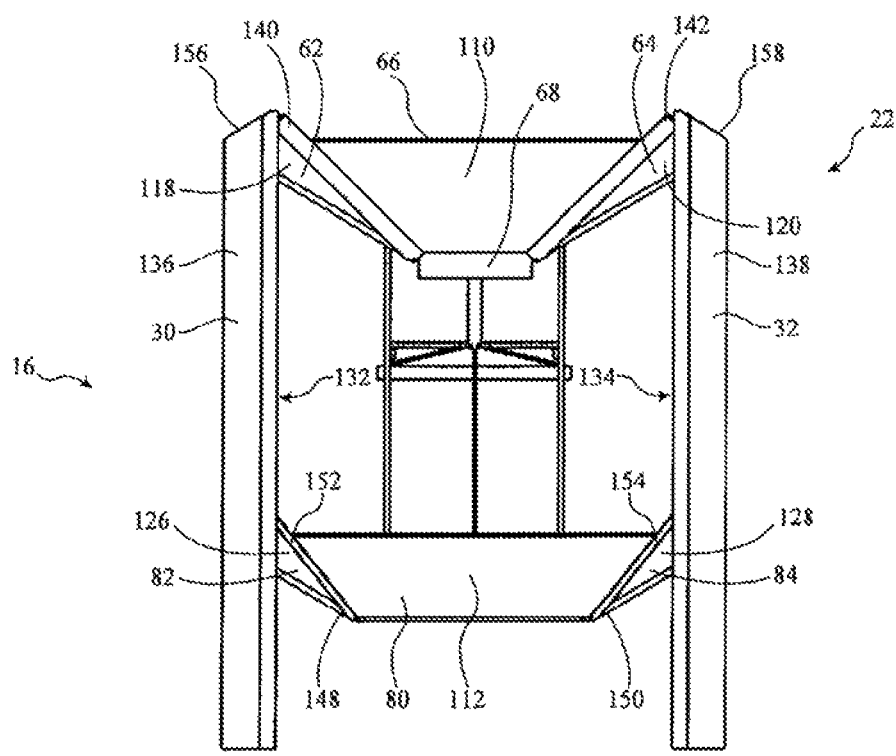
FIG. 8B is a rear elevational view of the deployable fairing of FIG. 5A in an intermediary or partially deployed configuration.
Figure 8C:
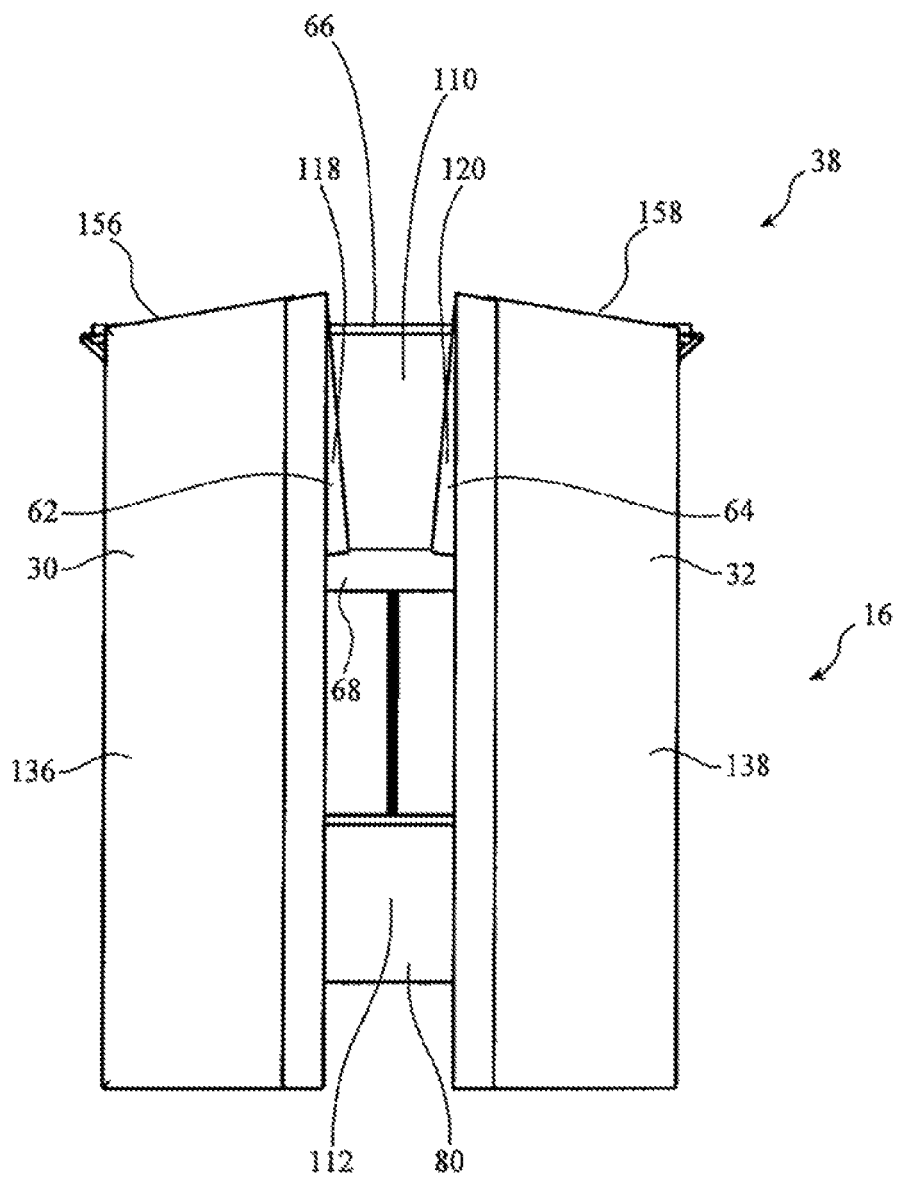
FIG. 8C is a rear elevational view of the deployable fairing of FIG. 5A in a retracted or un-deployed configuration.

FIGS. 5A, 5B, and 5C are top plan views of the deployable fairing 16 in the deployed configuration 20, the intermediary or partially deployed configuration 22, and the retracted or un-deployed configuration 18. FIGS. 6A, 6B, and 6C are top, rear, right side isometric views of the deployable fairing 16 of FIGS. 5A-5C in the deployed configuration 20, the intermediary or partially deployed configuration 22, and the retracted or un-deployed configuration 18. FIGS. 7A, 7B, and 7C are right side elevational views of the deployable fairing 16 of FIGS. 5A-5C in the deployed configuration 20, the intermediary or partially deployed configuration 22, and the retracted or un-deployed configuration 18. FIGS. 8A, 8B, and 8C are rear elevational view of the deployable fairing 16 of FIG. 5A-5C in the deployed configuration 20, the intermediary or partially deployed configuration 22, and the retracted or un-deployed configuration 18.

In the retracted or un-deployed configuration 18, each of the deployable upper panel 60, the left upper wing panel 62, the right upper wing panel 64, the deployable lower panel 80, the left lower wing panel 82, the right lower wing panel 84, the left side panel 30, and the right side panel 32 are in a vertical position, arrayed laterally in one or more layers stacked with respect to the back of the cab 10c, 10d. In some implementations, the deployable upper panel 60 and the deployable lower panel 80 are closest to the cab 10c such that each extends vertically downward with bottom surfaces 106 and 108 of the deployable upper and lower panels 60 and 80, respectively, facing towards the back of the cab 10c. The deployable upper panel 60 has an upper surface 110, opposing and separated by a width from a bottom surface 106, that faces away from the back of the cab 10c towards the trailer 10b. The deployable lower panel 80 has an upper surface 112, opposing and separated by a width from the bottom surface 106, that faces away from the back of the cab 10c towards the trailer 10b.

The left and right upper wing panels 62 and 64, respectively, and the left and right lower wing panels 82 and 84, respectively, may be folded against, and form a second layer adjacent to, the deployable upper panel 60 and the deployable lower panel 80 when the deployable fairing 16 is in the retracted configuration 18. Thus, upper surfaces 114 and 116 of the left and the right upper wing panels 62 and 64 may be adjacent to and facing the upper surface 110 of the deployable upper panel 60. Further, the left and the right upper wing panels 62 and 64 each have respective lower surfaces 118 and 120, opposing and separated from the upper surfaces 114 and 116 by one or more widths, that face away from the back of the cab 10c towards the trailer 10b. Further, when the deployable fairing 16 is in the unextended configuration 18, upper surfaces 122 and 124 of the left and the right lower wing panels 82 and 84, respectively, may be adjacent to and face the upper surface 112 of the deployable lower panel 80. The left and the right lower wing panels 82 and 84 each have respective lower surfaces 126 and 128, opposing and separated from the upper surfaces 122 and 124 by one or more widths, that face away from the back of the cab 10c towards the trailer 10b when the deployable fairing 16 is in the unextended configuration 18.

The left and the right side panels 30 and 32, respectively, may be folded against, and form a third layer adjacent to, the left and the right upper wing panels 62 and 64, respectively, and the left and the right lower wing panels 82 and 84, respectively, when the deployable fairing 16 is in the unextended configuration 18. The left and the right side panels 30 and 32 may extend laterally in a line parallel to the back of the cab 10c, 10d and cover all or substantially all of the other components of the deployable fairing 16. A gap 130 may exist between the left and the right side panels 30 and 32 in the unextended configuration 18. The left and the right side panels 30 and 32 have interior surfaces 132 and 134, respectively, that are adjacent to and face the lower surfaces 118 and 120 of the left and the right upper wing panels 62 and 64 when the deployable fairing 16 is in the unextended configuration 20. The left and the right side panels 30 and 32 have exterior surfaces 136 and 138, respectively, that are separated from the interior surfaces 132 and 134 by one or more widths and face away from the back of the cab 10c towards the trailer 10b.

To transition the deployable fairing 16 from the unextended configuration 18 to the extended configuration 20, the actuator 36 is engaged to linearly displace the distal end of the actuator 36, thus applying an upward and outward force to the bottom surface 106 of the deployable upper panel 60. The actuator 36 may be a mechanical actuator (e.g., screw, wheel and axle, etc.), a piston (i.e., cylinder and piston head) in the form of either a hydraulic or pneumatic actuator, an electro-mechanical actuator, and the like, capable of linearly displacing the distal end of the actuator 36 with a sufficient force and for a sufficient distance to deploy the deployable fairing 16 into the extended position 20.

This force results in the deployable upper panel 60 rotating about an upper lateral axis 47 that extends across the substantially straight edge 27 of the static D-gap panel 24 and/or the upper bar 46 to which the deployable upper panel 60 is pivotally coupled with one or more hinges. As a result, the short base 68 of the deployable upper panel 60 traverses an arc defined by the width of the deployable upper panel 60 between the two bases 66 and 68. The deployable upper panel 60 rotates from a substantially downward, vertical position when the deployable fairing 16 is in the unextended configuration 18 to a substantially horizontal configuration when the deployable fairing 16 is in the extended configuration 20. When the deployable fairing 16 is in the intermediary configuration 22, the deployable upper panel 60 is between 0° and 90° below (e.g., about 45°, as shown in FIGS. 5B, 6B, 7B, and 8B) a horizontal plane that contains the upper lateral axis 47.

An upward force may also be applied to the deployable lower panel 80 by the cable or rod that couples the deployable lower panel 80 to the deployable upper panel 60. Accordingly, the deployable lower panel 80 may rotate about a horizontal axis that extends across the lower bar 50 to which the deployable lower panel 80 is pivotally coupled using one or more hinges. As a result, the deployable lower panel 80 undergoes the same transition from a substantially downward, vertical position to a substantially horizontal position.

The rotation of the deployable upper panel 60 from the unextended configuration 18 to the extended configuration 20 causes the various components of the upper horizontal panel assembly 26 to unfold. As a result, the left and right upper wing panels 62 and 64, respectively, move from being collapsed on top of the deployable upper panel 60 in the unextended configuration 18 to flanking either side of, and forming a substantially planar surface with, the deployable upper panel 60 in the extended configuration 20. In the intermediary configuration 22, the left and right upper wing panels 62 and 64 are between 0° and 90° below (e.g., about 45°, as shown in FIGS. 5B, 6B, 7B, and 8B) a horizontal plane formed by the top edges of the left and the right side panels 30 and 32, respectively. In some implementations, as the short base 68 of the deployable upper panel 60 rotates rearward and upward, short bases 75 and 77 of the left and the right upper wing panels 62 and 64, respectively, likewise rotate rearward and upward. This rotation, in turn, causes trailing edges 140 and 142 of the left and the right upper wing panels 62 and 64 to rotate rearward towards the trailer 10b and move from a substantially vertical position in the unextended configuration 18 to a substantially horizontal position in the extended configuration 20.

The components of the deployable lower panel 80 undergo a similar rotational transformation as the deployable fairing 16 moves from the unextended configuration 18 to the extended configuration 20. Accordingly, the left and right lower wing panels 82 and 84, respectively, move from being collapsed on top of the deployable lower panel 80 in the unextended configuration 18 to flanking either side of, and forming a substantially planar surface with, the deployable lower panel 80 in the extended configuration 20. In the intermediary configuration 22, the left and right lower wing panels 82 and 84 are between 0° and 90° below (e.g., about 45°, as shown in FIGS. 5B, 6B, 7B, and 8B) a horizontal plane that extends through the lower lateral axis 51. In some implementations, as the short base 87 of the deployable lower panel 80 rotates rearward and upward, corners 148 and 150 of the left and the right lower wing panels 82 and 84, respectively, likewise rotate rearward and upward. This rotation, in turn, causes trailing edges 152 and 154 of the left and the right lower wing panels 82 and 84 to rotate rearward towards the trailer 10b and move from a substantially vertical position in the unextended configuration 18 to a substantially horizontal position in the extended configuration 20.

When the deployable fairing 16 is in the deployed configuration 20, the components of the upper horizontal panel assembly 26 may form a plane that is substantially horizontal with respect to the ground and extends from the upper lateral axis 47 towards the trailer 10b. Likewise, the components of the lower horizontal panel assembly 28 may form a plane that is substantially horizontal with respect to the ground and extends from the lower lateral axis 51 towards the trailer 10b. In some implementations, the components of the upper horizontal panel assembly 26 extend rearwardly from the back of the cab 10c at a positive slope 144 (i.e., slightly above horizontal) when the deployable fairing 16 is in the extended position 20. In such implementations, the components of the lower horizontal panel assembly 28 may extend rearwardly from the back of the cab 10c at a positive slope 144 (i.e., slightly above horizontal) when the deployable fairing 16 is in the extended position 20.

The movement of the trailing edges 140 and 142 of the left and the right upper wing panels 62 and 64 results in outward rotational forces being applied to the left and the right side panels 30 and 32. These outward forces cause the left and the right side panels 30 and 32 to rotate outward about left and right vertical axes 102 and 104, respectively. The movement of the trailing edges 152 and 154 of the left and the right lower wing panels 82 and 84 may also apply respective outward rotational forces to the left and the right side panels 30 and 32 that complement the outward rotational forces applied by the trailing edges 140 and 142 of the left and the right upper wing panels 62 and 64. In some implementations, the top edges 156 and 158 of the left and the right side panels 30 and 32, may rotate about the vertical axes 102 and 104, respectively, and remain within the same horizontal plane, such as, for example, a horizontal plane that extends through the static D-gap panel 24. In some such implementations in which the top edges 156 and 158 rotate within the same plane, the left side panel 30 may be hinged solely to the left upper wing panel 62 along the top edge 156, and the right side panel 32 may be hinged solely to the right upper wing panel 64 along the top edge 158.

The deployment of the deployable fairing 16 from the unextended configuration 18 to the extended configuration 20 results in the left and right side panels 30 and 32 being rotated from a substantially lateral position (i.e., parallel to the back of the cab 10c, 10d) to a substantially perpendicular position with respect to the back of the cab 10c, 10d such that the left and the right side panels 30 and 32 extend rearwardly from the back of the tractor 10a. In some implementations, the left side panel 30 may form a positive slope with respect to a vertical plane that extends through the vertical axis 102 and is parallel to the direction of travel during normal operation of the vehicle 10 such that the left side panel 30 slightly flares out from the side of the cab 10c. In some implementations, the right side panel 32 may form a positive slope with respect to a vertical plane that extends through the vertical axis 104 and is parallel to the direction of travel during normal operation of the vehicle 10 such that the right side panel 30 slightly flares out from the side of the cab 10c. As noted earlier, in some implementations, the upper horizontal panel assembly 26 may also extend rearwardly from the back of the cab 10c also at a positive slope 144 (i.e., slightly above horizontal) when the deployable fairing 16 is in the extended position 20. In such implementations, when one or more of the upper horizontal panel assembly 26 and the left and the right side panels 30 and 32 are at respective positive slopes, the perimeter formed by trailing edges of the side panels 30 and 32 and the upper horizontal panel assembly 26 closest to the trailer 10b and distal to the cab 10c may be greater than the perimeter formed by leading edges of the same components proximate the cab 10c. In addition, the area encompassed by the perimeter formed by trailing edges of the left and the right side panels 30 and 32 and the upper horizontal panel assembly 26 closest to the trailer 10b and distal to the cab 10c may be greater than the area encompassed by the perimeter formed by leading edges of the same components proximate the cab 10c.

Figure 9:
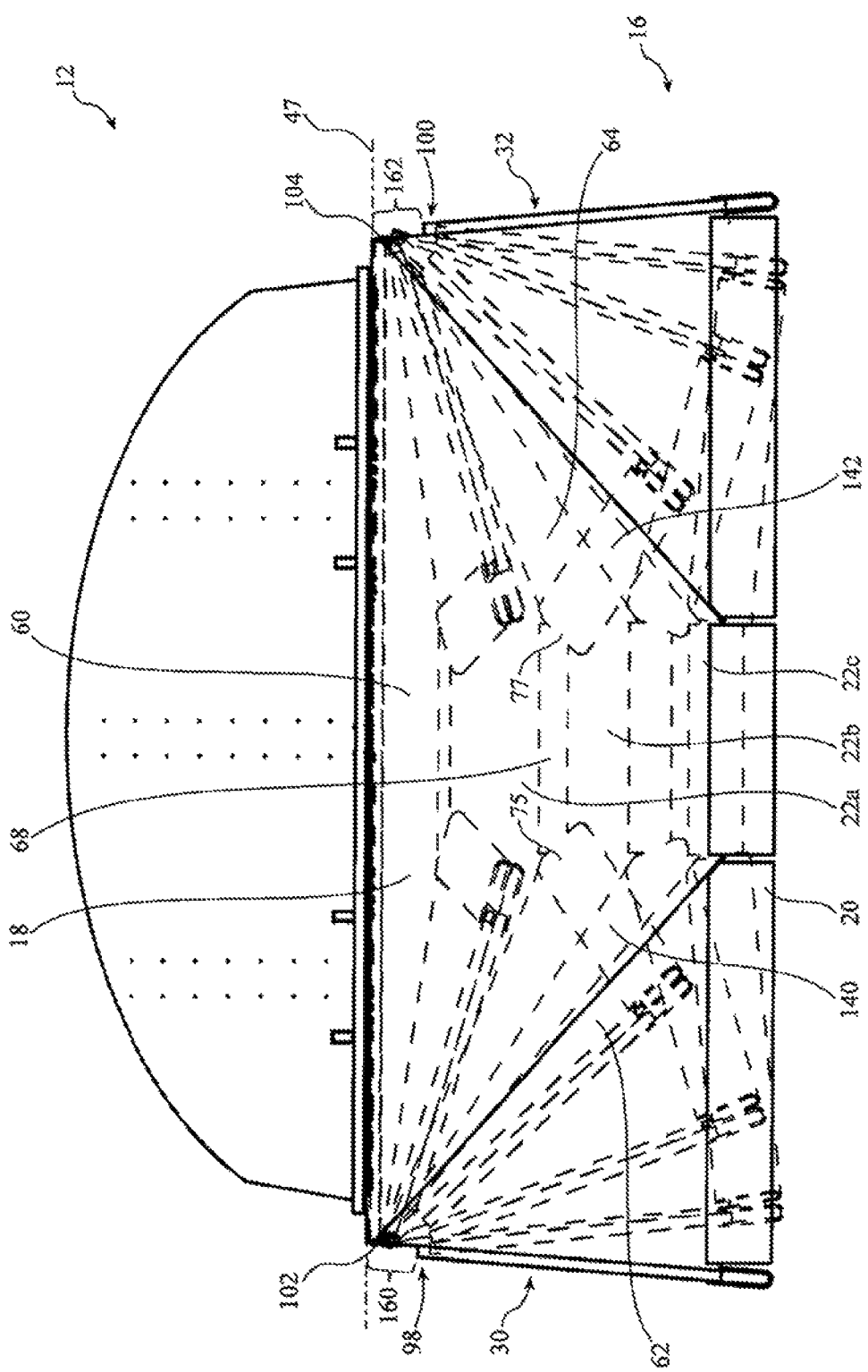
FIG. 9 is a top plan view of a deployable fairing showing the right and left side panels with a bent edge moving through a variety of configurations, from the deployed configuration to the retracted or un-deployed configuration and therebetween, and better illustrating a rotation of the left and the right side panels about vertical axes (out of drawing sheet) and rotation of the deployable upper panel about a lateral axis (planar with drawing sheet).
Figure 10A:
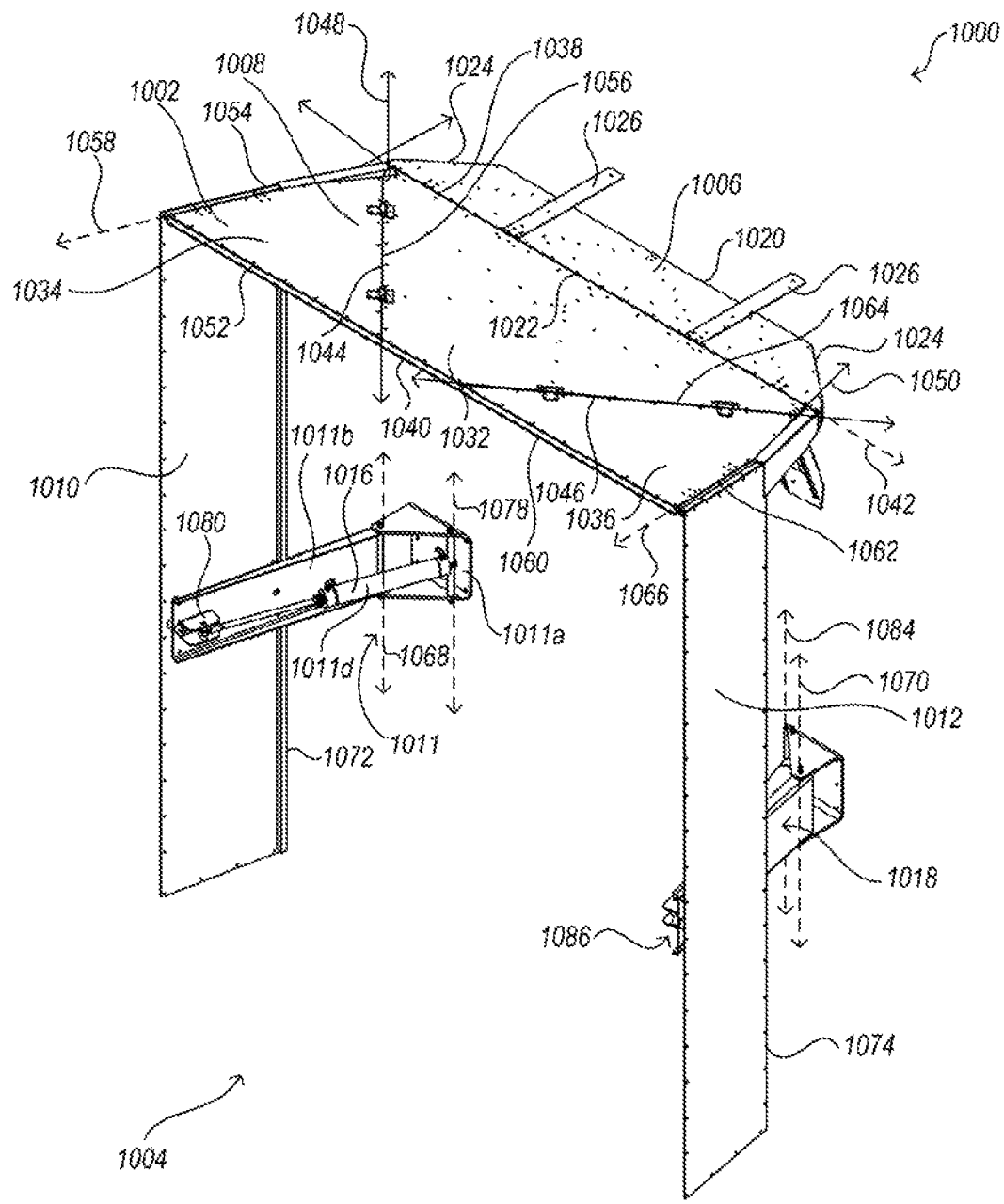
FIG. 10A is a top, rear, right-side isometric view of a deployable fairing in which the deployable fairing is shown in a deployed configuration, according to at least one illustrated implementation.
Figure 10B:
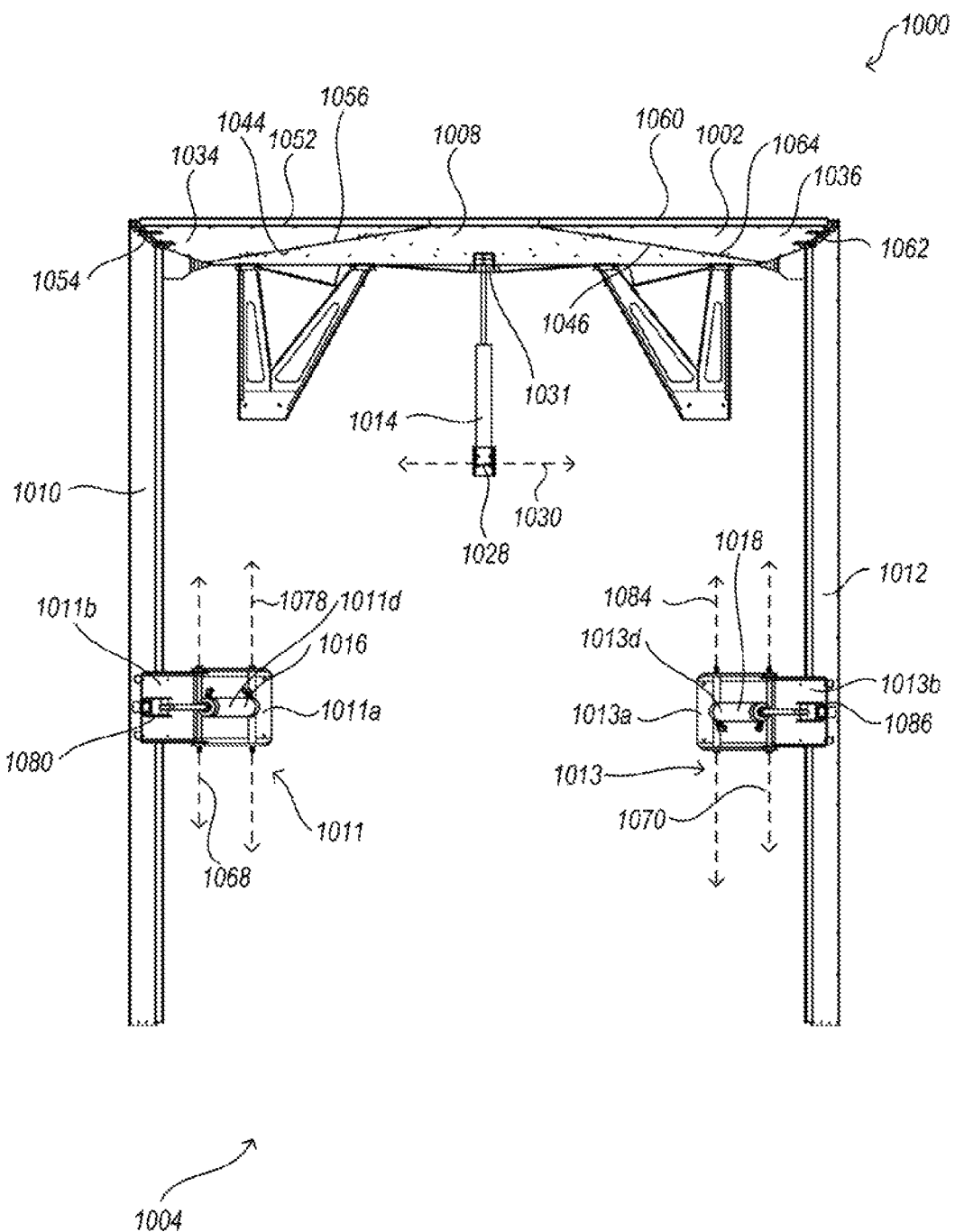
FIG. 10B is a rear elevational view of the deployable fairing of FIG. 10A in which the deployable fairing is shown in the deployed configuration, according to at least one illustrated implementation.
Figure 10C:
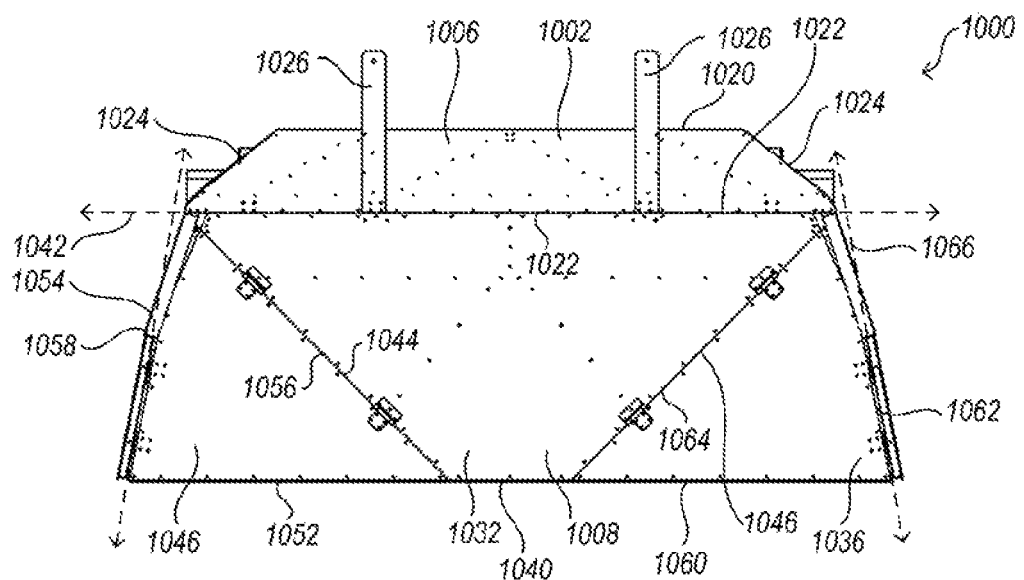
FIG. 10C is a top plan view of the deployable fairing of FIG. 10A in which the deployable fairing is shown in the deployed configuration, according to at least one illustrated implementation.
Figure 10D:
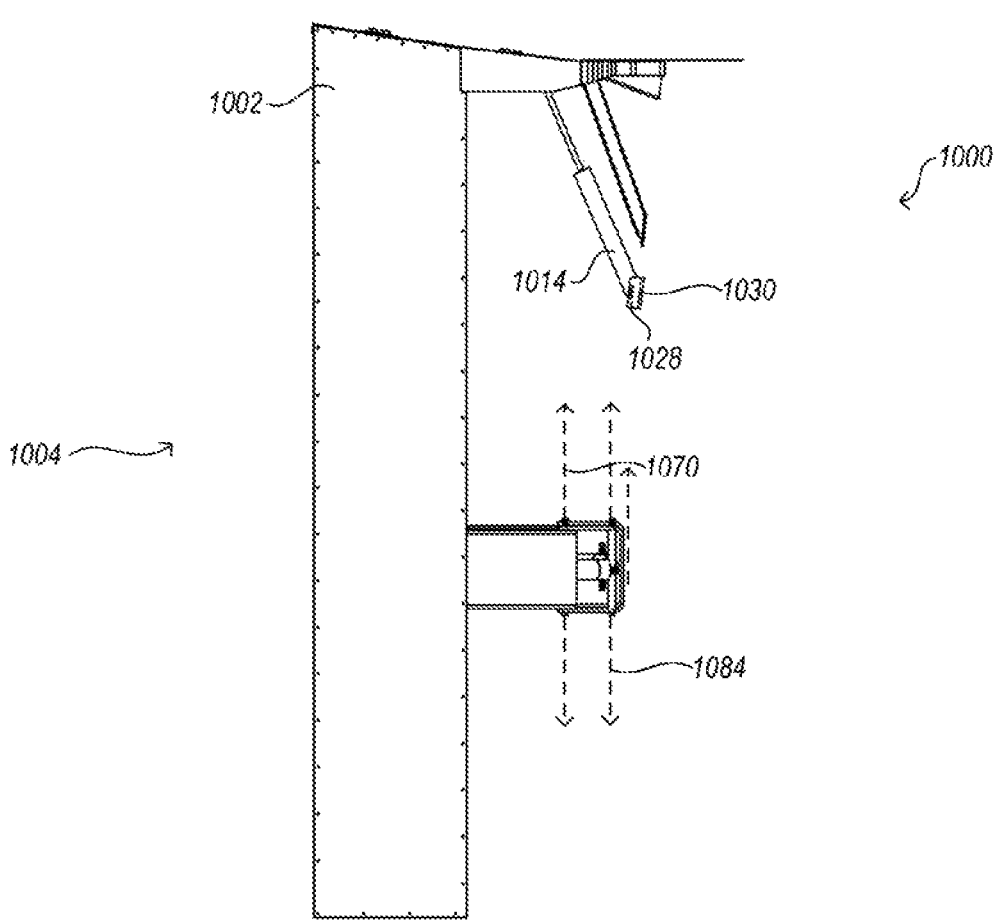
FIG. 10D is a right side elevational view of the deployable fairing of FIG. 10A in which the deployable fairing is shown in the deployed configuration, according to at least one illustrated implementation.
Figure 10E:
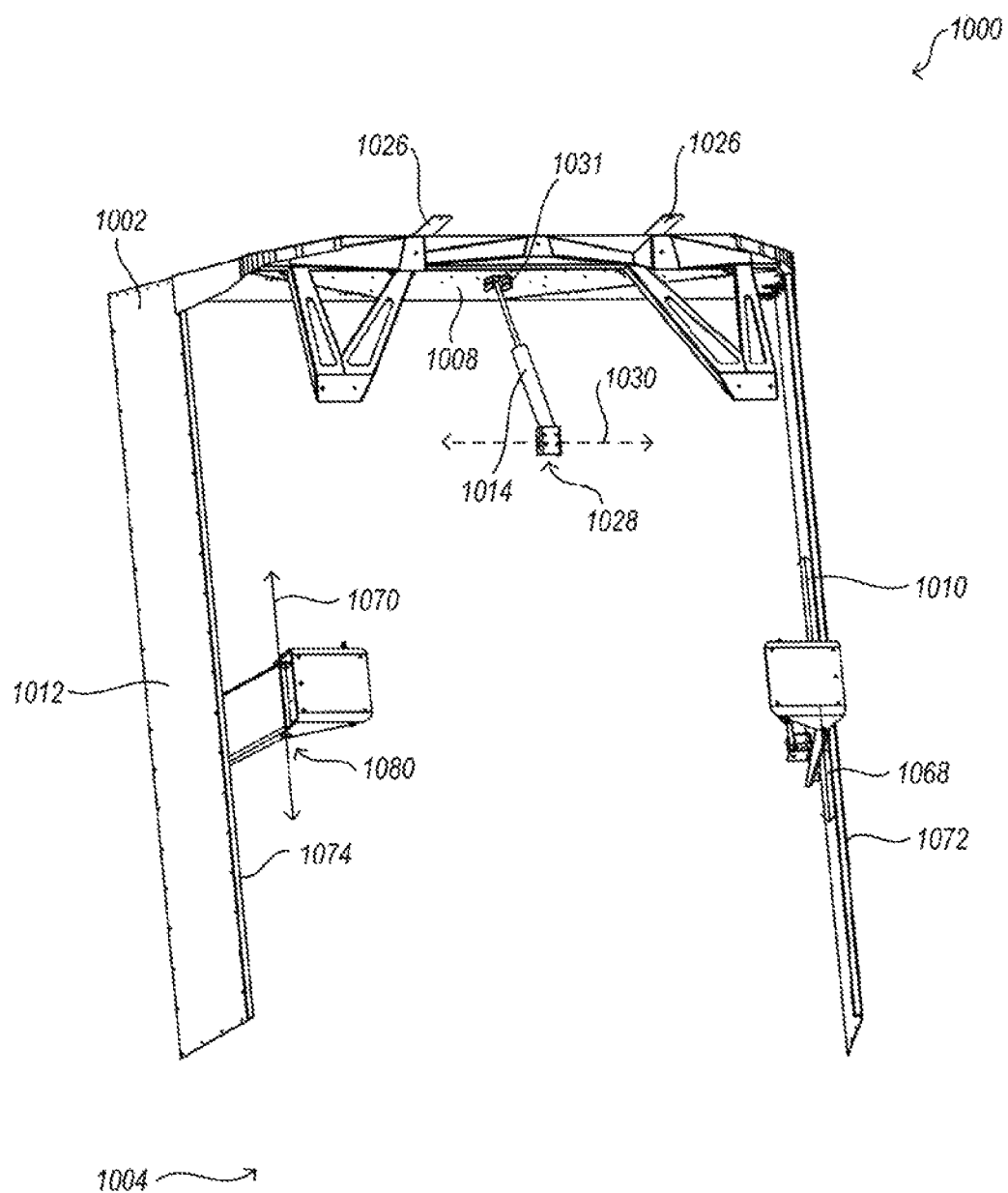
FIG. 10E is a bottom, rear, left-side isometric view of the deployable fairing of FIG. 10A in which the deployable fairing is shown in the deployed configuration, according to at least one illustrated implementation.

FIG. 9 is a top plan view of the deployable fairing system 12 showing the right and left side panels 30 and 32 with a bent edge moving through a variety of configurations, from the deployed configuration 20 to the retracted or un-deployed configuration 18 and therebetween, and better illustrating a rotation of the left and the right side panels 30 and 32 about vertical axes 102 and 104 (out of drawing sheet) and rotation of the deployable upper panel 60 about the upper lateral axis 47 (planar with drawing sheet).

As the deployable fairing 16 transitions from the unextended position 18, the deployable upper panel 60 rotates about the upper lateral axis 47 such that the short base 68 of the deployable upper panel 60 rotates successively upward and rearward in each of the intermediary stages 22a, 22b, and 22c shown in FIG. 9 until the deployable upper panel 60 is in a substantially horizontal position when the deployable fairing 16 is in the extended configuration 20. The upward and rearward transition of the short base 68 of the deployable upper panel results in the short bases 75 and 77 of the left and the right upper wing panels 62 and 64, respectively, likewise rotating rearward and upward. This rotation, in turn, causes the trailing edges 140 and 142 of the left and the right upper wing panels 62 and 64 to rotate rearward towards the trailer 10b through the intermediary stages 22a, 22b, and 22c until the left and the right upper wing panels 62 and 64 are in a substantially horizontal position when the deployable fairing 16 is in the extended configuration 20.

The rotation of the trailing edges 140 and 142 of the left and the right upper wing panels 62 and 64 results in the rotation of the left and the right side panels 30 and 32 about the vertical axes 102 and 104, respectively. This rotation continues until the left and the right side panels 30 and 32 extend rearwardly from the back of the cab 10c towards the trailer 10b when the deployable fairing 16 is in the extended configuration 20. In some implementations, the proximal edges 98 and 100 of the left and the right side panels 30 and 32, respectively, are separated by distances 160 and 162 from the vertical axes 102 and 104.

FIGS. 10A, 10B, 10C, 10D, and 10E show another type of deployable fairing system 1000 with a deployable fairing 1002 shown in an extended or deployed configuration 1004, according to one illustrated implementation. In some implementations, the deployable fairing system 1000 includes a static D-gap panel 1006, upper horizontal panel assemblies 1008, left and right side panels 1010 and 1012, respectively, and a center actuator 1014, a left actuator 1016, and a right actuator 1018. In some implementations, the deployable fairing system 1000 may only include the center actuator 1014. In some implementations, the deployable fairing system 1000 may only include the left actuator 1016 and the right actuator 1018. In some implementations, one or more of the center actuator 1014, the left actuator 1016, and/or the right actuator 1018 may be a respective piston and cylinder pair. In some implementations, one or more of the center actuator 1014, the left actuator 1016, and/or the right actuator 1018 may be an electric motor or a solenoid.

The static D-gap panel 1006 is attached to the back of the cab 10c, 10d and extends horizontally rearward towards the trailer 10b. The static D-gap panel 1006 may be physically coupled to the back of the cab 10c, 10d via one or more elongated straps 1026 that extend rearward from the cab 10c, 10d towards the trailer 10b. The static D-gap panel 1006 has a D-shaped profile, with a minor edge 1020 proximate the back of the cab 10c, 10d. The minor edge 1020 may be substantially straight in some implementations. The static D-gap panel 1006 may have a major edge 1022 opposing the minor edge 1020 that is distal to the cab 10*c*, 10*d*. In some implementations, the length of the major edge 1022 may be greater than the length of the minor edge 1020. One or more side edges 1024 may extend between the minor edge 1020 and the major edge 1022. Such one or more side edges 1024 may meet one or both of the minor edge 1020 and the major edge 1022 at a non-perpendicular angle. The static D-gap panel 1006 may be used to accommodate various shapes and configurations for the back of the cab 10*c*, 10*d*, thus enabling the deployable fairing system 1000 to be installed, for example, as a retrofit on existing tractors 10*a* without creating a gap between the deployable fairing system 1000 and the back of the cab 10*c*, 10*d*. In some implementations, the deployable fairing system 1000 may not include the static D-gap panel 1006.

The proximal end of the center actuator 1014 is pivotally coupled to the back of the cab 10*c*, 10*d* with one or more center hinges 1028 that enable the center actuator 1014 to pivot about a horizontal, lateral axis 1030 that extends through the center hinges 1028 that couple the center actuator 1014 to the back of the cab 10*c*, 10*d*. The center actuator 1014 rotates about the horizontal, lateral axis 1030 as the deployable fairing 1002 moves between the retracted configuration 1100 (FIGS. 11A and 11B) and the deployed configuration 1004. When the deployable fairing 1002 is in the deployed configuration 1004, the distal end of the center actuator 1014 is located upward and rearward from the proximal end of the center actuator 1014, and is attached to the upper horizontal panel assembly 1008 with one or more upper hinges 1031. The upper hinges 1031 enable the center actuator 1014 and the upper horizontal panel assembly 1008 to rotate relative to each other as the center actuator 1014 moves the deployable fairing 1002 between the retracted configuration 1100 and the deployed configuration 1004.

The upper horizontal panel assembly 1008 may include a deployable upper panel 1032, a left upper wing panel 1034, and a right upper wing panel 1036. The deployable upper panel 1032 may be shaped like a trapezoid, with two bases, or parallel sides, (leading edge 1038 and trailing edge 1040) that extend in a lateral direction across the width 10*e* of the cab 10*c*. In some implementations, the deployable upper panel 1032 may be shaped like a trapezoid but with one or more corners along the longer base cut off to form two additional short sides. In some implementations, the leading edge 1038 of the deployable upper panel 1032 is located proximate the static D-gap panel 1006 and forms a major edge that is pivotally coupled to the major edge 1022 of the static D-gap panel 1006 using one or more hinges. The hinges enable the deployable upper panel 1032 to rotate about an upper horizontal axis 1042 that extends in a lateral direction across the width 10*e* of the cab 10*c*, parallel to the major edge 1022 and perpendicular to the direction of travel during normal operation, as discussed below. When the deployable fairing 1002 is in the deployed configuration 1004, the deployable upper panel 1032 may extend rearwardly from the upper horizontal axis 1042 and be titled relatively upward from the upper horizontal axis 1042 in which the trailing edge 1040 of the deployable upper panel 1032 is positioned relatively above the leading edge 1038 of the deployable upper panel 1032. The two legs (left leg 1044 and right leg 1046) of the deployable upper panel 1032 form axes (left axis 1048 and right axis 1050) that have non-zero acute angles with respect to the major edge 1022 and the upper horizontal axis 1042 of the deployable upper panel 1032. The left upper wing panel 1034 is pivotally coupled to the deployable upper panel 1032 using one or more hinges that form the left axis 1048 along the left leg 1044, and the right upper wing panel 1036 is pivotally coupled to the deployable upper panel 1032 using one or more hinges that form the right axis 1050 along the right leg 1046.

The left upper wing panel 1034 has a triangular profile with a distal edge 1052, an outside edge 1054, and an interior edge 1056. The outside edge 1054 forms the outside left edge of the upper horizontal panel assembly 1008 when the deployable fairing 1002 is in the deployed configuration 1004. The outside edge 1054 may be pivotally coupled to the left side panel 1010 using one or more hinges that enable the left upper wing panel 1034 to pivot relative to a left horizontal axis 1058 formed by the top edge of the left side panel 1010. The hinges that pivotally couple the left upper wing panel 1034 to the deployable upper panel 1032 along the left axis 1048 enable the left upper wing panel 1034 and the deployable upper panel 1032 to pivot relative to one another as the deployable fairing 1002 moves between the retracted configuration 1100 and the deployed configuration 1004.

The right upper wing panel 1036 is located opposite the left upper wing panel 1034 across the deployable upper panel 1032. The right upper wing panel 1036 has a triangular profile with a distal edge 1060, an outside edge 1062, and an interior edge 1064. The outside edge 1062 forms the outside right edge of the upper horizontal panel assembly 1008 when the deployable fairing 1002 is in the deployed configuration 1004. The outside edge 1062 may be pivotally coupled to the right side panel 1012 using one or more hinges that enable the right upper wing panel 1036 to pivot relative to a right horizontal axis 1066 formed by the top edge of the right side panel 1012. The hinges that pivotally couple the right upper wing panel 1036 to the deployable upper panel 1032 along right axis 1050 enable the right upper wing panel 1036 and the deployable upper panel 1032 to pivot relative to one another as the deployable fairing 1002 moves between the retracted configuration 1100 and the deployed configuration 1004.

The left and the right side panels 1010 and 1012, respectively, are each pivotally coupled to the upper horizontal panel assembly 1008 along the left axis 1048 and right axis 1050, respectively of the deployable upper panel 1032. In some implementations, the left side panel 1010 may be coupled to a left hinge 1011 that is comprised of a base 1011*a* and an arm 1011*b*. The base 1011*a* may be physically coupled to the back of the cab 10*c*. As such, in some implementations, the left hinge 1011 may be the only hinge that directly couples the left side panel 1010 to the cab 10*c*. In some implementations, the left side panel 1010 may rotatably couple to the cab 10*c* via multiple hinges. A proximal end of the arm 1011*b* of the left hinge 1011 may rotatably couple to the base 1011*a* and rotate about a left vertical hinge axis 1068. A distal end of the arm 1011*b* may be physically coupled to the left side panel 1010. In some implementations, for example, the left side panel 1010 may be spaced along the arm 1011*b* such that a proximal edge 1072 of the left side panel 1010 is located at least two inches from the base 1011*a* of the left hinge 1011. In some implementations, the left side panel 1010 may be spaced along the arm 1011*b* by a distance that is one-half inch more than a length of the static cab fairing 17 that extends rearwardly from the back of the cab 10*c*. As such, the left side panel 1010 may be translated away from the back of the cab 10*c* and pivot about the left vertical hinge axis 1068 when the deployable fairing 1002 transitions to the deployed configuration 1004 from the retracted configuration 1100. In some implementations, a set of resilient shock absorbers 1011d may be interposed between the left side panel 1010 and the left hinge 1011 to absorb impacts, such as, for example, may occur with bumpy road or with objects hitting the left side panel 1010.

The right side panel 1012 may be coupled to a right hinge 1013 that is comprised of a base 1013a and an arm 1013b. The base 1013a may be physically coupled to the back of the cab 10c. As such, in some implementations, the right hinge 1013 may be the only hinge that directly couples the right side panel 1012 to the cab 10c. In some implementations, the right side panel 1012 may rotatably couple to the cab 10c via multiple hinges. A proximal end of the arm 1013b of the right hinge 1013 may rotatably couple to the base 1013a and rotate about a right vertical hinge axis 1070. A distal end of the arm 1013b may be physically coupled to the right side panel 1012. In some implementations, for example, the right side panel 1012 may be spaced along the arm 1013b such that a proximal edge 1074 of the right side panel 1012 is located at least two inches from the base 1013a of the right hinge 1013. In some implementations, the right side panel 1012 may be spaced along the arm 1013b by a distance that is one-half inch more than a length of the static cab fairing 17 that extends rearwardly from the back of the cab 10c. As such, the right side panel 1012 may be translated away from the back of the cab 10c and pivot about the right vertical hinge axis 1070 when the deployable fairing 1002 transitions to the deployed configuration 1004 from the retracted configuration 1100. In some implementations, a set of resilient shock absorbers 1013d may be interposed between the right side panel 1012 and the right hinge 1013 to absorb impacts, such as, for example, may occur with bumpy road or with objects hitting the right side panel 1012.

In some implementations, such as, for example, implementations in which a plurality of hinges rotatably couple the deployable upper panel 1032, the left upper wing panel 1034, and the right upper wing panel 1036, the deployable fairing 1002 may be kinematically over-constrained, but for a combined flexibility of the left side panel 1010 and/or the right side panel 1012. In such implementations, the left side panel 1010 and/or the right side panel 1012 may be comprised of a respective skin and frame, as discussed below. Such skins may be comprised of glass reinforced plastic (e.g., polypropylene and glass fiber) that may be attached to the frame. The frame may be comprised of one or more tubes.

Such vertical axes (left vertical axis 1068 and right vertical axis 1070) may extend along or parallel to the proximal edge 1072 of the left side panel 1010 and the proximal edge 1074 of the right side panel 1012, both relative to the cab 10c. Such vertical axes (left vertical hinge axis 1068 and right vertical hinge axis 1070) may be perpendicular to the upper horizontal axis 1042 about which the deployable upper panel 1032 rotates. In some implementations, the proximal edge 1072 of the left side panel 1010 and the proximal edge 1074 of the right side panel 1012 may be located away from the left vertical hinge axis 1068 and the right vertical hinge axis 1070, respectively. In some implementations, neither the proximal edge 1072 of the left side panel 1010 nor the proximal edge 1074 of the right side panel 1012 includes any hinges. In some such implementations, the left and the right side panels 1010 and 1012, respectively, are physically coupled to the other components of the fairing system 1000 only through the pivotal couplings with the upper left wing panel 1034 and right upper wing panel 1036 of the upper horizontal panel assembly 1008. In some implementations, the left side panel 1010 and the right side panel 1012 may have no vertical hinges along the respective proximal edges 1072 and 1074.

In some implementations, the left side panel 1010 may be rotatably translated and pivoted by the left actuator 1016. The proximal end of the left actuator 1016 may be pivotally coupled to the base 1011a of the left hinge 1011 that is located proximate the back of the cab 10c, 10d. This rotatable coupling to the base 1011a of the left hinge 1011 may enable the left actuator 1016 to pivot about a left actuator vertical axis 1078 that extends vertically through the base 1011a of the left hinge 1011. A distal end of the left actuator 1016 may be coupled to the arm 1011b of the left hinge 1011 at a distance from the base 1011a. Thus, the left hinge 1011 and left actuator 1016 may advantageously form an integral unit, installable or replaceable as a single unit. The left actuator 1016 rotates about the left actuator vertical axis 1078 as the deployable fairing 1002 moves between the retracted configuration 1100 (FIGS. 11A and 11B) and the deployed configuration 1004, thereby applying an outward and rearward force on the left side panel 1010 to translate and pivot the left side panel 1010 away from the back of the cab 10c. When the deployable fairing 1002 is in the deployed configuration 1004, the distal end of the left actuator 1016 is located rearward and outward from the proximal end of the left actuator 1016, and is attached to the arm 1011b of the left hinge 1011 and/or to the left side panel 1010 with one or more left side panel hinges 1080. The left side panel hinges 1080 enable the left actuator 1016 to rotate relative to the arm 1011b of the left hinge 1011 and/or to the left side panel 1010 as the deployable fairing 1002 moves between the retracted configuration 1100 and the deployed configuration 1004. In some implementations, the left actuator vertical axis 1078 may be co-located with the left vertical hinge axis 1068. In some implementations, such as that shown in FIGS. 10A through 10E the left actuator vertical axis 1078 may be offset from the left vertical hinge axis 1068. In some implementations, the left actuator 1016 may be directly, rotatably, physically coupled to either or both of the back of the cab 10c and/or the left side panel 1010.

In some implementations, the right side panel 1012 may be rotatably translated and pivoted by the right actuator 1018. The proximal end of the right actuator 1018 is pivotally coupled to the base 1013a of the right hinge 1013 that is located proximate the back of the cab 10c, 10d that enables the right actuator 1018 to pivot about a right actuator vertical axis 1084 that extends through the right hinge 1013. A distal end of the right actuator 1018 may be coupled to the arm 1013b of the right hinge 1013 at a distance from the base 1013a. Thus, the right hinge 1013 and right actuator 1018 may advantageously form an integral unit, installable or replaceable as a single unit. The right actuator 1018 rotates about the right actuator vertical axis 1084 as the deployable fairing 1002 moves between the retracted configuration 1100 (FIGS. 11A and 11B) and the deployed configuration 1004, thereby applying an outward and rearward force on the right side panel 1012 to translate and pivot the right side panel 1012 away from the back of the cab 10c. When the deployable fairing 1002 is in the deployed configuration 1004, the distal end of the right actuator 1018 is located rearward and outward from the proximal end of the right actuator 1018, and is attached to the arm 1013b of the right hinge 1013 and/or to the right side panel 1012 with one or more right side panel hinges 1086. The right side panel hinges 1086 enable the right actuator 1018 and the right side panel 1012 to rotate relative to each other as the deployable fairing 1002 moves between the retracted configuration 1100 and the deployed configuration 1004. In some implementations, the right actuator vertical axis 1084 may be co-located with the right vertical hinge axis 1070. In some implementations, such as that shown in FIGS. 10A through 10E the right actuator vertical axis 1084 may be offset from the right vertical hinge axis 1070. In some implementations, the right actuator 1018 may be directly, rotatably, physically coupled to either or both of the back of the cab 10c and/or the right side panel 1012.

The left and the right side panels 1010 and 1012, respectively, each extend vertically with respect to the cab 10c, 10d when the deployable fairing 1002 is both in the unextended or retracted configuration 1100 and in the extended or deployed configuration 1004. When the deployable fairing 1002 is in the deployed configuration 1004, the left and the right side panels 1010 and 1012 may be substantially parallel to the direction of travel during normal operation and substantially perpendicular to the upper horizontal panel assembly 1008, extending rearwardly from the cab 10c. In some implementations, the left and the right side panels 1010 and 1012 may alternatively be at a positive slope, slightly flaring out from vertical planes that extend rearwardly from the side of the cab 10c, when the deployable fairing 1002 is in the deployed configuration 1004. As such, the left side panel 1010 and the right side panel 1012 may taper outwardly in a direction going from a front of the fairing system 1000 toward a rear of the fairing system 1000. When the deployable fairing 1002 is in the retracted configuration 1100, the left and the right side panels 1010 and 1012 pivot into the back of the cab 10c to extend laterally with respect to the cab 10c, to be substantially perpendicular to the direction of travel during normal operation. In some implementations, the left and the right side panels 1010 and 1012 may be rotated inward towards the back of the cab 10c by a certain angle (e.g., rotated inward by about 45° from their respective locations in the deployed configuration 1004).

In some implementations when the deployable fairing 1002 is in the deployed configuration 1004, the left side panel 1010 and the right side panel 1012 may taper outwardly in a direction going from a front of the fairing system 1000 toward the rear of the fairing system, and at the same time, the deployable upper panel 1032 may be titled relatively upward from the upper horizontal axis 1042 in which the trailing edge 1040 of the deployable upper panel 1032 is positioned relatively above the leading edge 1038 of the deployable upper panel 1032. In such an implementation, an area enclosed by a perimeter defined by the deployable upper panel 1032, the left side panel 1010, and the right side panel 1012 distal from the front of the fairing system 1000 may be greater than an area enclosed by a perimeter defined by the deployable upper panel 1032, the left side panel 1010, and the right side panel 1012 proximate the front of the fairing system 1000.

Figure 11A:
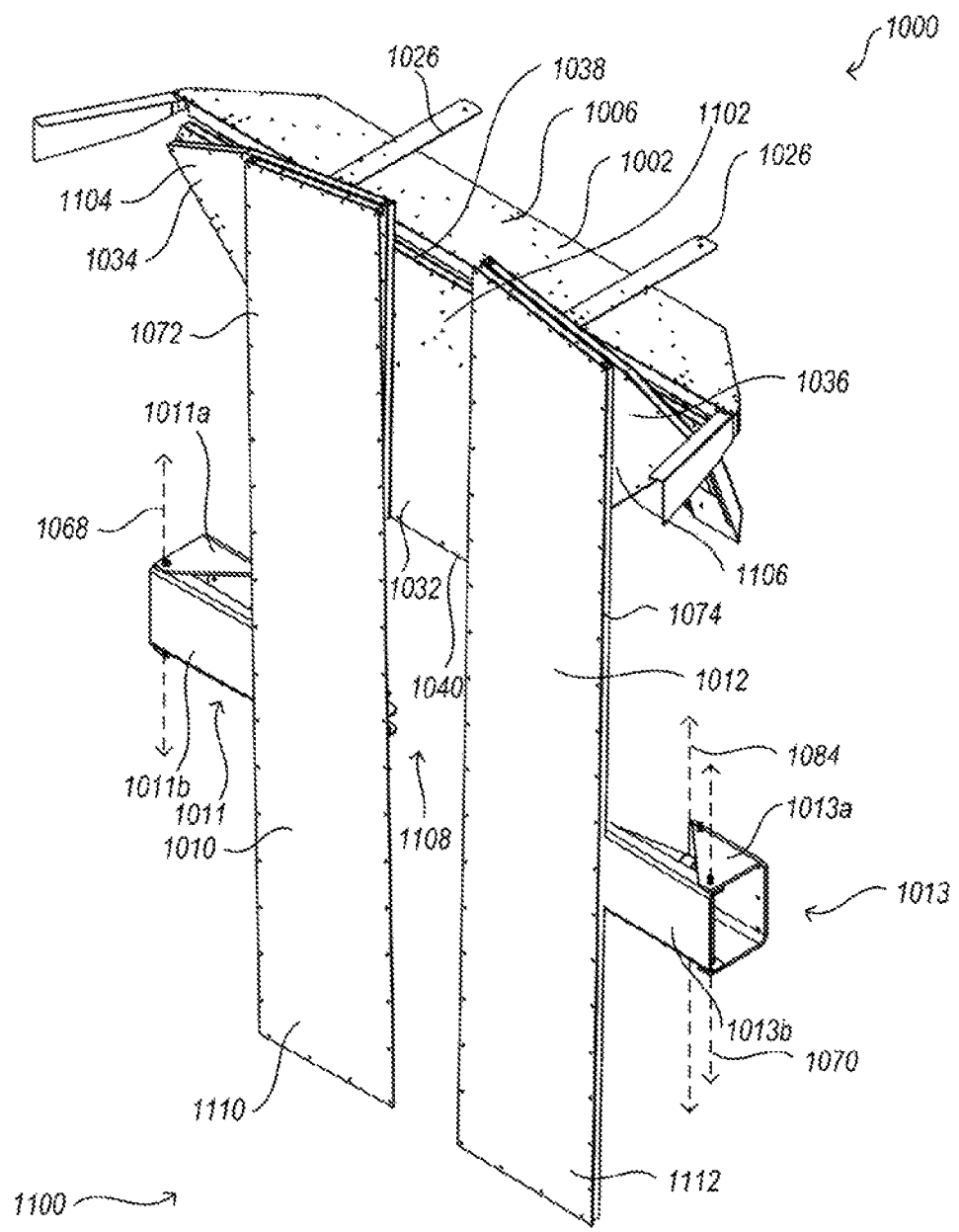
FIG. 11A is a top, rear, right-side isometric view of the deployable fairing of FIG. 10A in which the deployable fairing is shown in a retracted configuration, according to at least one illustrated implementation.
Figure 11B:
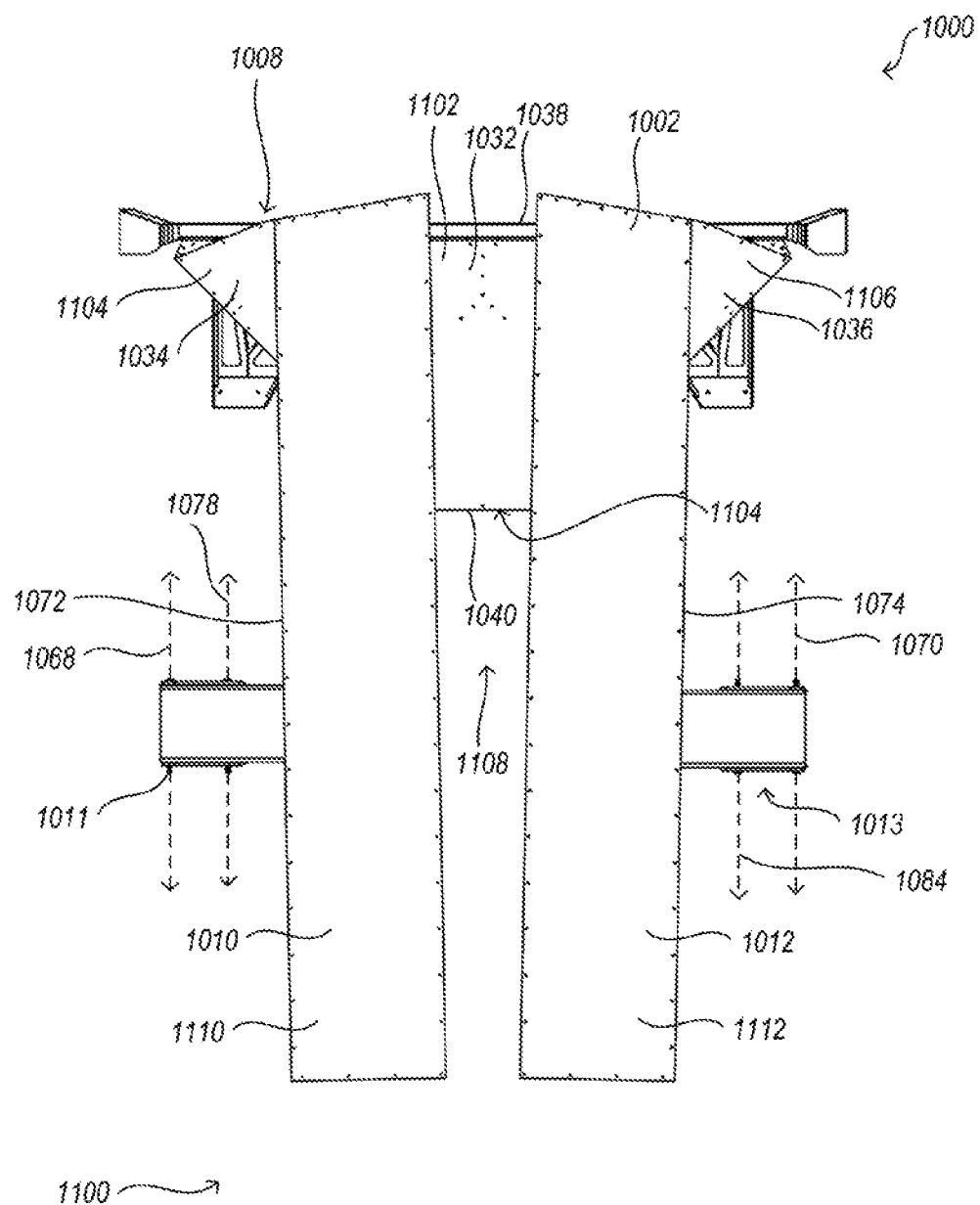
FIG. 11B is a rear elevational view of the deployable fairing of FIG. 10A in which the deployable fairing is shown in a retracted configuration, according to at least one illustrated implementation.

FIGS. 11A and 11B show the deployable fairing system 1000 with the deployable fairing 1002 shown in the retracted position 1100, according to at least one illustrated implementation. In the retracted or un-deployed configuration 1100, each of the deployable upper panel 1032, the left upper wing panel 1034, the right upper wing panel 1036, the left side panel 1010, and the right side panel 1012 may be in a vertical position, arrayed laterally in one or more layers stacked with respect to the back of the cab 10c, 10d. In some implementations, the deployable upper panel 1032 is closest to the cab 10c and extends at a negative angle relatively downward with respect to a horizontal plan that passes through a pivot axis and is parallel to a surface on which the vehicle travels, such that the trailing edge 1040 is placed relatively below the leading edge 1038 of the deployable upper panel 1032. When not deployed or stowed, the deployable upper panel 1032 may extend at a positive angle, relatively upward with respect to the horizontal plan that passes through a pivot axis and is parallel to a surface on which the vehicle travels, for example flush with a back of the cab 10c, 10d or even spring loaded under tension against the back of the cab 10c, 10d. The deployable upper panel 1032 has an upper surface 1102, opposing and separated by a width from the lower surface 1104, in which the upper surface 1102 faces away from the back of the cab 10c towards the trailer 10b.

The left and right upper wing panels 1034 and 1036, respectively, respectively, may be folded against, and form a second layer adjacent to, the deployable upper panel 1032 when the deployable fairing 1002 is in the retracted configuration 1100. Thus, upper surfaces of the left and the right upper wing panels 1034 and 1036 may be adjacent to and facing the upper surface 1102 of the deployable upper panel 1032. Further, the left and the right upper wing panels 1034 and 1036 may each have respective lower surfaces 1104 and 1106, opposing and separated from the upper surfaces by one or more widths, in which the respective lower surfaces 1104 and 1106 face away from the back of the cab 10c towards the trailer 10b.

The left and the right side panels 1010 and 1012, respectively, may be folded against, and form a third layer adjacent to, the left and the right upper wing panels 1034 and 1036, respectively, when the deployable fairing 1002 is in the retracted configuration 1100. The left and the right side panels 1010 and 1012 may extend laterally in a line parallel to the back of the cab 10c, 10d and cover a portion, all, or substantially all of the other components of the deployable fairing 1002. A gap 1108 may exist between the left and the right side panels 1010 and 1012 in the retracted configuration 1100. The left and the right side panels 1010 and 1012 have interior surfaces that are adjacent to and face the lower surfaces 1104 and 1106 of the left and the right upper wing panels 1034 and 1036 when the deployable fairing 1002 is in the retracted configuration 1100. The left and the right side panels 1010 and 1012 have exterior surfaces 1110 and 1112, respectively, that are separated from the interior surfaces by one or more widths and face away from the back of the cab 10c towards the trailer 10b.

In some implementations, the left side panel 1010 and/or the right side panel 1012 may be comprised of a flexible, elastic material, as discussed below. In such implementations in which the left side panel 1010 is comprised of flexible, elastic material, the left side panel 1010 may be elastically deformed (e.g., flexed) in the retracted configuration 1100 in order to load the left side panel 1010 without plastically deforming the left side panel 1010, the left upper wing panel 1034, and/or the deployable upper panel 1032. In such implementations in which the right side panel 1012 is comprised of flexible, elastic material, the right side panel 1012 may be elastically deformed in the retracted configuration 1100 in order to load the right side panel 1012 without plastically deforming the right side panel 1012, the right upper wing panel 1036, and/or the deployable upper panel 1032.

Figure 12A:
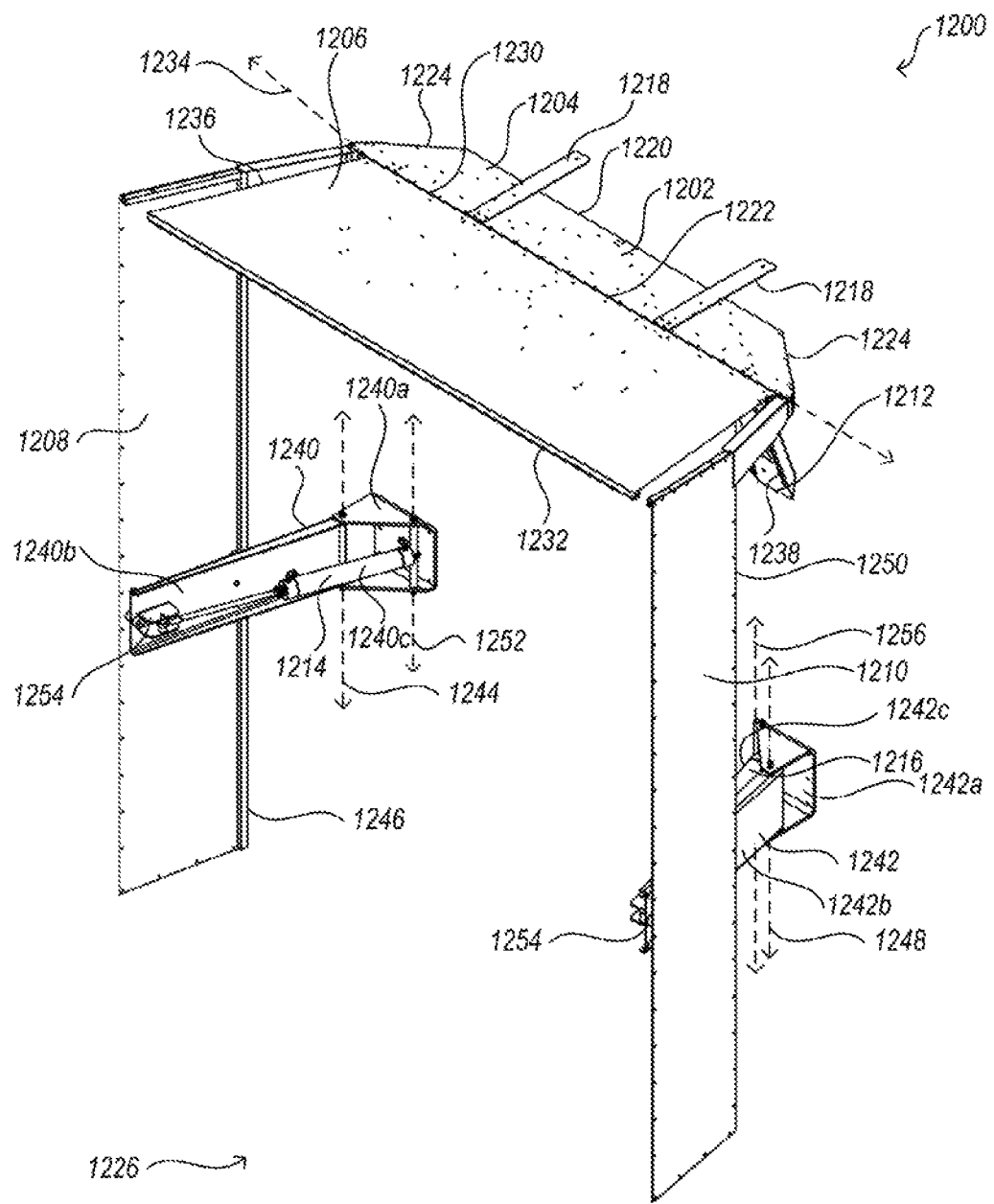
FIG. 12A is a top, rear, right-side isometric view of a deployable fairing in which side panels are separated from a deployable upper panel, according to at least one illustrated implementation.
Figure 12B:
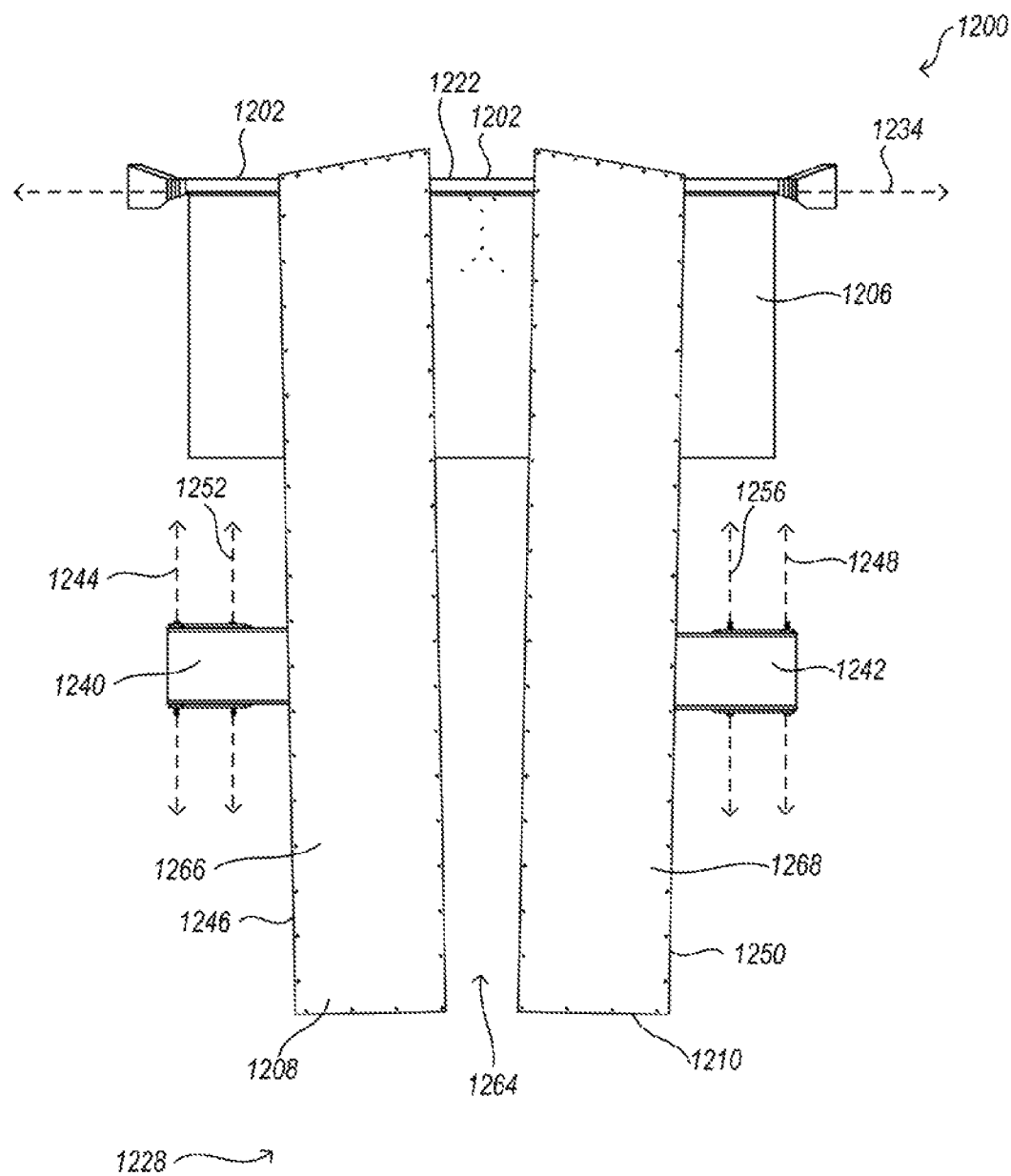
FIG. 12B is a rear elevational view of the deployable fairing of FIG. 12A in which the deployable fairing is in a retracted configuration, according to at least one illustrated implementation.
Figure 12C:
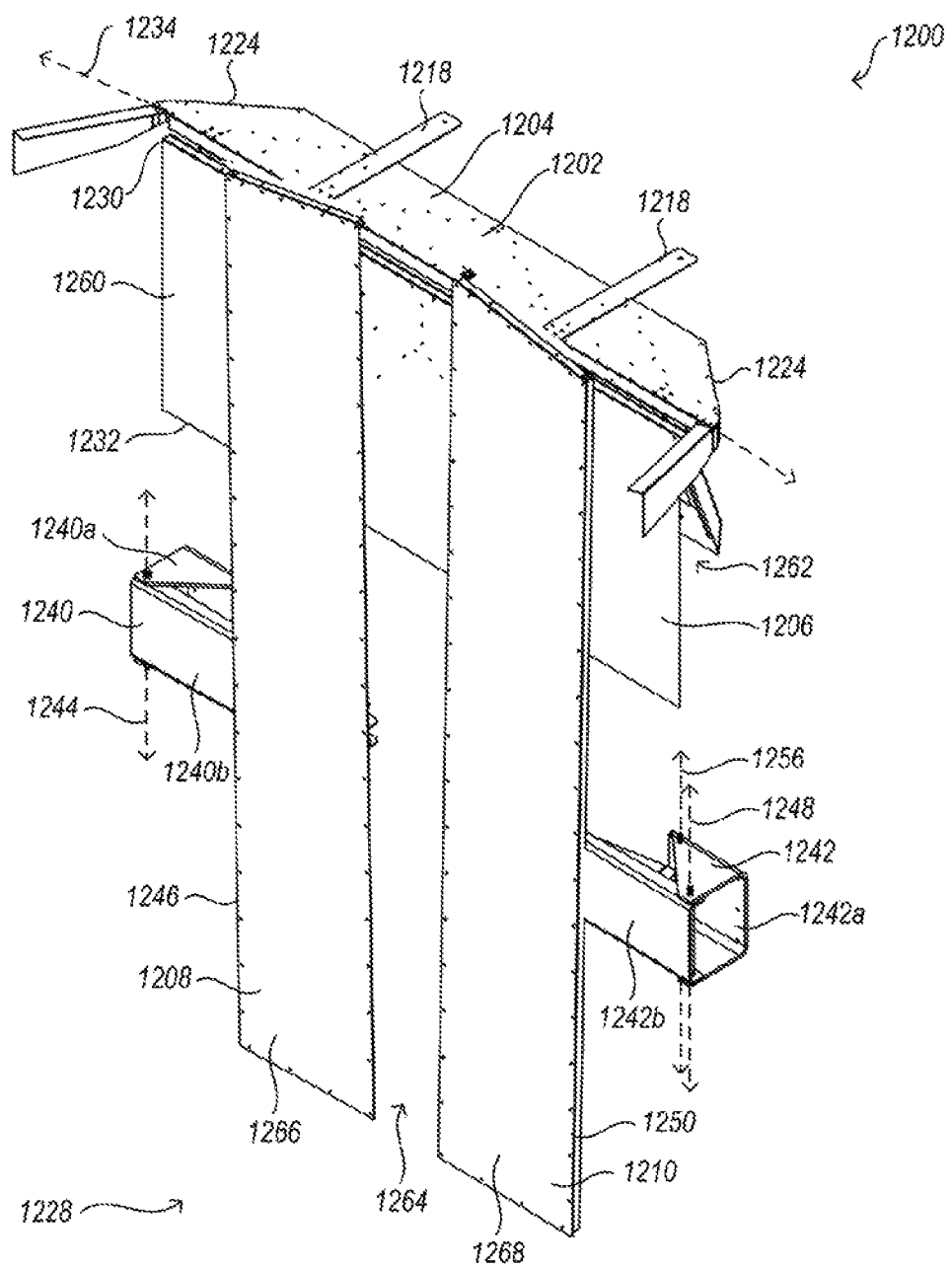
FIG. 12C is a top, rear, right-side isometric view of the deployable fairing of FIG. 12A in which the deployable fairing is in the retracted configuration, according to at least one illustrated implementation.
Figure 13A:
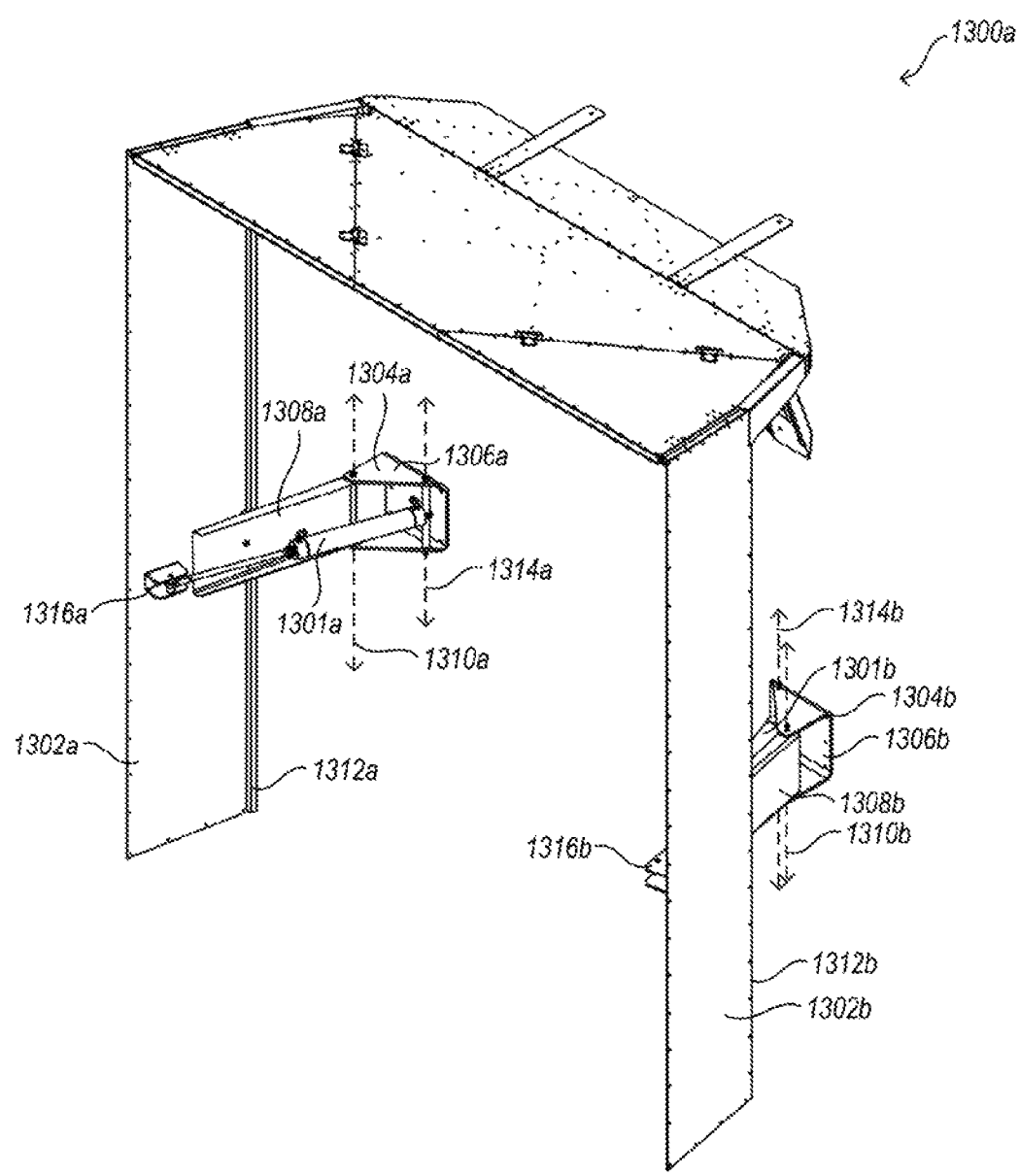
FIG. 13A is a top, rear, right-side isometric view of a deployable fairing in which one end of each side hinge is physically, rotatably coupled directly to the respective side panel, according to at least one illustrated implementation.
Figure 13B:
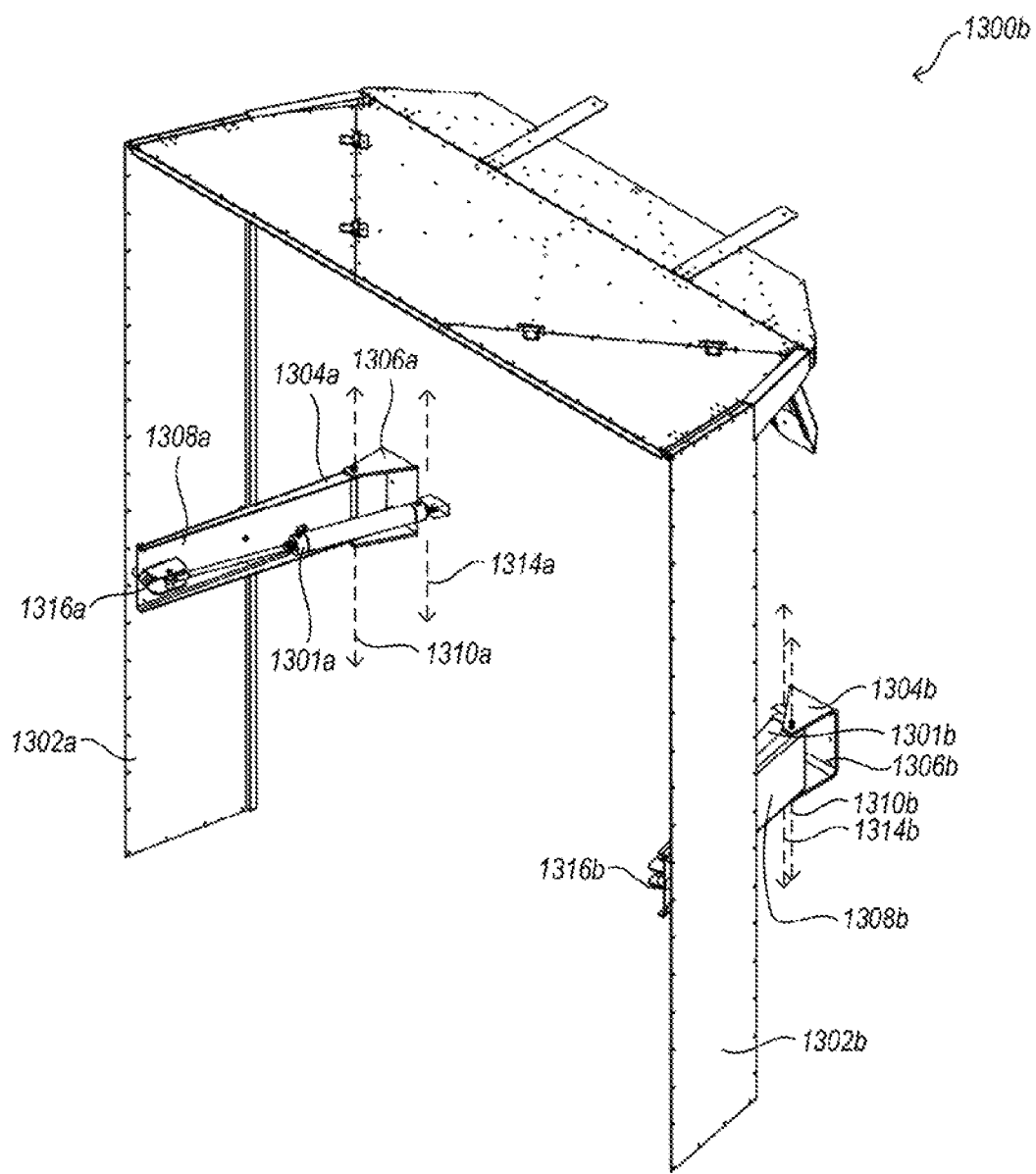
FIG. 13B is a top, rear, right-side isometric view of a deployable fairing in which one end of each side hinge is physically, rotatably coupled directly to the back of a cab, according to at least one illustrated implementation.
Figure 13C:
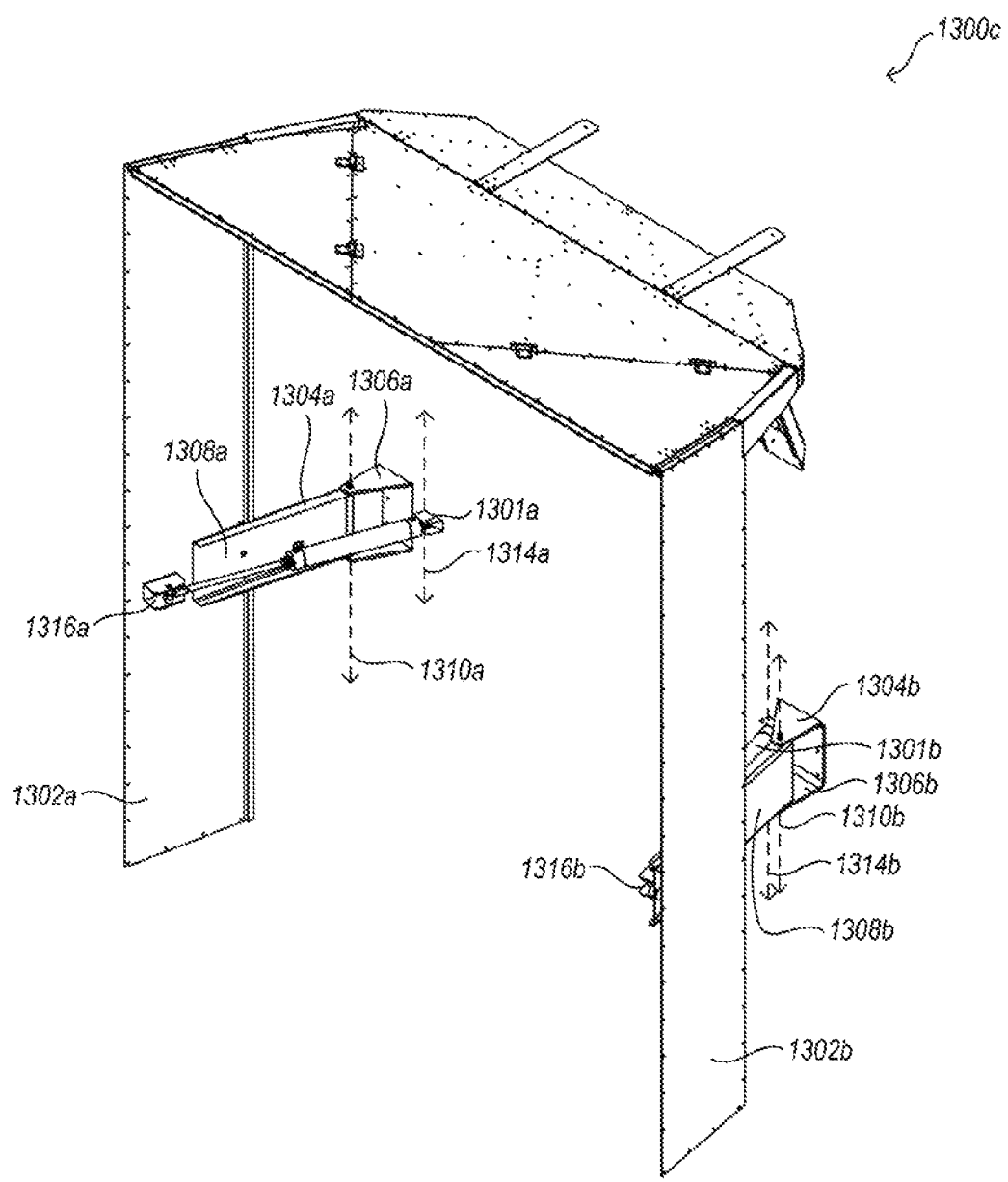
FIG. 13C is a top, rear, right-side isometric view of a deployable fairing in which one end of each side hinge is physically, rotatably coupled directly to the respective side panel, and the other end of each side hinge is physically, rotatably coupled directly to the back of a cab, according to at least one illustrated implementation.
Figure 13D:
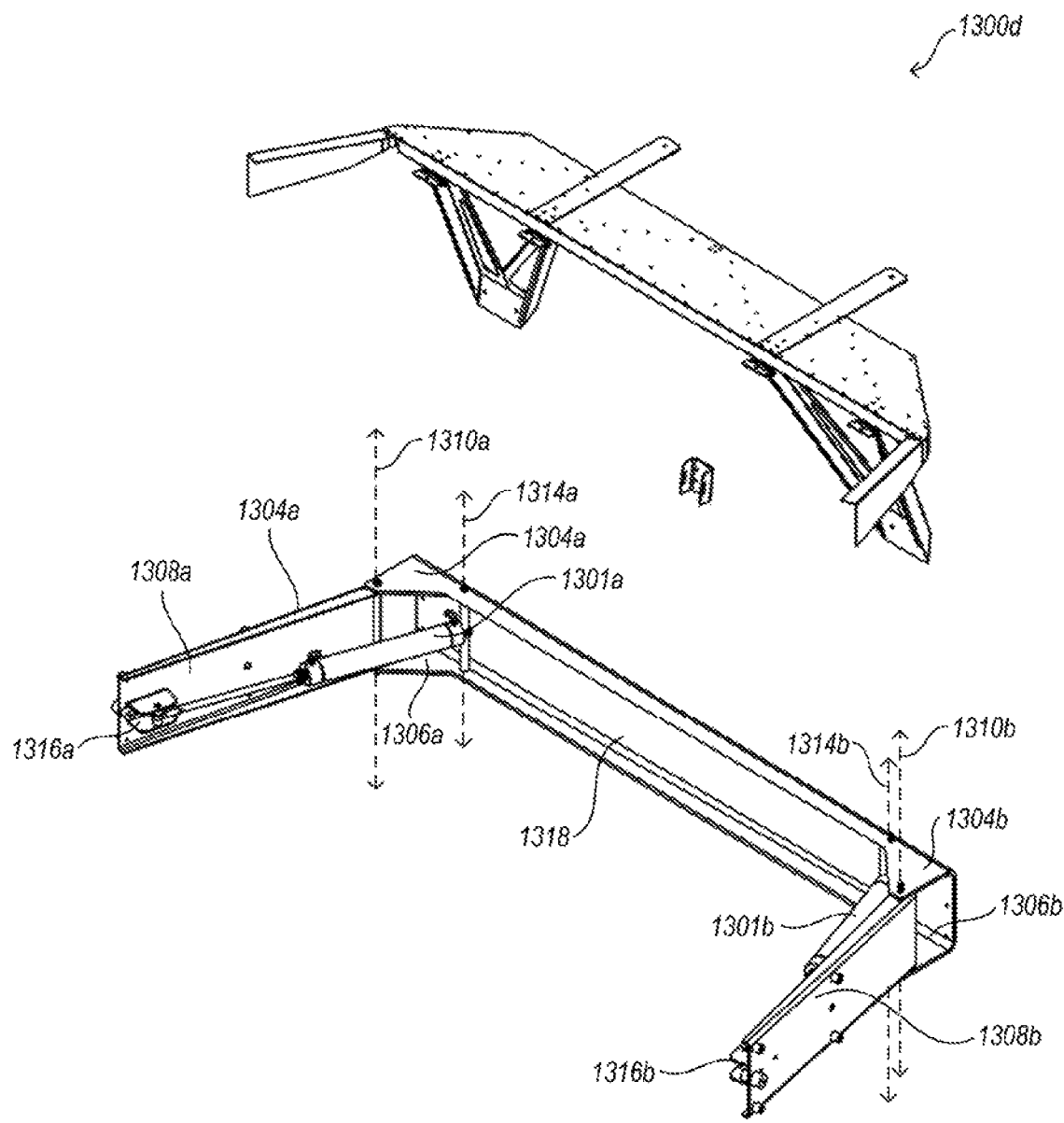
FIG. 13D is a top, rear, right-side isometric view of a portion of a deployable fairing in which one end of each side hinge is physically, rotatably coupled to a panel that extends across the back of the cab, according to at least one illustrated implementation.

FIGS. 12A, 12B, and 12C show another type of fairing system 1200 in which a deployable fairing 1202 includes a static D-gap panel 1204, a deployable upper panel 1206, a left side panel 1208, and a right side panel 1210. In some implementations, the fairing system 1200 may include a center actuator 1212, a left actuator 1214, and a right actuator 1216. In some implementations, one or more of the center actuator 1212, the left actuator 1214, and/or the right actuator 1216 may be a respective piston and cylinder pair. In some implementations, one or more of the center actuator 1212, the left actuator 1214, and/or the right actuator 1216 may be an electric motor or a solenoid.

The static D-gap panel 1204 is attached to the back of the cab 10c, 10d and extends horizontally rearward towards the trailer 10b. The static D-gap panel 1204 may be physically coupled to the back of the cab 10c, 10d via one or more elongated straps 1218 that extend rearward from the cab 10c, 10d towards the trailer 10b. The static D-gap panel 1204 has a D-shaped profile, with a minor edge 1220 proximate the back of the cab 10c, 10d. The minor edge 1220 may be substantially straight in some implementations. The static D-gap panel 1204 may have a major edge 1222 opposing the minor edge 1220 that is distal to the cab 10c, 10d. In some implementations, the length of the major edge 1222 may be greater than the length of the minor edge 1220. One or more side edges 1224 may extend between the minor edge 1220 and the major edge 1222. Such one or more side edges 1224 may meet one or both of the minor edge 1220 and the major edge 1222 at a non-perpendicular angle. The static D-gap panel 1204 may be used to accommodate various shapes and configurations for the back of the cab 10c, 10d, thus enabling the deployable fairing system 1200 to be installed, for example, as a retrofit on existing tractors 10a without creating a gap between the deployable fairing system 1200 and the back of the cab 10c, 10d. In some implementations, the deployable fairing system 1200 may not include the static D-gap panel 1204.

The proximal end of the center actuator 1212 may be pivotally coupled to the back of the cab 10c, 10d with one or more hinges that enable the center actuator 1212 to pivot about a horizontal, lateral axis that extends across the back of the cab 10c, 10d. The center actuator 1212 may rotate about the horizontal, lateral axis as the deployable fairing 1202 moves between a deployed configuration 1226 (FIG. 12A) and a retracted configuration 1228 (FIG. 12B). When the deployable fairing 1202 is in the deployed configuration 1226, the center actuator 1212 may apply an upward force to the deployable upper panel 1206 such that the deployable upper panel 1206 extends rearwardly away from the back of the cab 10c.

The deployable upper panel 1206 may be shaped like a trapezoid, with two bases, or parallel sides, (leading edge 1230 and trailing edge 1232) that extend in a lateral direction across the width 10e of the cab 10c. In some implementations, the deployable upper panel 1206 may be shaped like a trapezoid but with one or more corners along the longer base cut off to form two additional short sides. In some implementations, the leading edge 1230 of the deployable upper panel 1206 is located proximate the static D-gap panel 1204 and forms a major edge that is pivotally coupled to the major edge 1222 of the static D-gap panel 1204 using one or more hinges. The hinges enable the deployable upper panel 1206 to rotate about an upper horizontal axis 1234 that extends in a lateral direction across the width 10e of the cab 10c, parallel to the major edge 1222 and perpendicular to the direction of travel during normal operation, as discussed below. When the deployable fairing 1202 is in the deployed configuration 1226, the deployable upper panel 1206 may extend rearwardly from the upper horizontal axis 1234 and be titled relatively upward from the upper horizontal axis 1234 in which the trailing edge 1232 of the deployable upper panel 1206 is positioned relatively above the leading edge 1230 of the deployable upper panel 1206. A left side edge 1236 and a right side edge 1238 may extend between the leading edge 1230 and the trailing edge 1232

The left and the right side panels 1208 and 1210, respectively, are each physically coupled to a left hinge 1240 and a right hinge 1242, respectively. The left hinge 1240 may be comprised of a base 1240a and an arm 1240b. The base 1240a may be physically coupled to the back of the cab 10c. As such, in some implementations, the left hinge 1240 may be the only hinge that directly couples the left side panel 1208 to the cab 10c. A proximal end of the arm 1240b of the left hinge 1240 may rotatably couple to the base 1240a and rotate about a left vertical hinge axis 1244. A distal end of the arm 1240b may be physically coupled to the left side panel 1208. In some implementations, for example, the left side panel 1208 may be spaced along the arm 1240b such that a proximal edge 1246 of the left side panel 1208 is located at least two inches from the base 1240a of the left hinge 1240. In some implementations, the left side panel 1208 may be spaced along the arm 1240b by a distance that is one-half inch more than a length of the static cab fairing 17 that extends rearwardly from the back of the cab 10c. In such implementations, the left side panel 1208 may be translated away from the back of the cab 10c and pivot about the left vertical hinge axis 1244 when the deployable fairing 1202 transitions to the deployed configuration 1226 from the retracted configuration 1228. In some implementations, a set of resilient shock absorbers 1240c may be interposed between the left side panel 1208 and the left hinge 1240 to absorb impacts, such as, for example, may occur with bumpy road or with objects hitting the left side panel 1208.

The right side panel 1210 may be coupled to a right hinge 1240 that is comprised of a base 1240a and an arm 1240b. The base 1240a may be physically coupled to the back of the cab 10c. As such, in some implementations, the right hinge 1240 may be the only hinge that directly couples the right side panel 1210 to the cab 10c. A proximal end of the arm 1242b of the right hinge 1242 may rotatably couple to the base 1242a and rotate about a right vertical hinge axis 1248. A distal end of the arm 1242b may be physically coupled to the right side panel 1210. In some implementations, for example, the right side panel 1210 may be spaced along the arm 1242b such that a proximal edge 1250 of the right side panel 1210 is located at least two inches from the base 1242a of the right hinge 1242. In some implementations, the right side panel 1210 may be spaced along the arm 1242b by a distance that is one-half inch more than a length of the static cab fairing 17 that extends rearwardly from the back of the cab 10c. As such, the right side panel 1210 may be translated away from the back of the cab 10c and pivot about the right vertical hinge axis 1248 when the deployable fairing 1202 transitions to the deployed configuration 1226 from the retracted configuration 1228. In some implementations, a set of resilient shock absorbers 1242c may be interposed between the right side panel 1210 and the right hinge 1242 to absorb impacts, such as, for example, may occur with bumpy road or with objects hitting the right side panel 1210.

The left vertical axis 1244 and the right vertical axis 1248 may extend along or parallel to the proximal edge 1246 of the left side panel 1208 and the proximal edge 1250 of the right side panel 1210, respectively. The left vertical hinge axis 1244 and right vertical hinge axis 1248 may be perpendicular to the upper horizontal axis 1234 about which the deployable upper panel 1206 rotates. In some implementations, the proximal edge 1246 of the left side panel 1208 and the proximal edge 1250 of the right side panel 1210 may be located away from the left vertical hinge axis 1244 and the right vertical hinge axis 1248, respectively. In some implementations, neither the proximal edge 1246 of the left side panel 1208 nor the proximal edge 1250 of the right side panel 1210 includes any hinges. In some such implementations, the left and the right side panels 1208 and 1210, respectively, are separated from and not coupled to the deployable upper panel 1206. In some implementations, the left side panel 1208 and the right side panel 1210 may not be physically coupled to any vertical hinges along the respective proximal edges 1246 and 1250.

In some implementations, the left side panel 1208 may be rotatably translated and pivoted by the left actuator 1214. The proximal end of the left actuator 1214 is pivotally coupled to the base 1240*a* of the left hinge 1240 that is located proximate the back of the cab 10*c*, 10*d*. Such a rotatable coupling to the base 1240*a* of the left hinge 1240 enables the left actuator 1214 to pivot about a left actuator vertical axis 1252 that vertically extends through the base 1240*a* of the left hinge 1240. A distal end of the left actuator 1214 may be coupled to the arm 1240*b* of the left hinge 1240 at a distance from the base 1240*a*. The left actuator 1214 rotates about the left actuator vertical axis 1252 as the deployable fairing 1202 moves between the retracted configuration 1228 (FIG. 12B) and the deployed configuration 1226 (FIG. 12A), thereby applying an outward and rearward force on the left side panel 1208 to translate and pivot the left side panel 1208 away from the back of the cab 10*c*. When the deployable fairing 1202 is in the deployed configuration 1226, the distal end of the left actuator 1214 may be located rearward and outward from the proximal end of the left actuator 1214, and is attached to the arm 1240*b* of the left hinge 1240 and/or to the left side panel 1208 with one or more left side panel hinges 1254. The left side panel hinges 1254 enable the left actuator 1214 to rotate relative to the arm 1240*b* of the left hinge 1240 and/or to the left side panel 1208 as the deployable fairing 1202 moves between the retracted configuration 1228 and the deployed configuration 1226. In some implementations, the left actuator vertical axis 1252 may be co-located with the left vertical hinge axis 1244. In some implementations, such as that shown in FIGS. 12A through 12C the left actuator vertical axis 1252 may be offset from the left vertical hinge axis 1244. In some implementations, the left actuator 1214 may be directly, rotatably, physically coupled to either or both of the back of the cab 10*c* and/or the left side panel 1208.

In some implementations, the right side panel 1210 may be rotatably translated and pivoted by the right actuator 1216. The proximal end of the right actuator 1216 may be pivotally coupled to the base 1242*a* of the right hinge 1242 that is located proximate the back of the cab 10*c*, 10*d*. Such a rotatable coupling to the base 1242*a* of the right hinge 1242 may enable the right actuator 1216 to pivot about a right actuator vertical axis 1256 that extends vertically through the base 1242*a* of the right hinge 1242. A distal end of the right actuator 1216 may be coupled to the arm 1242*b* of the right hinge 1242 at a distance from the base 1242*a*. The right actuator 1216 rotates about the right actuator vertical axis 1256 as the deployable fairing 1202 moves between the retracted configuration 1228 (FIG. 12B) and the deployed configuration 1226 (FIG. 12A), thereby applying an outward and rearward force on the right side panel 1210 to translate and pivot the right side panel 1210 away from the back of the cab 10*c*. When the deployable fairing 1202 is in the deployed configuration 1226, the distal end of the right actuator 1216 is located rearward and outward from the proximal end of the right actuator 1216, and is attached to the arm 1242*b* of the right hinge 1242 and/or to the right side panel 1210 with one or more right side panel hinges 1258. The right side panel hinges 1258 enable the right actuator 1216 to rotate relative to the arm 1242*b* of the right hinge 1242 and/or to the right side panel 1210 as the deployable fairing 1202 moves between the retracted configuration 1228 and the deployed configuration 1226. In some implementations, the right actuator vertical axis 1256 may be co-located with the right vertical hinge axis 1248. In some implementations, such as that shown in FIGS. 12A through 12C the right actuator vertical axis 256 may be offset from the right vertical hinge axis 1248. In some implementations, the right actuator 1216 may be directly, rotatably, physically coupled to either or both of the back of the cab 10*c* and/or the right side panel 1210.

The left and the right side panels 1208 and 1210, respectively, each extend vertically with respect to the cab 10*c*, 10*d* when the deployable fairing 1202 is both in the unextended or retracted configuration 1228 and in the extended or deployed configuration 1226. When the deployable fairing 1202 is in the deployed configuration 1226, the left and the right side panels 1208 and 1210 may be substantially parallel to the direction of travel during normal operation and substantially perpendicular to the deployable upper panel 1206, extending rearwardly from the cab 10*c*. In some implementations, the left and the right side panels 1208 and 1210 may alternatively be at a positive slope, slightly flaring out from vertical planes that extend rearwardly from the side of the cab 10*c*, when the deployable fairing 1202 is in the deployed configuration 1226. As such, the left side panel 1208 and the right side panel 1210 may taper outwardly in a direction going from a front of the fairing system 1200 toward a rear of the fairing system 1200. When the deployable fairing 1202 is in the retracted configuration 1228, the left and the right side panels 1208 and 1210 pivot into the back of the cab 10*c* to extend laterally with respect to the cab 10*c*, to be substantially perpendicular to the direction of travel during normal operation. In some implementations, the left and the right side panels 1208 and 1210 may be rotated inward towards the back of the cab 10*c* by a certain angle (e.g., rotated inward by about 45° from their respective locations in the deployed configuration 1226).

In some implementations when the deployable fairing 1202 is in the deployed configuration 1226 the left side panel 1208 and the right side panel 1210 may taper outwardly in a direction going from a front of the fairing system 1200 toward the rear of the fairing system, and at the same time, the deployable upper panel 1206 may be titled relatively upward from the upper horizontal axis 1234 in which the trailing edge 1232 of the deployable upper panel 1206 is positioned relatively above the leading edge 1230 of the deployable upper panel 1206. In such an implementation, an area enclosed by a perimeter defined by the deployable upper panel 1206, the left side panel 1208, and the right side panel 1210 distal from the front of the fairing system 1200 may be greater than an area enclosed by a perimeter defined by the deployable upper panel 1206, the left side panel 1208, and the right side panel 1210 proximate the front of the fairing system 1200.

FIG. 12B shows the deployable fairing system 1200 with the deployable fairing 1202 in the retracted position 1228, according to at least one illustrated implementation. In the retracted or un-deployed configuration 1228, each of the deployable upper panel 1206, the left side panel 1208, and the right side panel 1210 may be in a vertical position, arrayed in one or more layers stacked with respect to the back of the cab 10*c*, 10*d*. In some implementations, the deployable upper panel 1206 is closest to the cab 10*c* and extends at a negative angle relatively downward such that the trailing edge 1232 is placed relatively below the leading edge 1230 of the deployable upper panel 1206. The deployable upper panel 1206 has an upper surface 1260, opposing and separated by a width from the lower surface 1262, in which the upper surface 1260 faces away from the back of the cab 10c towards the trailer 10b.

The left and the right side panels 1208 and 1210, respectively, may be folded against, and form a second layer adjacent to, deployable upper panel 1206 when the deployable fairing 1202 is in the retracted configuration 1228. The left and the right side panels 1208 and 1210 may extend laterally in a line parallel to the back of the cab 10c, 10d and cover a portion, all, or substantially all of the other components of the deployable fairing 1202. A gap 1264 may exist between the left and the right side panels 1208 and 1210 in the retracted configuration 1228. The left and the right side panels 1208 and 1210 have interior surfaces that are adjacent to and face the deployable upper panel 1206 when the deployable fairing 1202 is in the retracted configuration 1228. The left and the right side panels 1208 and 1210 have exterior surfaces 1266 and 1268, respectively, that are separated from the interior surfaces by one or more widths and face away from the back of the cab 10c towards the trailer 10b.

In some implementations, the left side panel 1208 and/or the right side panel 1210 may be comprised of a flexible, elastic material, as discussed below. In such implementations in which the left side panel 1208 is comprised of flexible, elastic material, the left side panel 1208 may be elastically deformed in the retracted configuration 1228 in order to load the left side panel 1208 without plastically deforming the left side panel 1208 and/or the deployable upper panel 206. In such implementations in which the right side panel 1210 is comprised of flexible, elastic material, the right side panel 1210 may be elastically deformed in the retracted configuration 1228 in order to load the right side panel 1210 without plastically deforming the right side panel 1210 and/or the deployable upper panel 1206.

FIGS. 13A, 13B, 13C, and 13D show different implementations of a deployable fairing system 1300 in which actuators 1301 (left actuator 1301a and right actuator 1301b) are used to translate and pivot each associated side panel 1302 (left side panel 1302a and/or right side panel 1302b, respectively). In each such implementation, the side panel 1302 may be coupled to and pivoted about a respective hinge 1304 (left hinge 1304a and right hinge 1304b) that is comprised of a base 1306 and an arm 1308. The base 1306 may be physically coupled to the back of the cab 10c. A proximal end of the arm 1308 of the hinge 1304 may rotatably couple to the base 1306 and rotate about a vertical hinge axis 1310 (e.g., left vertical hinge axis 1310a or right vertical hinge axis 1310b). A distal end of the arm 1308 may be physically coupled to the side panel 1302. In some implementations, for example, the side panel 1302 may be spaced along the arm 1308 such that a proximal edge 1312 of the side panel 1302 is located at least two inches from the associated base 1306 of the hinge 1304. In some implementations, the side panel 1302 may be spaced along the arm 1308 by a distance that is one-half inch more than a length of the static cab fairing 17 that extends rearwardly from the back of the cab 10c. As such, the side panel 1302 may be translated away from the back of the cab 10c and pivot about the vertical hinge axis 1310 when the deployable fairing system 1300 transitions to the deployed configuration from the retracted configuration.

The side panel 1302 may be rotatably translated and pivoted by the associated actuator 1301. In a first implementation of the deployable fairing system 1300a (FIG. 13A), a proximal end of the actuator 1301 may be pivotally coupled to the base 1306 of the left hinge 1304 that is located proximate the back of the cab 10c, 10d. This rotatable coupling to the base 1306 of the hinge 1304 may enable the actuator 1301 to pivot about an actuator vertical axis 1314 (e.g., left actuator vertical axis 1314a or right actuator vertical axis 1314b) that extends vertically through the base 1306 of the hinge 1304. A distal end of the actuator 1301 may be coupled to the associated side panel 1302 with one or more side panel hinges 1316 at a distance from the base 1306. Such side panel hinges 1316 enable the actuator 1301 and the side panel 1302 to rotate relative to each other as the deployable fairing system 1300a rotates between a deployed configuration and a retracted configuration. In such an implementation, the actuator 1301 may rotate about the actuator vertical axis 1314 outward, away from the back of the cab 10c, 10d, thereby applying an outward and rearward force on the side panel 1302 to translate and pivot the side panel 1302 away from the back of the cab 10c. When the deployable fairing system 1300a is in the deployed configuration, the distal end of the actuator 1301 may be located rearward and outward from the proximal end of the actuator 1301.

In a second implementation of the deployable fairing system 1300b (FIG. 13B), a proximal end of the actuator 1301 may be pivotally coupled to the cab 10c, 10d. This rotatable coupling to the cab 10c, 10d may enable the actuator 1301 to pivot about an actuator vertical axis 1314 (e.g., left actuator vertical axis 1314a or right actuator vertical axis 1314b) that extends vertically proximate the back of the cab 10c, 10d. A distal end of the actuator 1301 may be coupled to a portion of the arm 1308 with one or more side panel hinges 1316 at a distance from the base 1306. Such side panel hinges 1316 enable the actuator 1301 and the arm 1308 to rotate relative to each other as the deployable fairing system 1300b rotates between a deployed configuration and a retracted configuration. In such an implementation, the actuator 1301 may rotate about the actuator vertical axis 1314 outward, away from the back of the cab 10c, 10d, thereby applying an outward and rearward force on the arm 1308 and to the side panel 1302 to translate and pivot the side panel 1302 away from the back of the cab 10c. When the deployable fairing system 1300b is in the deployed configuration, the distal end of the actuator 1301 may be located rearward and outward from the proximal end of the actuator 1301.

In a third implementation of the deployable fairing system 1300c (FIG. 13C), a proximal end of the actuator 1301 may be pivotally coupled to the cab 10c, 10d. This rotatable coupling to the cab 10c, 10d may enable the actuator 1301 to pivot about an actuator vertical axis 1314 (e.g., left actuator vertical axis 1314a or right actuator vertical axis 1314b) that extends vertically proximate the back of the cab 10c, 10d. A distal end of the actuator 1301 may be coupled to the associated side panel 1302 with one or more side panel hinges 1316 at a distance from the base 1306. Such side panel hinges 1316 enable the actuator 1301 and the side panel 1302 to rotate relative to each other as the deployable fairing system 1300a rotates between a deployed configuration and a retracted configuration. In such an implementation, the actuator 1301 may rotate about the actuator vertical axis 1314 outward, away from the back of the cab 10c, 10d, thereby applying an outward and rearward force on the side panel 1302 to translate and pivot the side panel 1302 away from the back of the cab 10c. When the deployable fairing system 1300 is in the deployed configuration, the distal end of the actuator 1301 may be located rearward and outward from the proximal end of the actuator 1301.

In a fourth implementation of the deployable fairing system 1300*d* (FIG. 13D), a proximal end of each actuator 1301 may be pivotally coupled to a panel 1318 that extends across the width 10*e* of the cab 10*c*, 10*d*. This rotatable coupling to the panel 1318 may enable the each actuator 1301 to pivot about a respective actuator vertical axis 1314 (e.g., left actuator vertical axis 1314*a* or right actuator vertical axis 1314*b*) that extends vertically proximate the back of the cab 10*c*, 10*d*. A distal end of each actuator 1301 may be physically, rotatably coupled to a portion of the respective arm 1308 using one or more side panel hinges 1316 at a distance from the base 1306. Such side panel hinges 1316 enable each actuator 1301 and the respective arm 1308 to rotate relative to each other as the deployable fairing system 1300*b* rotates between a deployed configuration and a retracted configuration. In such an implementation, the actuator 1301 may rotate about the actuator vertical axis 1314 outward, away from the back of the cab 10*c*, 10*d*, thereby applying an outward and rearward force on the arm 1308 that causes the arm to pivot away from the back of the cab 10*c*, 10*d*. When the deployable fairing system 1300*d* is in the deployed configuration, the distal end of each actuator 1301 may be located rearward and outward from the proximal end of the actuator 1301.

Figure 14A:
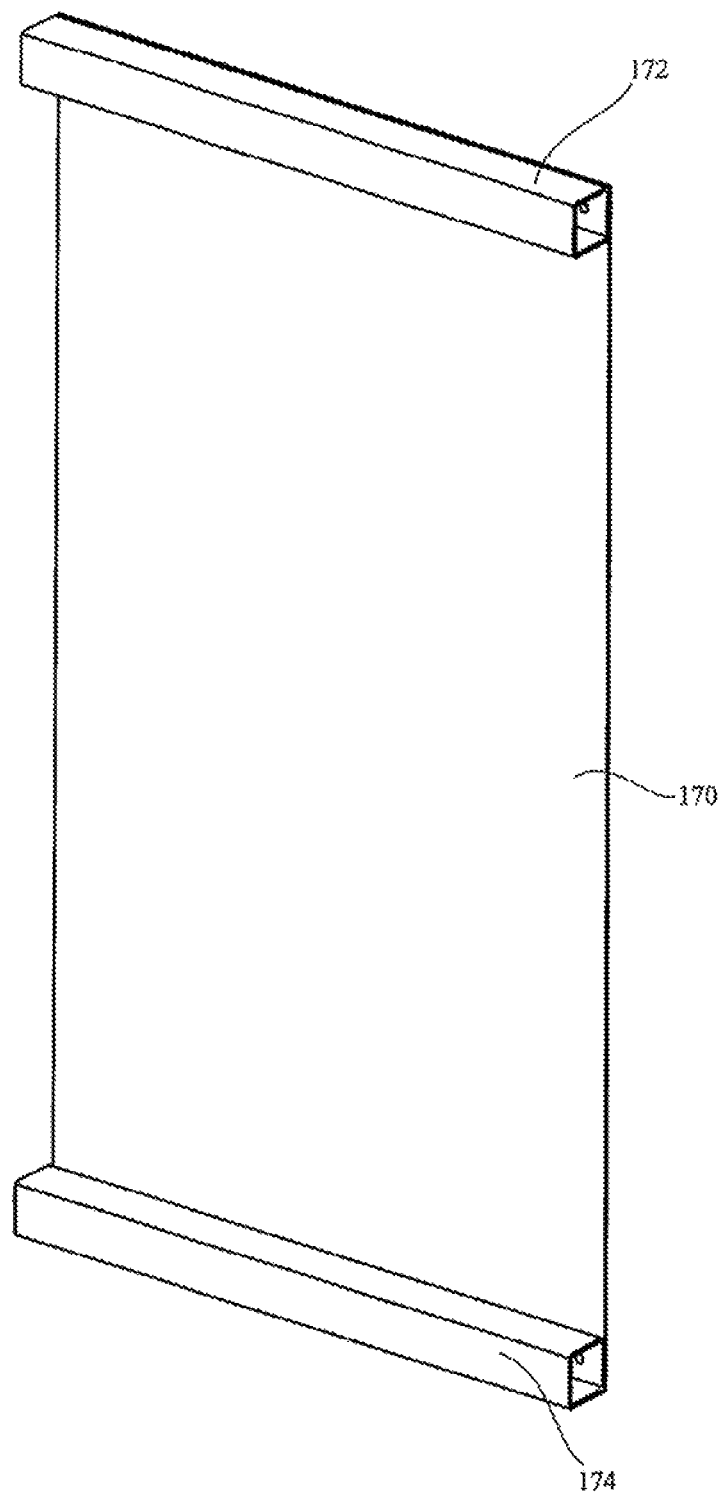
FIG. 14A is an isometric view of a side panel which comprises of a flat skin coupled to a frame formed by a pair of closed tubes which extend along opposed sides or edges of the skin, according to at least one illustrated implementation.

FIG. 14A is an isometric view of a side panel which comprises of a flat skin 170 coupled to a frame formed by a pair of closed tubes (left tube 172 and right tube 174) that extend along opposed sides or edges of the flat skin 170, according to at least one illustrated implementation. FIG. 14B is an elevational view and FIG. 14C is a plan view of the side panel of FIG. 14A. The flat skin 170 may be comprised of glass reinforced plastic (e.g., polypropylene and glass fiber). The closed left and right tubes 172 and 174 may comprise, for example, from aluminum or any other type of appropriate material. The closed tubes 172 and 174 are riveted, or otherwise attached to the flat skin 170 to form a reinforcing frame. One or more of the deployable upper panel 60, the left side panel 30, and the right side panel 32 can be comprised of a skin 170 coupled to a frame, such as a frame formed from a pair of closed left and right tubes 172 and 174.

Figure 15A:
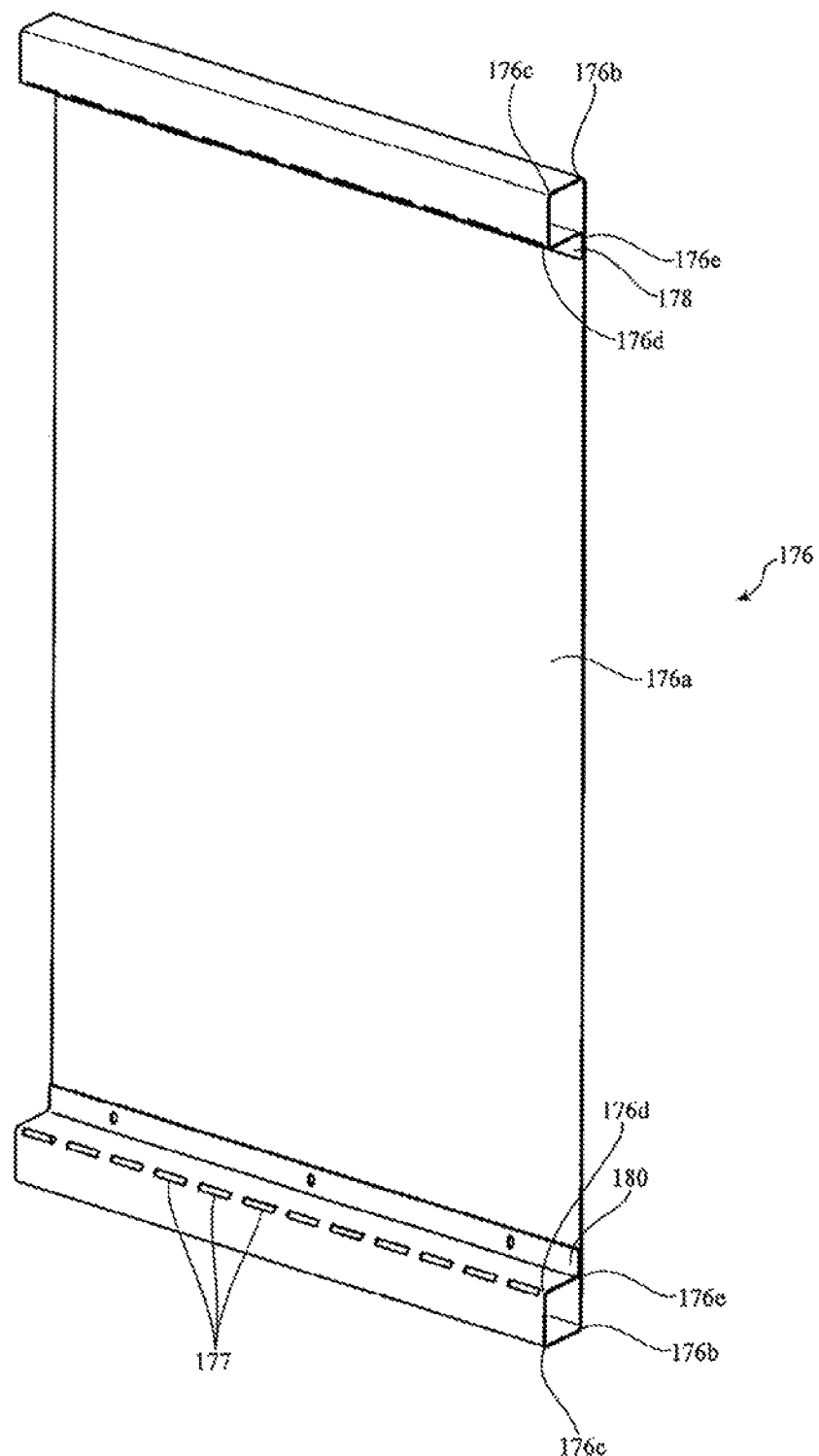
FIG. 15A is an isometric view of a side panel comprises of a skin having a flat major portion, with a four bend edge along a pair of opposed sides or edges of the skin, according to at least one illustrated implementation.

FIG. 15A is an isometric view of a side panel that comprises a skin 176 having a flat major portion 176*a*, with a four-bend edge (bends 176*b*, 176*c*, 176*d*, and 176*e*) along a pair of opposed sides or edges of the skin, according to at least one illustrated implementation. FIG. 15B is an elevational view and FIG. 15C is a plan view of the side panel of FIG. 15A. In such implementations, the skin 176 may be comprised of a single unitary piece of construction. A side panel having a greater or fewer bends (e.g., a two-bend edge) may be used in place of the four-bend edge of FIG. 15A. Each of the first three bends 176*b*, 176*c*, and 176*d* may be a 90° bend in the same direction (e.g., 90° to the left or to the right), thus forming a closed loop at the edge of the skin 176. The last bend 176*e* is in the opposite direction as the first three bends 176*b*, 176*c*, and 176*d* such that one or both of a left edge 178 and a right edge 180 extend away from the closed loop formed by the first three bends 176*b*, 176*c*, and 176*d*. The left and right edges 178 and 180 may be secured to the skin 176 using rivets or some similar such fastener. One or more of the deployable upper panel 60, the left side panel 30, and the right side panel 32 can be comprised of a skin 176 with a four bend edge.

One or more of the bends 176*b*, 176*c*, 176*d* and 176*e* may include one or more perforations 177. The perforations 177 may be cut or otherwise incorporated into the desired bends 176*b*, 176*c*, 176*d*, or 176*e* using, for example, a laser during the manufacturing process. As shown in FIG. 15A, third bend 176*d* includes a series of perforations 177 that extends the length of the third bend 176*d*. In such implementations, the perforations 177 enable the associated bend (e.g., third bend 176*d*) to be performed more easily, such as by hand, during the manufacturing process. Thus, the first bend 176*b*, the second bend 176*c*, and the fourth bend 176*e* are made in the skin 176 in any appropriate order using a mechanical process or device(s). After the bends 176*b*, 176*c*, and 176*e* have been accomplished, the third bend 176*d* can be made by a worker by hand. The four bend edges may then optionally be secured to the skin 176 using rivets or some similar such fasteners along left edge 178 and right edge 180.

Figure 16A:
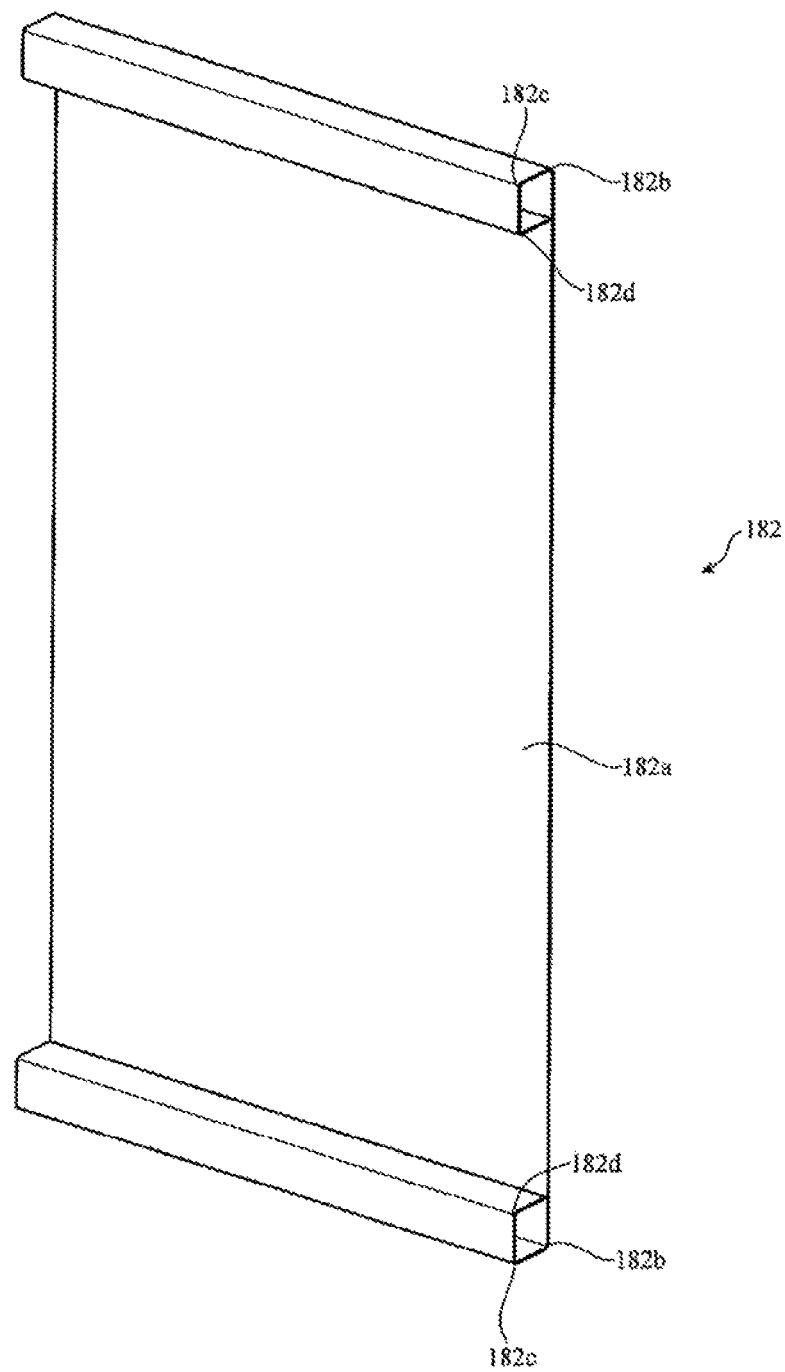
FIG. 16A is an isometric view of a side panel comprises of a skin having a flat major portion, with a three bend edge along a pair of opposed sides or edges of the skin, according to at least one illustrated implementation.

FIG. 16A is an isometric view of a side panel comprises of a skin 182 having a flat major portion 182*a*, with a three bend edge (bends 182*b*, 182*c*, and 182*d*) along a pair of opposed sides or edges of the skin, according to at least one illustrated implementation. FIG. 16B is an elevational view and FIG. 16C is a plan view of the side panel of FIG. 16A. In such implementations, the skin 182 may be comprised of a single unitary piece of construction. Each of the three bends 182*b*, 182*c*, and 182*d* may be a 90° bend in the same direction (e.g., 90° to the left or to the right), thus forming a closed loop at the edge of the skin 182. The loop is not secured to the skin. One or more of the deployable upper panel 60, the left side panel 30, and the right side panel 32 can be comprised of a skin 182 with a three bend edge.

Figure 17A:
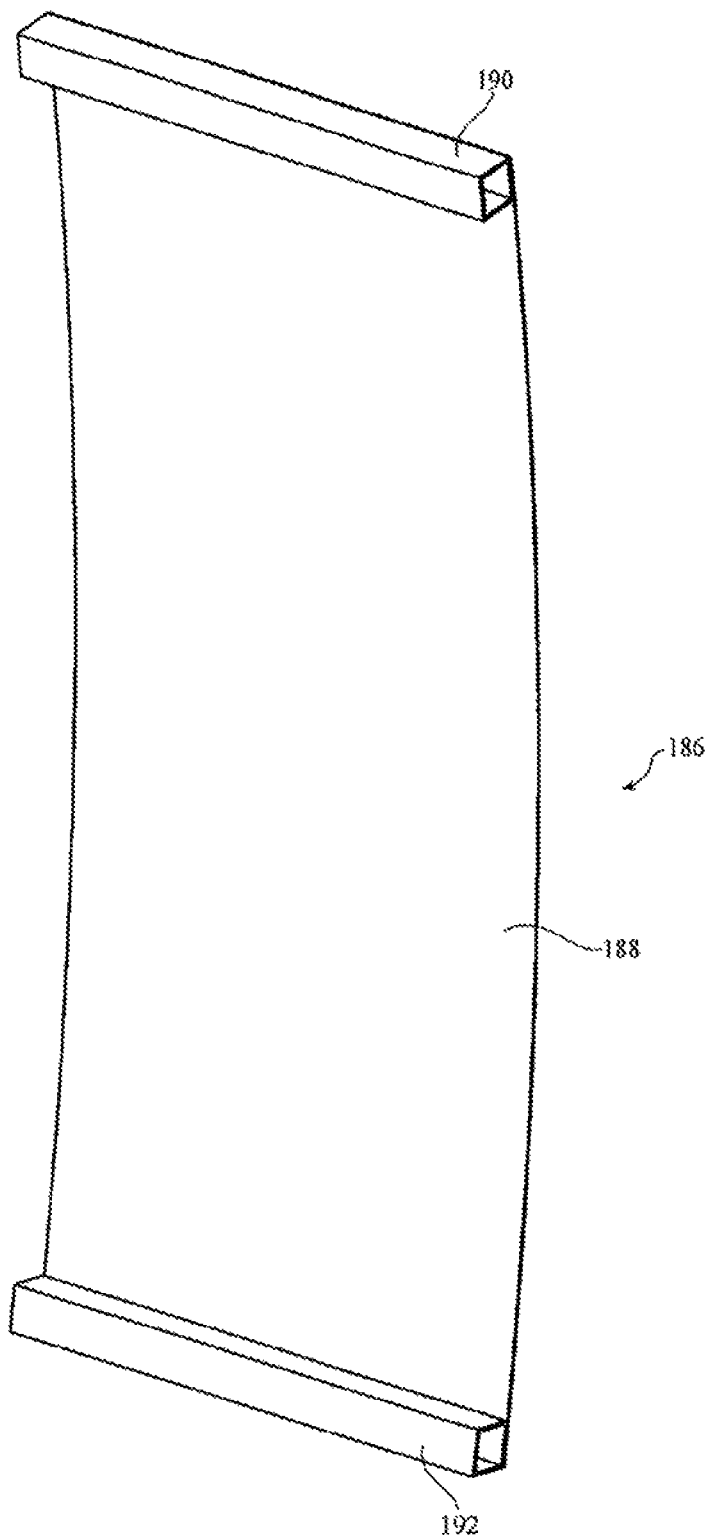
FIG. 17A is an isometric view of a side panel comprises of a skin having a curved major portion coupled to a frame formed by a pair of closed tubes which extend along opposed sides or edges of the skin, according to at least one illustrated implementation.

FIG. 17A is an isometric view of a side panel comprises of a skin 186 having a curved major portion 188 coupled to a frame formed by a pair of closed tubes (left tube 190 and right tube 192) which extend along opposed sides or edges of the skin 186, according to at least one illustrated implementation. FIG. 17B is an elevational view and FIG. 17C is a plan view of the side panel of FIG. 17A. The closed tubes 190 and 192 may be formed, for example, from aluminum tubes or any other type of appropriate material. The closed tubes 190 and 192 may be riveted, or otherwise attached to form a frame that reinforces the skin 186. In some implementations, one or both of the closed tubes 190 and 192 may be comprised of a multiple bend edge, such as, for example, the three and four bend edges previously discussed. One or more of the deployable upper panel 60, the left side panel 30, and the right side panel 32 can be comprised of a skin 186 having a curved major portion 188 and coupled to a frame, such as a frame formed from a pair of closed tubes, such as left tube 190 and right tube 192.

Figure 18A:
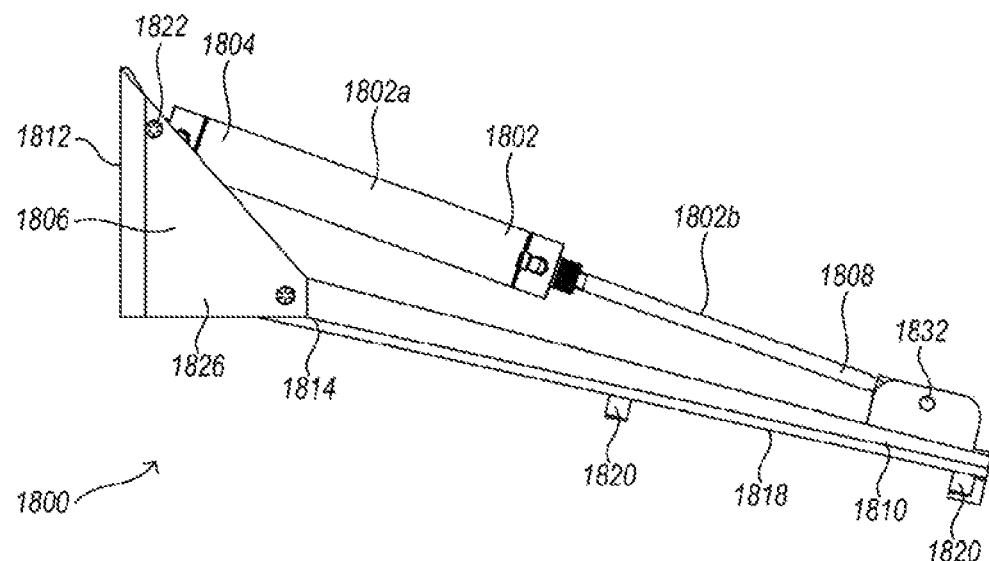
FIG. 18A is a top plan view of a side panel hinge (e.g., the left hinge and the right hinge) shown in an extended configuration in which one end of the hinge actuator is rotatably coupled to a base of the side panel hinge and an opposite end of the hinge actuator is rotatably coupled to a portion of the arm of the side panel hinge, according to at least one illustrated implementation.
Figure 18B:
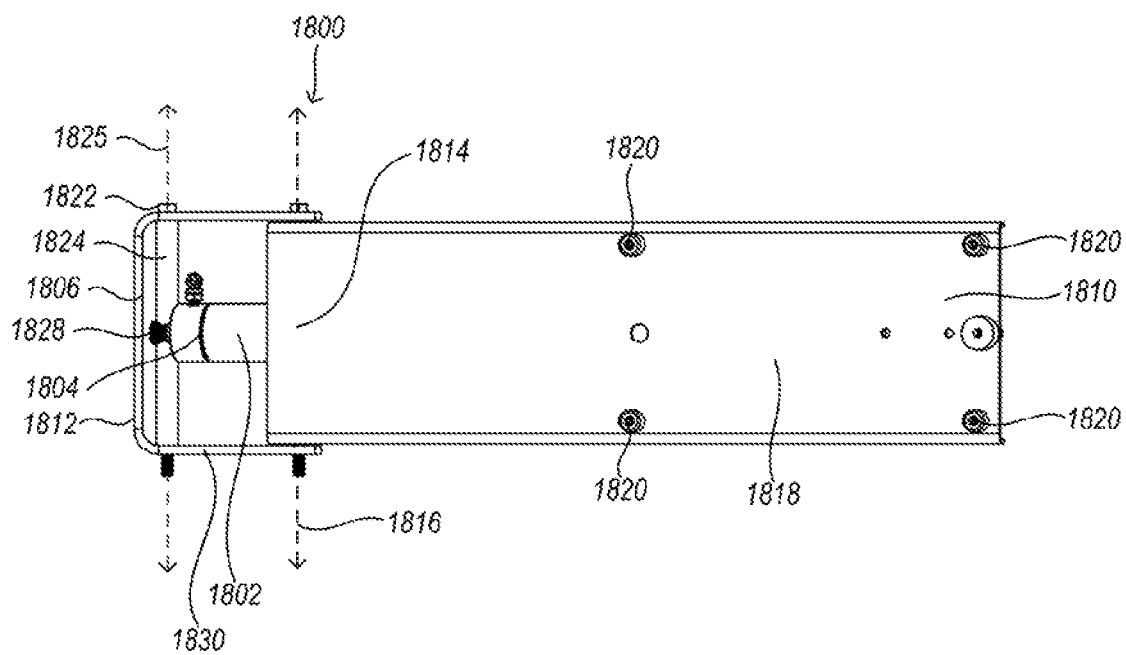
FIG. 18B is a side elevational view of the side panel hinge of FIG. 18A shown in an extended configuration, according to at least one illustrated implementation.
Figure 18C:
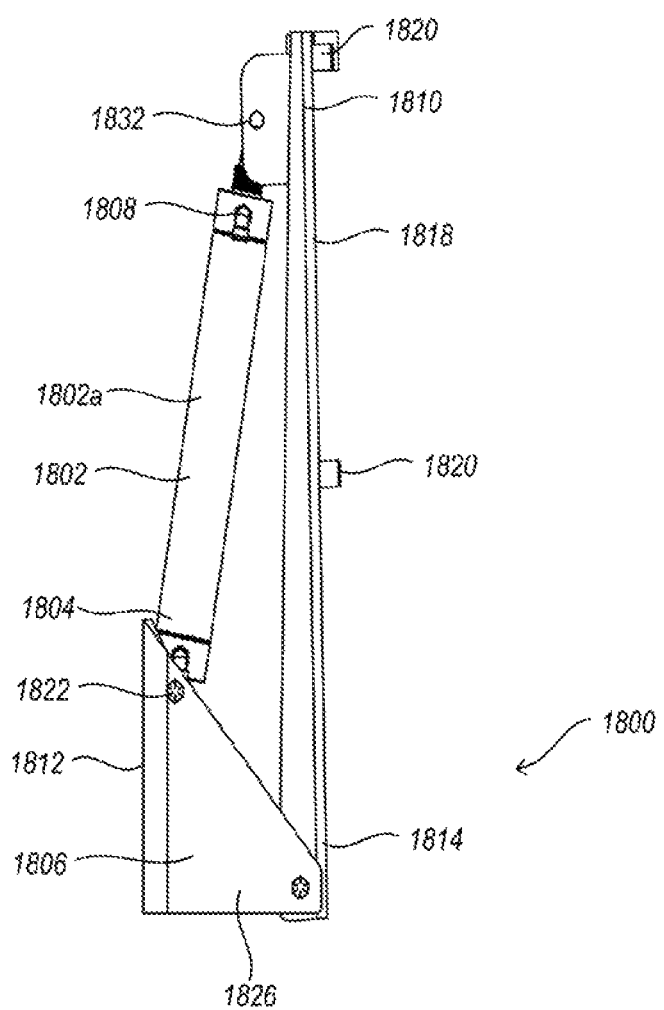
FIG. 18C is a top plan view of the side panel hinge of FIG. 18A shown in a retracted configuration, according to at least one illustrated implementation.

FIGS. 18A, 18B, and 18C show a side panel hinge 1800 (e.g., the left hinge and the right hinge) comprised of a base 1806 and an arm 1810 along with a hinge actuator 1802 in which a proximal end 1804 of the hinge actuator 1802 is rotatably coupled to the base 1806 and an opposing distal end 1808 of the hinge actuator 1802 is rotatably coupled to a portion of the arm 1810, according to at least one illustrated implementation. The base 1806 of the side panel hinge 1800 may be physically coupled to the back of the cab 10*c* along a first surface 1812, via bolts, rivets, screws, or other similar physical coupling components. A proximal end 1814 of the arm 1810 may rotatably couple to the base 1806 and rotate about a vertical hinge axis 1816. A distal end 1818 of the arm 1810 may physically couple to a side panel. In some implementations, such coupling may occur via one or more coupling features 1820 spaced along the arm 1810 in which the coupling features 1820 may be, for example, one or more posts that extend outward from the arm 1810 to engage with corresponding apertures on the side panel, thereby physically coupling the arm 1810 with the side panel. In some implementations, coupling features 1820 may be spaced along the arm 1810 such that a proximal edge of the side panel is located at least two inches from the associated base 1806. In some implementations, the coupling features 1820 may be spaced along the arm 1810 such that a proximal end of the side panel is separated from the static cab fairing 17 by a distance of at least one-half inch. As such, the hinge 1800 may translate and pivot the side panel away from the back of the cab 10*c* about the vertical hinge axis 1816 when the deployable fairing system transitions to the deployed configuration from the retracted configuration.

The arm 1810 and the attached side panel may be rotatably translated and pivoted by the associated hinge actuator 1802. For example, a proximal end 1804 of the hinge actuator 1802 may be pivotally coupled to the base 1806 that is located proximate the back of the cab 10*c*, 10*d* via one or more hinges 1822. In some implementations, the one or more hinges 1822 may include a sleeve 1824 that extends from a first side 1826 of the base 1806 through an aperture 1828 on the proximal end 1804 of the hinge actuator 1802 to an opposing second side 1830 of the base 1806. Such a sleeve 1824 may be held in place by a screw that extends between and secured at the first side 1826 and the second side 1830 of the base 1806. This rotatable coupling to the base 1806 may enable the hinge actuator 1802 to pivot about an actuator vertical axis 1825 that extends vertically through the base 1806. A distal end 1808 of the hinge actuator 1802 may be coupled to a portion of the arm 1810 with one or more side panel hinges 1832 at a distance from the base 1806. Such side panel hinges 1832 enable the actuator 1802 and the arm 1810 to rotate relative to each other as the base 1806 rotates between a deployed configuration and a retracted configuration.

In some implementations, the actuator 1802 may include a housing 1802*a* and an extendable arm 1802*b*. When the side panel hinge 1800 is in the retracted configuration (FIG. 18C), at least some of the extendable arm 1802*b* may be contained within the housing 1802*a*. To transition the side panel hinge 1800 to the deployed configuration, the actuator 1802 may extend the extendable arm 1802*b* from the distal end 1808 of the actuator 1802, thereby applying an outward and rearward force on the distal end 1818 of the arm 1810 that results in the distal end 1818 of the arm 1810 and the attached side panel translating and pivoting away from the back of the cab 10*c*. When the side panel hinge 1800 is in the deployed configuration, the extendable arm 1802*b* may have been laterally translated out of one end of the housing 1802*a* to increase a length of the actuator 1802. In some implementations, when the side panel hinge 1800 is in the deployed configuration, the distal end 1808 of the actuator 1802 may be located rearward and outward from the proximal end 1804 of the actuator 1802. In some implementations, one or more positional sensors may be placed along a direction of travel of the actuator 1802 and/or within the actuator 1802. Such positional sensors may include, for example, Reed switches that may be used to indicate the positions of the components being pivoted, translated, or otherwise moved by the actuators 1802. In some implementations, multiple positional sensors may be placed within the actuator 1802. Such signals from multiple positional sensors may be used to determine a rate of travel of the component(s) being moved by the actuator 1802.

Figure 19A:
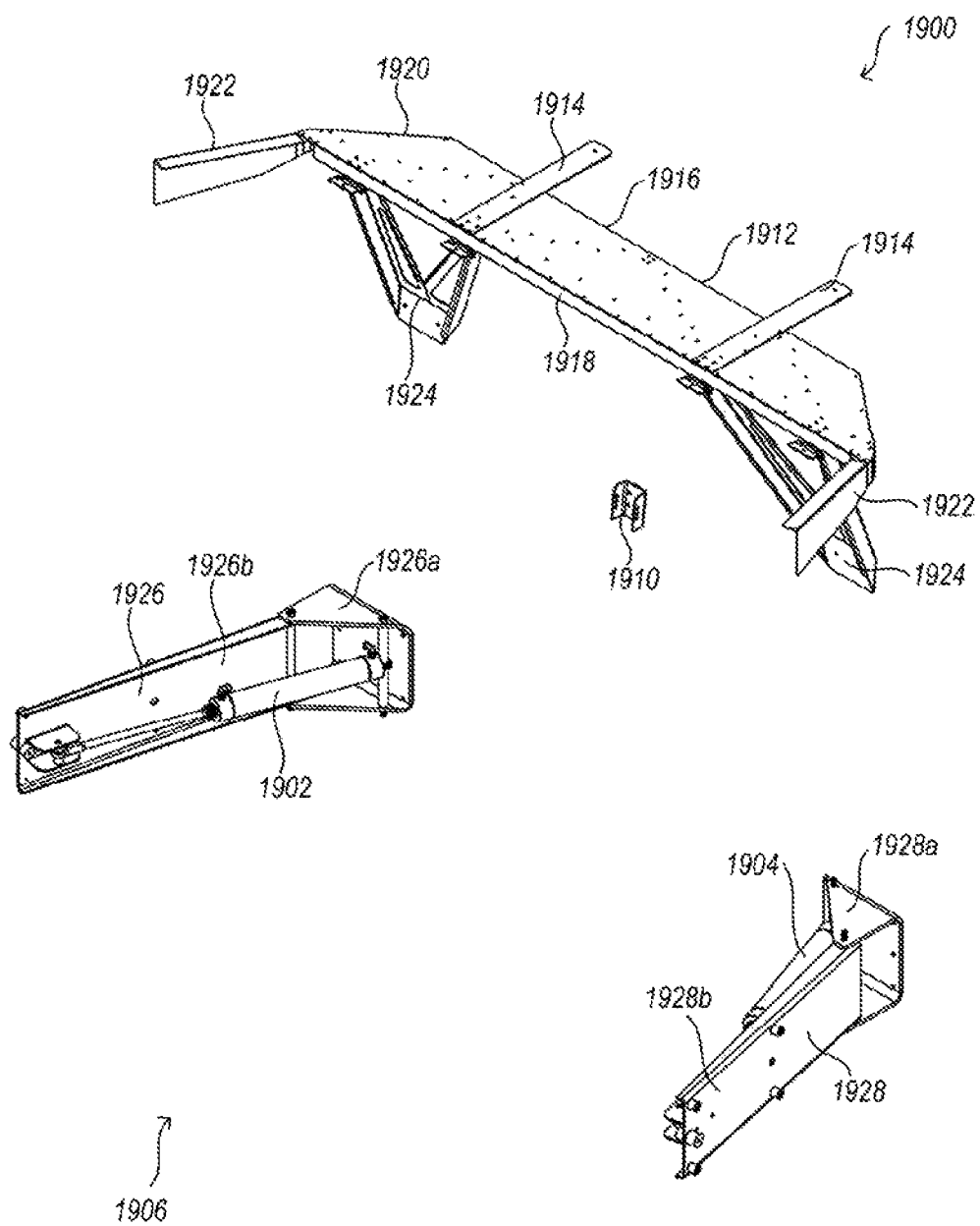
FIG. 19A is a top, right isometric view of a portion of a fairing system that includes a left actuator, a right actuator, and a static D-gap panel, with the fairing system shown in an extended configuration, according to at least one illustrated implementation.
Figure 19B:
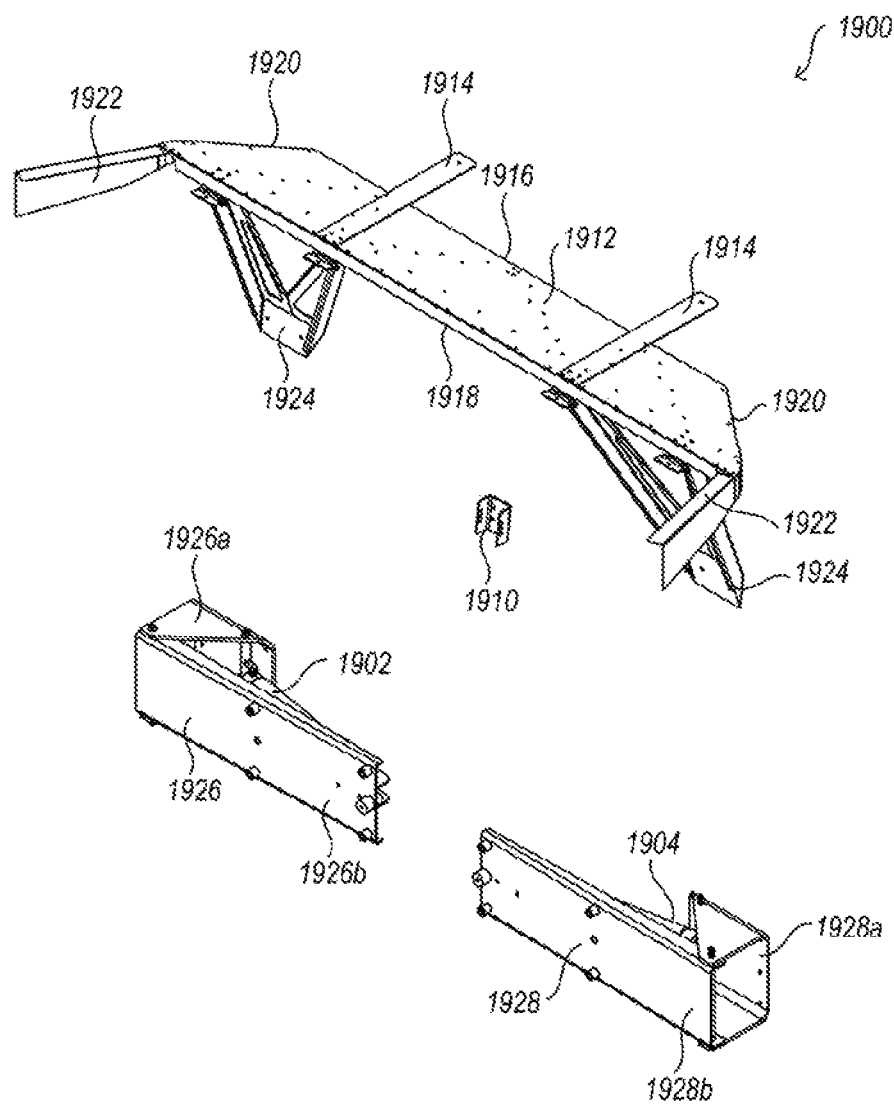
FIG. 19B is a top, right isometric view of the portion of the fairing system of FIG. 19A with the fairing system is shown in a retracted configuration, according to at least one illustrated implementation.

FIGS. 19A and 19B show a portion of a fairing system 1900 that includes a left actuator 1902 and a right actuator 1904 in a deployed configuration 1906 (FIG. 19A) and a retracted configuration 1908 (FIG. 19B), according to at least one illustrated implementation. The fairing system 1900 includes a center bracket 1910 to which a center actuator may optionally be attached. In such an implementation in which the center actuator is not present, the left actuator 1902 and the right actuator 1904 may be used to transition the fairing system 1900 between the retracted configuration and the deployed configuration. For example, the left actuator 1902 may be physically, rotatably coupled to a left hinge 1926 that includes a base 1926*a* and an arm 1926*b*. The left actuator 1902 may be used to apply an outward and rearward force on the arm 1926*b* of the left hinge 1926, thereby causing the arm 1926*b* to rotate outward from the back of the cab 10*c*, 10*d*. Such movement of the arm 1926*b* may result in an attached side panel (not shown) being translated and pivoted away from the back of the cab 10*c*, 10*d*. The right actuator 1904 may be physically, rotatably coupled to a right hinge 1928 that includes a base 1928*a* and an arm 1928*b*. The right actuator 1904 may be used to apply an outward and rearward force on the arm 1928*b* of the right hinge 1928, thereby causing the arm 1928*b* to rotate outward from the back of the cab 10*c*, 10*d*. Such movement of the arm 1928*b* may result in an attached side panel (not shown) being translated and pivoted away from the back of the cab 10*c*, 10*d*. In some implementations, the left side panel and/or the right side panel may be physically, translatably coupled to a deployable upper panel assembly, as discussed above. In such implementations in which the fairing system 1900 includes only the left actuator 1902 and the right actuator 1904, the movement of the respective side panels by the left actuator 1902 and the right actuator 1904 may cause a physically coupled deployable upper panel assembly to transition between a deployed configuration and a retracted configuration.

The fairing system 1900 also includes a static D-gap panel 1912. The static D-gap panel 1912 is attached to the back of the cab 10*c*, 10*d* and extends horizontally rearward towards the trailer 10*b*. The static D-gap panel 1912 may be physically coupled to the back of the cab 10*c*, 10*d* via one or more elongated straps 1914 that extend rearward from the cab 10*c*, 10*d* towards the trailer 10*b*. The static D-gap panel 1912 has a D-shaped profile, with a minor edge 1916 proximate the back of the cab 10*c*, 10*d*. The minor edge 1916 may be substantially straight in some implementations. The static D-gap panel 1912 may have a major edge 1918 opposing the minor edge 1916 that is distal to the cab 10*c*, 10*d*. In some implementations, the length of the major edge 1918 may be greater than the length of the minor edge 1916. One or more side edges 1920 may extend between the minor edge 1916 and the major edge 1918. Such one or more side edges 1920 may meet one or both of the minor edge 1916 and the major edge 1918 at a non-perpendicular angle. The static D-gap panel 1912 may be used to accommodate various shapes and configurations for the back of the cab 10*c*, 10*d*, thus enabling the deployable fairing system 1900 to be installed, for example, as a retrofit on existing tractors 10*a* without creating a gap between the deployable fairing system 1900 and the back of the cab 10*c*, 10*d*. In some implementations, the static D-gap panel 1912 may include one or more wings 1922 that extend rearward from the static D-gap panel 1912 proximate the side edges 1920. Such wings 1922 may be used to affix the fairing system 1900 to an existing static cab fairing 17 that extends rearward from the back of the cab 10*c*, 10*d*. Such wings 1922 may be used to guide the side panels into a deployed configuration. The static D-gap panel 1912 may be supported by one or more brackets 1924 that may be coupled to the back of the cab 10*c*, 10*d*.

Figure 20A:
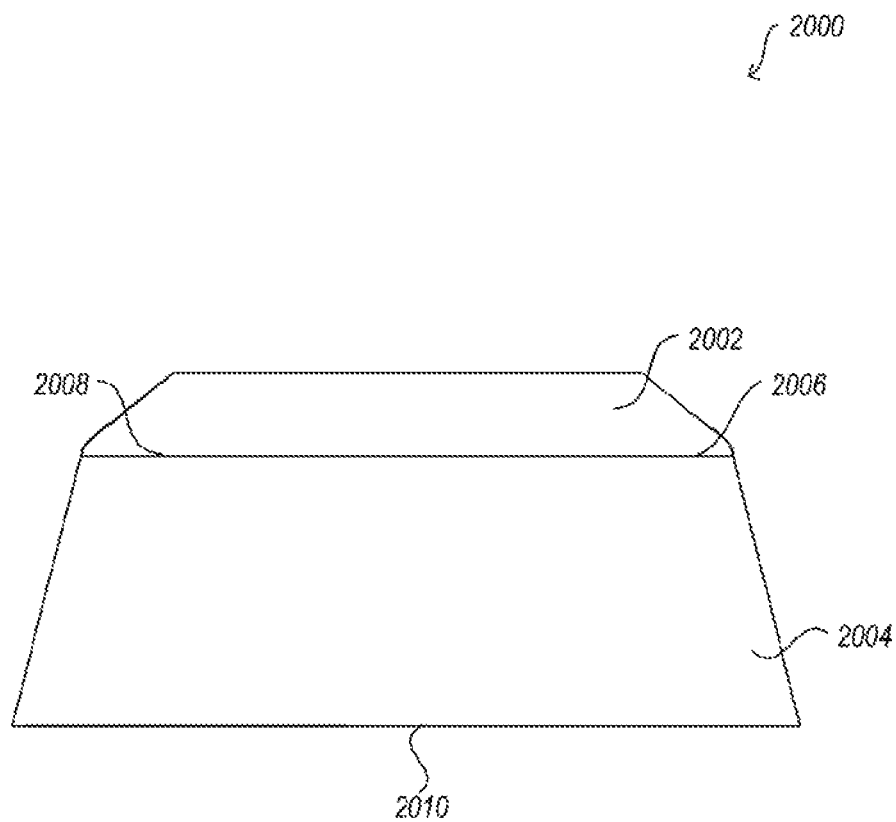
FIG. 20A is a top plan view of a deployable upper panel assembly, according to at least one illustrated implementation.

FIG. 20A is a top plan view of a deployable upper panel assembly 2000, according to at least one illustrated implementation. The deployable upper panel assembly 2000 may include a minor section 2002 and a major section 2004. In some implementations, the minor section 2002 may be located relatively proximate the cab 10c, 10d, and the major section 2004 may be located relatively away from the cab 10c, 10d. In some implementations, the minor section 2002 and the major section 2004 may be rotatably coupled view a rotatable joint 2006. In such an implementation, the minor section 2002 and the major section 2004 may be able to rotate relative to each other such that the minor section 2002 and the major section 2004 may be located in intersecting planes. For example, in some implementations, the minor section 2002 may extend rearward from the back of the cab in a horizontal plane that is substantially parallel to the ground or other surface on which the cab 10c, 10d is resting. The major section 2004, though, may be tilted relatively upward from the horizontal plane such that a proximal edge 2008 of the major section 2004, which is located relatively proximate the rotatable joint 2006, is relatively lower than a distal edge 2010 of the major section 2004, which is located relatively away from rotatable joint 2006.

Figure 20B:
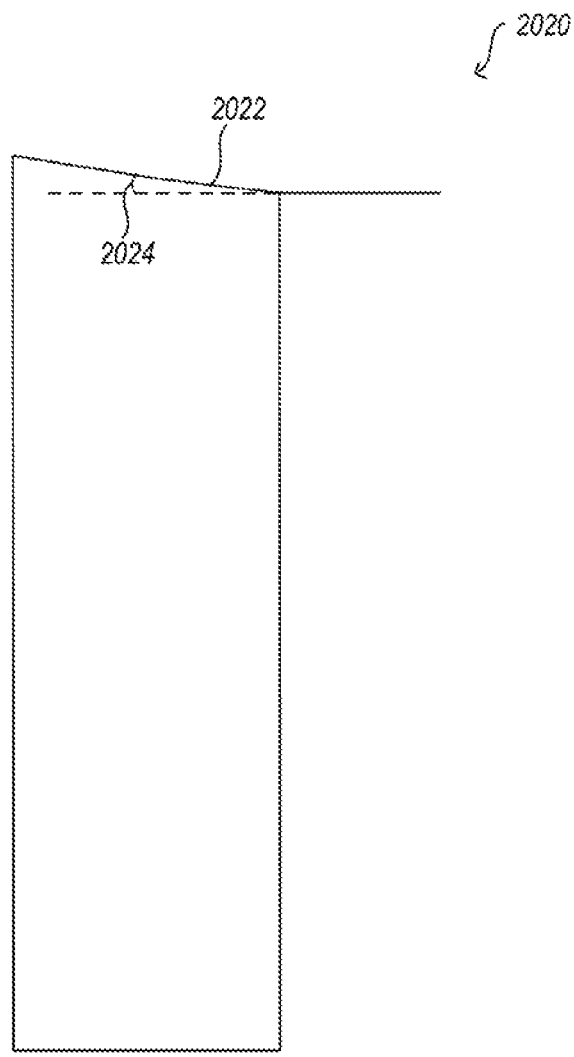
FIG. 20B is a side elevational view of a side panel with an upper edge that has an upper slope, according to at least one illustrated implementation.

FIG. 20B shows an outwardly tapered side panel 2020 with an upper edge 2022 that has an upper slope, according to at least one illustrated implementation. Such an upper slope may be at a defined angle 2024 above a horizontal plane that is parallel to the ground or other surface on which the cab 10c, 10d is resting. In some implementations in which the associated fairing system include a deployable upper panel and/or deployable upper panel assembly that tilts upward, the defined angle 2024 may be based upon the relative tilt of the deployable upper panel and/or deployable upper panel assembly. In such an implementation, the relatively upward tilted deployable upper panel and/or deployable upper panel assembly may rest upon the upper edge 2022 of the outwardly tapered side panel 2020.

Figure 20C:
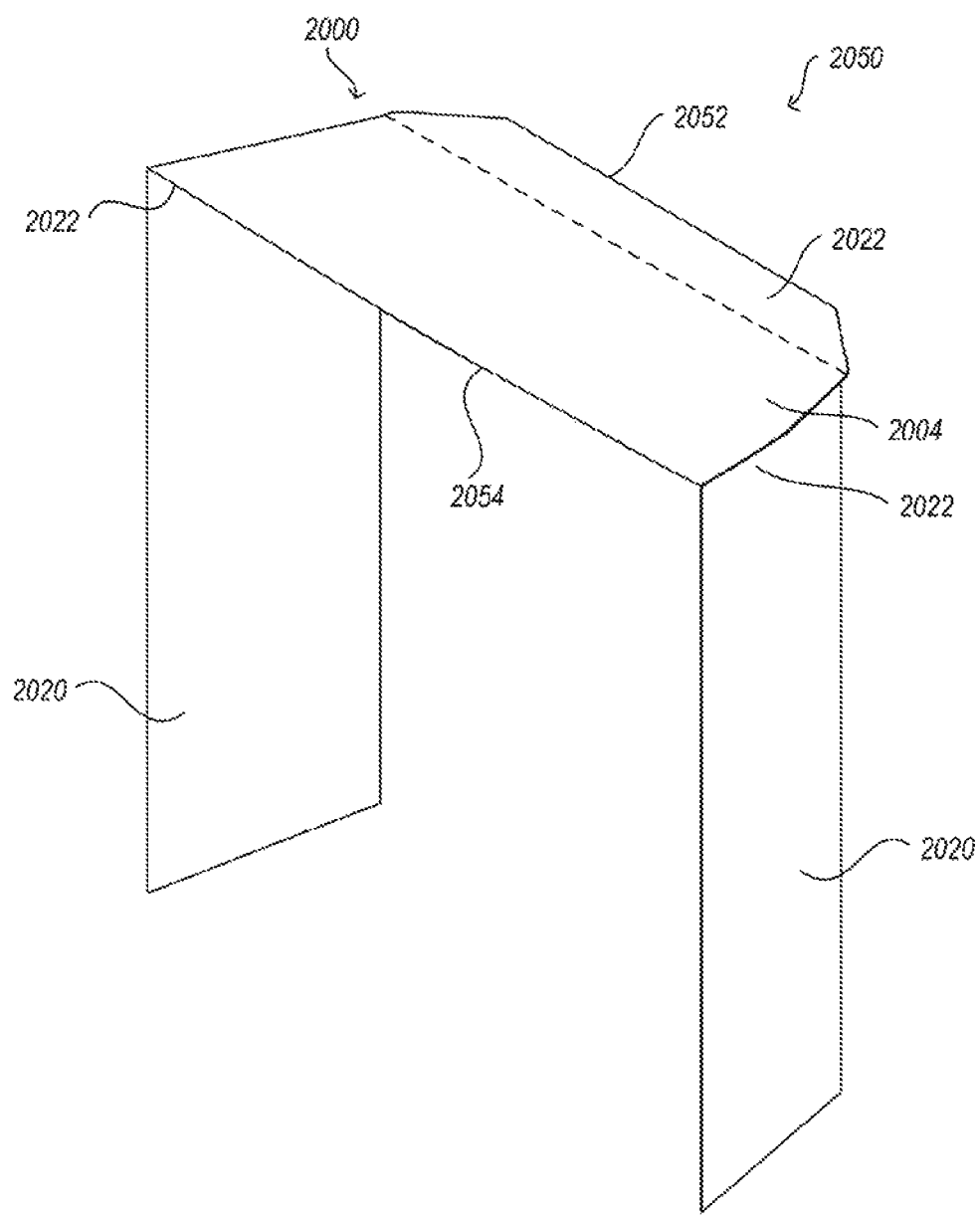
FIG. 20C is a top, right isometric view of a deployable upper panel and two side panels in an extended configuration, according to at least one illustrated implementation.

FIG. 20C shows a portion of a fairing system 2050 that includes a deployable upper panel assembly 2000 and a set of outwardly tapered side panels 2020, according to at least one illustrated implementation. The major section 2004 of the deployable upper panel assembly 2000 may be tilted upward at a defined angle from a horizontal plane that is parallel to the ground or other surface on which the fairing system 2050 is resting. The upper edges 2022 of each of the outwardly tapered side panels 2020 may be titled upward by a corresponding amount such that at least a portion of the major section 2004 of the deployable upper panel assembly 2000 rests upon the upper edges 2022 of the respective outwardly tapered side panels 2020. In some implementations, the outwardly tapered side panels 2020 may taper outwardly in a direction going from a front 2052 of the fairing system 2050 towards a rear 2054 of the fairing system 2050.

Figure 21:
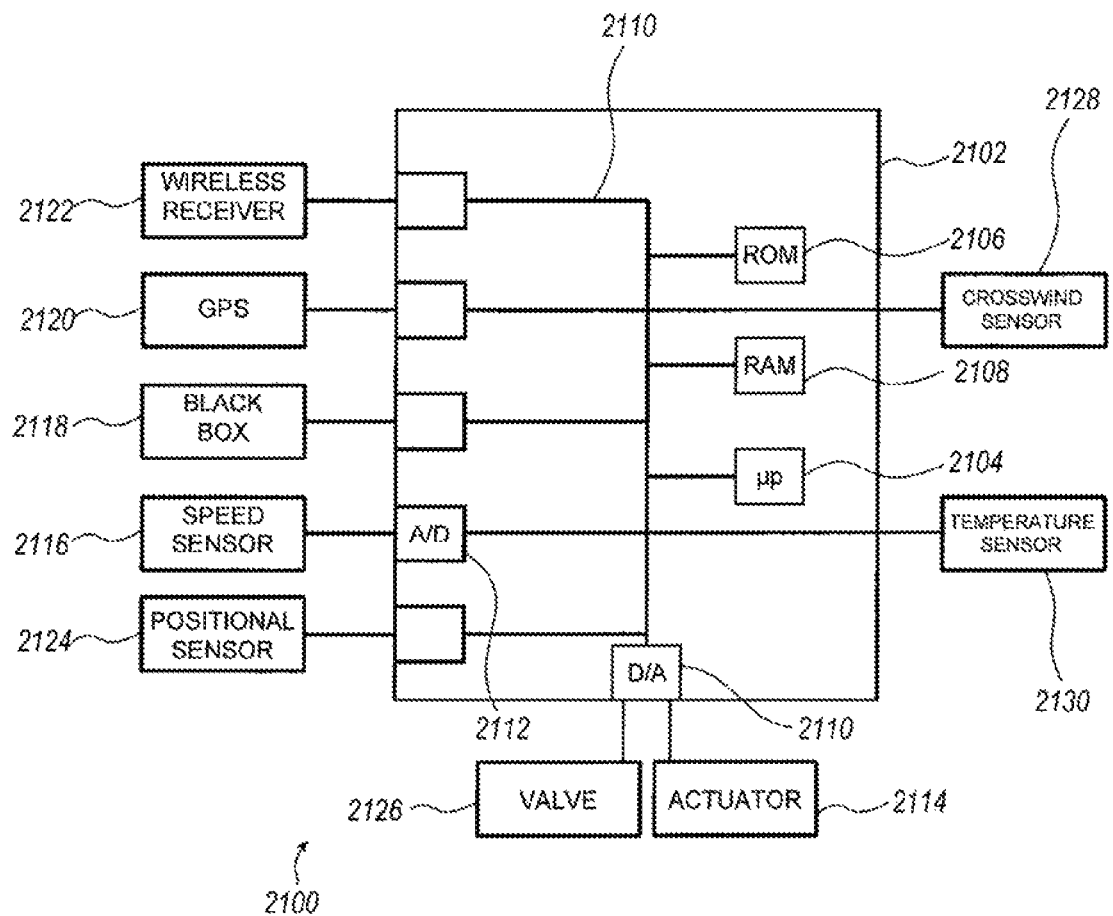
FIG. 21 is a schematic diagram of a control system for the deployable fairing system according to one illustrated embodiment, the deployable fairing system operable to automatically selectively move a gap closing deployable fairing between a deployed configuration and an un-deployed configuration based on a signal indicative of a speed or location of at least one of the vehicles.

FIG. 21 shows a control subsystem 2100 for a deployable fairing system according to one illustrated embodiment.

The control subsystem 2100 is configured to automatically selectively move a deployable fairing 16 between a deployed or extended configuration and an un-deployed or unextended configuration based on a signal indicative of a speed or location of at least one of the vehicles.

The control subsystem 2100 may include a controller 2102. The controller 2102 may include a processor (e.g., microprocessor, digital signal processor, programmable gate array, application specific integrated circuit, microcontroller) 2104. The controller 2102 may include one or more processor readable memories or storage mediums. For example, the controller 2102 may include read only memory 2106 and/or random access memory 2108. The memories 2106, 2108 may store processor executable instructions that cause the processor 2104 to assess speed, location, or one or more thresholds, and to control a configuration or position of the deployable fairing 16 in response thereto.

The controller 2102 may include one or more busses 2110 coupling the processor 2104 and memories 2106, 2108. For example, the controller 2102 may include a power bus, instruction bus, data bus, address bus, etc. The busses may also provide signal paths to communicate with other devices or elements of the control subsystem 2100. The control subsystem 2100 may also include one or more digital-to-analog (D/A) converters 2110 to convert digital signals from the processor 2104 into an analog form suitable to drive certain components. The control subsystem 2100 may also include one or more analog-to-digital (A/D) converters 2112 to convert analog signals from certain components into a digital form suitable for processing by the processor 2104.

The control subsystem 2100 may include an actuator 2114 operable to move the deployable fairing 16 between the deployed or extended configuration and an un-deployed or unextended configuration. As previously explained, the actuator may, for example, take the form of a piston/cylinder pair, a solenoid, and/or an electric motor. In addition, at least one valve 2126 may be attached to or incorporated into the actuator 2114. The valve 2126 may be a mechanical control valve, a solenoid, or other like device that can selectively vent the actuator 2114. In the event of an error or a loss of power, the valve 2126 can be biased in the event of a power loss to deactivate the actuator 2114 such as, for example, by venting the air within a pneumatic actuator. In this situation, the components of the deployable fairing 16 default to returning to the unextended configuration 18 as a result of the components of the deployable fairing 16 applying a downward force to the deactivated actuator 2114. In some implementations, the control subsystem 2100 may control the actuator 2114 (e.g., the left actuator 1011), such as through controlling a fluid supply, to cause the actuator 2114 to retract the left side panel 1010 to elastically deform the left side panel 1010 without causing plastic deformation to the left side panel 1010 or the deployable upper panel 1032. In some implementations, the control subsystem 2100 may control the actuator 2114 (e.g., the right actuator 1018), such as through controlling a fluid supply, to cause the actuator 2114 to retract the right side panel 1012 to elastically deform the right side panel 1012 without causing plastic deformation to the right side panel 1012 or the deployable upper panel 1032.

The valve 2126 may biased to deactivate the actuator 2114 in various conditions, resulting in the components of the deployable fairing 16 automatically returning to the unextended configuration 18. Such conditions may arise, for example, in the event of a power loss to the vehicle 10 or to the deployable fairing system 12, or in the event that the deployable fairing system 12 is unable to communicate with the rest of the control subsystem 2100, including the processor 2104. In addition, such conditions may arise when one or more control gauges indicate a potentially unsafe operating condition. For example, a speed sensor 2116, discussed below, may provide a signal indicating that the vehicle 10 is traveling at a low speed, such as may occur when the vehicle 10 is traveling over surface streets. In this situation, the processor 2104 may determine if the speed indicated by the signal from the speed sensor 2116 falls below a threshold speed value stored in memories 2106, 2108. If so, then the valve 2126 may be used to deactivate the actuator 2114. The processor 2104 may optionally receive signals from various other sensors that result in the valve 2126 being used to deactivate the deployable fairing 16, such as signals from a cross wind sensor 2128 indicating that the speed of a cross wind exceeds a cross wind threshold, or signals from a temperature sensor 2130 indicating a temperature of the environment around the actuator 2114 that falls below a low temperature threshold or exceeds a high temperature threshold. In some implementations, the processor 2104 may use the valve 2126 to deactivate the actuator 2114 if it detects that the actuator 2114 has encountered a stalled condition that would prevent it from transitioning the deployable fairing 16 into the extended configuration 20.

The control subsystem 2100 may receive signals indicative of speed from a speed sensor 2116. The speed sensor 2116 may be an integral part of the vehicle 10 as manufactured by the vehicle manufacturer, used as part of the speedometer of the vehicle 10. Alternatively, the speed sensor 2116 may be added later. In some embodiments, the speed sensor 2116 is a dedicated part of the control subsystem 2100 and is unrelated to, or not part of, the conventional feedback system (e.g., speedometer) of the vehicle 10.

The control subsystem 2100 may receive signals indicative of speed from an on-board computer 2118 associated with the vehicle 10. Such on-board computers are commonly referred to as a black box. These on-board computers track various parameters of operation such as speed, distance, total time, elapsed time, and/or location. The on-board computers are typically an after-market device added to the vehicle 10 after manufacture of the vehicle 10.

The control subsystem 2100 may receive signals indicative of speed from a global positioning system (GPS) receiver 2120. The (GPS) receiver 2120 may determine location information indicative of a current location of the vehicle 10. The processor may be configured to associate the location information with a particular road or section of road, and hence with a posted speed limited or expected speed of travel for the vehicle 10. For example, the processor 2104 may be configured to determine whether the vehicle 10 is on a highway or a surface street based on the location information. The processor 2104 may be further configured to deploy or extend the deployable fairing 16 in response to determining that the vehicle 10 is on a highway and hence is likely operating at a relatively high speed. The processor 2104 may be further configured to retract the deployable fairing 16 in response to determining that the vehicle 10 is on a surface street hence is likely operating at a relatively low speed.

The control subsystem 2100 may receive signals indicative of speed or location from a wireless receiver 2122. The wireless receiver 2122 may be part of the control subsystem 2100, or may be a dedicated part of the vehicle 10. The wireless receiver 2122 may determine speed information or location information indicative of a current speed or location of the vehicle 10. For example, the wireless receiver 2122 may receive information indicating that the vehicle 10 is at an entrance ramp or exit ramp of a highway, or at a toll booth or toll plaza associate with an entrance or exit of a highway. Additionally, or alternatively, the information may indicate another location along a high way or surface street. The location information may itself be indicative of a posted speed. Additionally or alternatively, the received information may provide a measure of the actual speed of the vehicle 10, for example as measured by radar or laser speed sensors positioned along the road. The processor may be configured to associate the location information with a particular road or section of road, and hence with a posted speed limit or expected speed of travel for the vehicle 10. For example, the processor 2104 may be configured to determine whether the vehicle 10 is on a highway or surface street based on the location information. The processor 2104 may be further configured to deploy or extend the deployable fairing 16 in response to determining that the vehicle 10 is on a highway and hence is likely operating at a relatively high speed. The processor 2104 may be further configured to retract the deployable fairing 16 in response to determining that the vehicle 10 is on a surface street hence is likely operating at a relatively low speed.

The control subsystem 2100 may receive signals from positional sensors 2124 indicative of the current positions of one or more components of the deployable fairing 16, such as, for example, the upper and lower horizontal panel assemblies 26 and 28, respectively, and the left and right side panels 30 and 32, respectively. The sensors 2124 may be, for example, a proximity sensor, a Reed switch, a positional encoder, a rotational encoder, an optical encoder, or other like device that can sense the position of one or more components in the deployable fairing 16. The processor 2104 may be configured to determine a correct position for each of the components of the deployable fairing 16 in each of various configurations (e.g., unextended configuration 18, intermediate configuration 22, and extended configuration 20). The processor 2104 may further be configured compare the current position for each component of the deployable fairing 16 as indicated by the signals received from the sensors 2124 with the expected position for each component of the deployable fairing 16 to identify a potential error condition. Such an error condition may arise, for example, if the current position of one or more of the components of the deployable fairing 16 differs from the expected position for the one or more components. In some implementations, a time out period, such as may be stored in memories 2106, 2108, may be used to determine if the deployable fairing 16 has successfully transitioned from the unretracted configuration 18 to the extended configuration 20. If the processor 2104 determines that such an error condition exists (e.g., the positional sensors 2124 indicate that one or more components of the deployable fairing 16 have not reached the expected positions in the deployed configuration 20 within the timeout period), it may be configured to transition the deployable fairing 16, if necessary, into the unretracted configuration 18.

Figure 22:
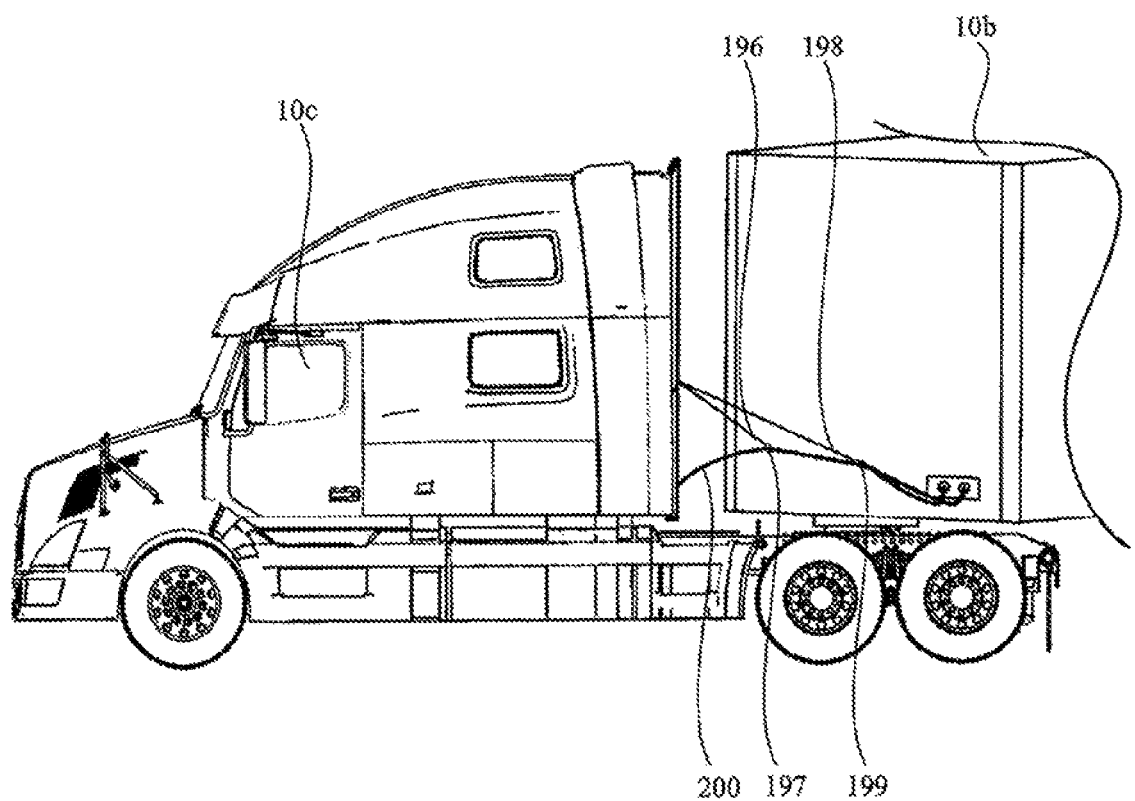
FIG. 22 is an isometric view of a double tethered airline connection showing a first tether and a second tether connected to an airline, according to at least one illustrated implementation.

FIG. 22 is an isometric view of a double tethered airline or pneumatic line connection 194 showing a first tether 196 and a second tether 198 connected to an airline or pneumatic line 200, according to at least one illustrated implementation. When the deployable fairing 16 is in the unextended configuration 18, the area made available to allow the airline or pneumatic line 200 to be coupled to the back of the cab 10*c*, 10*d* and to the trailer 10*b* is substantially reduced as the upper and lower horizontal panel assemblies 26 and 28 extend downwardly next to the back of the cab 10*c*, 10*d*, and as the left and the right side panels 30 and 32 extend laterally against the back of the cab 10*c*, 10*d*. To accommodate such, a length of the airline or pneumatic line 200 may be substantially increased compared to conventional airlines or pneumatic lines, for example doubled in length, to enable the airline or pneumatic line 200 to traverse the distance between the cab 10*c*, 10*d* and the trailer 10*b*, both when the vehicle 10 is traveling in a substantially straight line and when the vehicle 10 is turning. The first tether 196 connects to a first point 197 of the airline or pneumatic line 200 and the second tether 198 connects to a second point 199 of the airline or pneumatic line 200 in which the first point 197 is proximate the cab 10c and the second point 199 is proximate the trailer 10b.

The first tether 196 and the second tether 198 may control an amount of slack in the airline or pneumatic line 200, allowing such to elongate and contract in a controlled manner. In some implementations, for example, the first tether 196 may have a shorter length than the second tether 198, enabling the second point 199 to be displaced closer towards the trailer 10b as compared to the first point 197 when the airline or pneumatic line 200 elongates, such as when the vehicle 10 turns. In some other implementations, the first tether 196 may be less elastic than the second tether 198, enabling the second point 199 to be displaced closer towards the trailer 10b as compared to the first point 197 when the airline or pneumatic line 200 elongates. In such an implementation, the first tether 196 and the second tether 198 may be the same length in an unstressed condition. In some implementations, the first tether 196 may be shorter and less elastic than the second tether 198, enabling the second point 199 to be displaced closer towards the trailer 10b as compared to the first point 197 when the airline or pneumatic line 200 elongates.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and vehicles, not necessarily the exemplary automatic gap closing system on a tractor-trailer combination generally described above. For example, a gap closing system may be employed between two trailers, or between a locomotive and a car of a train, and/or between cars of a train. Also for example, the automatic gap closing system may be an integral part of one of the vehicles as the vehicle is manufactured or sold. Alternatively, the automatic gap closing system may be an aftermarket product, installed in one of the vehicles after manufacture or sale of the vehicle. The methods described herein may include additional acts, omit some acts, and/or perform some acts in a different order. One or more thresholds may be employed.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of physical signal bearing media used to actually carry out the distribution. Examples of signal bearing media include, but are not limited to, the following: recordable type media such as floppy disks, hard disk drives, CD ROMs, digital tape, and computer memory.

U.S. Provisional Patent Application No. 62/428,356, filed Nov. 30, 2016 and U.S. patent application Ser. No. 15/832,315 filed Dec. 5, 2017 to which the present application claims priority, is hereby incorporated herein by reference in its entirety.

The various embodiments described above can be combined to provide further embodiments. Aspects of the embodiments can be modified, if necessary, to employ systems, circuits and concepts of the various patents, applications and publications identified herein to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fairing structure for use with vehicles, the fairing structure comprising:

a deployable upper panel assembly comprising a deployable upper panel, a first upper wing panel and at least a second upper wing panel, the first upper wing panel and the second upper wing panel each pivotally coupled to the deployable upper panel, the deployable upper panel pivotal about a horizontal axis to move the deployable upper panel assembly between a retracted configuration of the fairing structure and a deployed configuration of the fairing structure, wherein, in the deployed configuration, the deployable upper panel extends rearwardly at a positive slope from the back of a cab of a tractor and the first and the second deployable side panels extend rearwardly at a positive slope from the back of the cab of the tractor;

at least a first deployable side panel having a proximal edge, the first deployable side panel coupled to translate and pivot in moving between the retracted configuration of the fairing structure and the deployed configuration of the fairing structure; and at least a second deployable side panel having a proximal edge, the second deployable side panel coupled to translate and pivot in moving between the retracted configuration of the fairing structure and the deployed configuration of the fairing structure.

2. The fairing structure of claim 1 wherein, in the deployed configuration, the first deployable side panel and the second deployable side panel each flare outwardly in a direction going from a front of the fairing structure toward a rear of the fairing structure.

3. The fairing structure of claim 1 wherein the first deployable side panel is pivotally coupled to the deployable upper panel assembly and the second deployable side panel is pivotally coupled to the deployable upper panel assembly.

4. The fairing structure of claim 1 wherein the first deployable side panel is pivotable about an axis that extends parallel to the proximal edge of the first deployable side panel and the second deployable side panel is pivotable about an axis that extends parallel to the proximal edge of the second deployable side panel.

5. The fairing structure of claim 4 wherein the axis that the first deployable side panel is pivotable about is spaced from the proximal edge of the first deployable side panel at least in the deployed configuration of the fairing structure and the axis that the second deployable side panel is pivotable about is spaced from the proximal edge of the second deployable side panel at least in the deployed configuration of the fairing structure.

6. The fairing structure of claim 1 wherein the first deployable side panel is pivotable about an axis that is perpendicular to the horizontal axis and the second deployable side panel is pivotable about an axis that is perpendicular to the horizontal axis.

7. The fairing structure of claim 1 wherein the first deployable side panel is coupled to translate and pivot without any hinge extending along the proximal edge of the first deployable side panel and the second deployable side panel is coupled to translate and pivot without any hinge extending along the proximal edge of the second deployable side panel.

8. The fairing structure of claim 1 wherein the deployable upper panel is a single trapezoidal panel with a trapezoidal profile.

9. The fairing structure of claim 1, further including:
a static upper panel that has a D-shaped profile.

10. The fairing structure of claim 9 wherein the static upper panel extends horizontally from a back of the cab of the tractor with a major curved edge of the D-shaped profile proximate the back of the cab of the tractor.

11. The fairing structure of claim 10 wherein the first deployable side panel and the second deployable side panel each extend vertically with respect to the cab of the tractor.

12. A fairing structure for use with vehicles having cabs with backs, the fairing structure comprising:
a deployable upper panel assembly comprising at a deployable upper panel, a first upper wing panel and at least a second upper wing panel, the first upper wing panel and the second upper wing panel each pivotally coupled to the deployable upper panel, the deployable upper panel having a leading edge, a trailing edge, and pivotal about a horizontal axis to move between a retracted configuration of the fairing structure in which the deployable upper panel extends rearwardly from a back of the cab of the vehicle tilted relatively downwards with respect to a horizontal plane that extends through the horizontal axis and a deployed configuration of the fairing structure in which the deployable upper panel extends rearwardly from the back of the cab of the vehicle tilted relatively upwards with respect to the horizontal plane that extends through the horizontal axis.

13. The fairing structure of claim 12, further comprising;
at least a first deployable side panel, the first deployable side panel coupled to translate and pivot in moving between the retracted configuration of the fairing structure and the deployed configuration of the fairing structure; and
at least a second deployable side panel, the second deployable side panel coupled to translate and pivot in moving between the retracted configuration of the fairing structure and the deployed configuration of the fairing structure.

14. The fairing structure of claim 13 wherein, in the deployed configuration, the first deployable side panel and the second deployable side panel are each tilted outwardly in a direction going from a front of the fairing structure toward a rear of the fairing structure.

15. The fairing structure of claim 13, further comprising:
a single actuator, the single actuator coupled to the deployable upper panel and operable to selectively move the deployable upper panel between the retracted and the deployed configurations.

16. The fairing structure of claim 13, further comprising:
a first actuator, the first actuator coupled to the first deployable side panel and operable to selectively move the first deployable side panel between the retracted and the deployed configurations; and
a second actuator, the second actuator coupled to the second deployable side panel and operable to selectively move the second deployable side panel between the retracted and the deployed configurations.

17. The fairing structure of claim 16, further comprising:
a third actuator, the third actuator coupled to the deployable upper panel and operable to selectively move the deployable upper panel between the retracted and the deployed configurations.

18. The fairing structure of claim 13, further comprising:
a first hinge comprising a base and an arm that is rotatably coupled to the base to pivot about a vertical axis with respect to the base between a retracted position and a deployed position, the first deployable side panel attached to the arm of the first hinge for movement therewith; and
a second hinge comprising a base and an arm that is rotatably coupled to the base to pivot about a vertical axis with respect to the base between a retracted position and a deployed position, the second deployable side panel attached to the arm of the second hinge for movement therewith.

19. The fairing structure of claim 18, further comprising:
at least a third hinge having a horizontal axis of rotation that is perpendicular to vertical axes of rotation of the fist and the second hinges, the third hinge coupled to the deployable upper panel.

20. The fairing structure of claim 12, further comprising:
a single actuator, the single actuator coupled to the deployable upper panel and operable to selectively move the deployable upper panel between the retracted and the deployed configurations.

\* \* \* \* \*